(12) United States Patent
Sekiguchi et al.

(10) Patent No.: US 8,098,734 B2
(45) Date of Patent: Jan. 17, 2012

(54) VIDEO ENCODER, VIDEO DECODER, VIDEO ENCODING METHOD, VIDEO DECODING METHOD, AND VIDEO ENCODING AND DECODING SYSTEM

(75) Inventors: Shunichi Sekiguchi, Tokyo (JP); Kohtaro Asai, Tokyo (JP); Tokumichi Murakami, Tokyo (JP); Hirofumi Nishikawa, Tokyo (JP); Shinichi Kuroda, Tokyo (JP); Yoshimi Isu, Tokyo (JP); Yuri Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 205 days.

(21) Appl. No.: 12/648,837

(22) Filed: Dec. 29, 2009

(65) Prior Publication Data

US 2010/0172415 A1   Jul. 8, 2010

Related U.S. Application Data

(62) Division of application No. 11/352,377, filed on Feb. 13, 2006, which is a division of application No. 10/086,446, filed on Mar. 4, 2002, now Pat. No. 7,110,456, which is a division of application No. 09/180,188, filed as application No. PCT/JP97/03825 on Oct. 23, 1997, now Pat. No. 6,404,815.

(30) Foreign Application Priority Data

Mar. 17, 1997   (WO) ........................ PCT/JP97/00834

(51) Int. Cl.
*H04N 7/12* (2006.01)

(52) U.S. Cl. .................................. 375/240.16

(58) Field of Classification Search ............. 375/240.16, 375/240.17, 240.29, 240.26, 240.25; 382/236, 382/238, 243, 248, 107, 109; 358/261.02, 358/428, 430; 348/416.1, 426.1, 413.1, 415.1, 348/699, 700; *H04N 7/12*
See application file for complete search history.

(56) References Cited

U.S. PATENT DOCUMENTS

| | | | |
|---|---|---|---|
| 4,661,849 A | 4/1987 | Hinman | |
| 4,816,906 A | 3/1989 | Kummerfeldt et al. | |
| 4,972,260 A | 11/1990 | Fujikawa et al. | |
| 5,214,504 A | 5/1993 | Toriu et al. | |

(Continued)

FOREIGN PATENT DOCUMENTS

EP   0 613 304 A2   8/1994

(Continued)

OTHER PUBLICATIONS

ISO/EIC 11172-2, 1993 (14 pages).
Motion Compensated Prediction Using an Affine Motion Model (Technical Report of the Institute of Electronics, Information and Communication Engineers, IE 94-36), H. Jozawa, Jul. 1994.
Chiou-Shann Fuh et al., "Motion displacement estimation using an affine model for image matching," Optical Engineering, Jul. 1991, vol. 30, No. 7, pp. 881-887.

(Continued)

*Primary Examiner* — Tung Vo
(74) *Attorney, Agent, or Firm* — Birch, Stewart, Kolasch & Birch, LLP.

(57) ABSTRACT

A method and a video decoder for decoding an encoded bitstream of video data in a picture encoding and decoding system are disclosed. The video decoder includes a motion compensation unit for calculating a position for a sample image portion using an encoded bitstream of video data having a motion vector and rounding information. The calculated position of a sample image is rounded with the rounding information. The rounding information indicates the accuracy for rounding, and it is decoded from the bitstream. An image reconstruction unit reconstructs a decoded image portion of the video data from the sample image portion.

1 Claim, 51 Drawing Sheets

U.S. PATENT DOCUMENTS

| | | | |
|---|---|---|---|
| 5,247,355 A | 9/1993 | Frederiksen | |
| 5,311,310 A | 5/1994 | Jozawa et al. | |
| 5,376,971 A | 12/1994 | Kadono et al. | |
| 5,400,087 A | 3/1995 | Uramoto et al. | |
| 5,416,522 A | 5/1995 | Igarashi | |
| 5,467,135 A | 11/1995 | Yamane et al. | |
| 5,467,136 A | 11/1995 | Odaka et al. | |
| 5,473,378 A | 12/1995 | Tamitani | |
| 5,473,379 A | 12/1995 | Horne | |
| 5,475,446 A | 12/1995 | Yamada et al. | |
| 5,481,553 A * | 1/1996 | Suzuki et al. | 714/800 |
| 5,534,927 A * | 7/1996 | Shishikui et al. | 348/400.1 |
| 5,568,196 A | 10/1996 | Hamada et al. | |
| 5,574,504 A | 11/1996 | Yagasaki et al. | |
| 5,590,139 A * | 12/1996 | Suzuki et al. | 714/800 |
| 5,598,215 A | 1/1997 | Watanabe | |
| 5,650,823 A | 7/1997 | Ngai et al. | |
| 5,684,538 A | 11/1997 | Nakaya et al. | |
| 5,719,630 A | 2/1998 | Senda et al. | |
| 5,754,240 A | 5/1998 | Wilson | |
| 5,761,423 A | 6/1998 | Lee | |
| 5,768,438 A | 6/1998 | Etoh | |
| 5,774,676 A | 6/1998 | Stearns et al. | |
| 5,812,791 A | 9/1998 | Wasserman et al. | |
| 5,963,259 A | 10/1999 | Nakaya et al. | |
| 5,978,030 A | 11/1999 | Jung et al. | |
| 5,991,447 A | 11/1999 | Eifrig et al. | |
| 6,005,980 A | 12/1999 | Eifrig et al. | |
| 6,008,852 A | 12/1999 | Nakaya | |
| 6,049,362 A | 4/2000 | Butter et al. | |
| 6,144,701 A | 11/2000 | Chiang et al. | |
| 6,208,690 B1 | 3/2001 | Tomizawa | |
| 6,236,682 B1 | 5/2001 | Ota et al. | |
| 6,249,318 B1 | 6/2001 | Girod et al. | |
| 6,249,613 B1 | 6/2001 | Crinon et al. | |
| 6,282,243 B1 | 8/2001 | Kazui et al. | |
| 6,404,815 B1 * | 6/2002 | Sekiguchi et al. | 375/240.16 |
| 6,526,095 B1 | 2/2003 | Nakaya et al. | |
| 6,633,611 B2 * | 10/2003 | Sekiguchi et al. | 375/240.16 |
| 6,876,769 B2 | 4/2005 | Nakaya | |
| 6,968,003 B1 | 11/2005 | Gonzales et al. | |
| 7,110,456 B2 * | 9/2006 | Sekiguchi et al. | 375/240.16 |
| 7,643,559 B2 * | 1/2010 | Kato et al. | 375/240.23 |
| 2002/0118758 A1 * | 8/2002 | Sekiguchi et al. | 375/240.18 |
| 2002/0131502 A1 | 9/2002 | Monro et al. | |
| 2003/0215012 A1 | 11/2003 | Etoh et al. | |
| 2004/0028282 A1 * | 2/2004 | Kato et al. | 382/236 |
| 2004/0125875 A1 | 7/2004 | Nakaya | |
| 2004/0151249 A1 | 8/2004 | Morel | |
| 2005/0036700 A1 | 2/2005 | Nakaya | |
| 2006/0133508 A1 * | 6/2006 | Sekiguchi et al. | 375/240.17 |
| 2006/0159180 A1 * | 7/2006 | Sekiguchi et al. | 375/240.17 |
| 2007/0009046 A1 * | 1/2007 | Sekiguchi et al. | 375/240.25 |
| 2007/0263718 A1 * | 11/2007 | Sekiguchi et al. | 375/240.02 |
| 2007/0263727 A1 * | 11/2007 | Sekiguchi et al. | 375/240.16 |

FOREIGN PATENT DOCUMENTS

| | | |
|---|---|---|
| EP | 0 632 567 A1 | 1/1995 |
| EP | 0 632 657 A1 | 1/1995 |
| EP | 0933346 A1 | 8/1999 |
| EP | 1052238 A1 | 11/2000 |
| GB | 2 301 972 A | 12/1996 |
| JP | 48585 | 1/1992 |
| JP | 5219498 | 8/1993 |
| JP | 5244585 | 9/1993 |
| JP | 698314 | 4/1994 |
| JP | 6153185 | 5/1994 |
| JP | 750773 | 2/1995 |
| JP | 08-051630 A | 2/1996 |
| WO | WO-92/03799 A1 | 3/1992 |

OTHER PUBLICATIONS

IEEE Transactions on Circuits and Systems for Video Technology, vol. 4 Jun. 1994, No. 3, New York, NY, "Motion Compensation Based on Spatial Transformations," Nakaya et al., pp. 339-356.

IEEE Transactions on Circuits and Systems for Video Technology, vol. 7, No. 1, Feb. 1997, Jozawa et al., "Two-Stage Motion Compensation Using Adaptive Global MC and Local Affine MC," pp. 75-84.

* cited by examiner

Fig.22
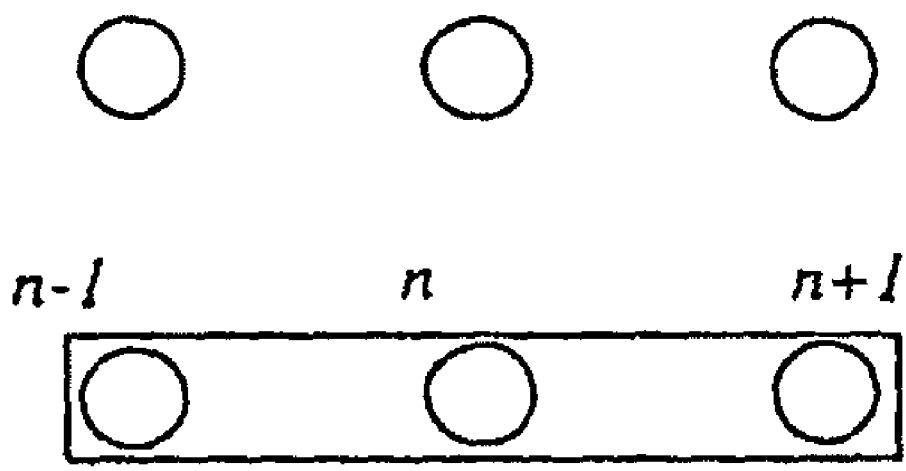

A,B,C,D : INTEGER PEL $E = (A+B) / 2$
$F = (C+D) / 2$
$G = (A+C) / 2$
$H = (B+D) / 2$
$EI = (A+B+C+D) / 4$ $\hat{I}(i', j') = W_{x1}W_{y1}I(i_p, j_p) + W_{x2}W_{y1}I(i_{p+1}, j_p) + W_{x2}W_{y1}I(i_{p+1}, j_{p+1}) + W_{x2}W_{y2}I(i_{p+1}, j_p)$ $W_{x2} = i' - i_p$
$W_{x1} = 1.0 - W_{x2}$
$W_{y2} = j' - j_p$
$W_{y1} = 1.0 - W_{y2}$

VIDEO ENCODER, VIDEO DECODER, VIDEO ENCODING METHOD, VIDEO DECODING METHOD, AND VIDEO ENCODING AND DECODING SYSTEM

CROSS REFERENCE TO RELATED APPLICATIONS

This application is a divisional of co-pending application Ser. No. 11/352,377, filed Feb. 13, 2006, which in turn is a divisional of application Ser. No. 10/086,446, filed on Mar. 4, 2002, which in turn is a divisional of application Ser. No. 09/180,188, filed on Jan. 19, 1999 (now U.S. Pat. No. 6,404, 815 issued Jun. 11, 2002) and for which priority is claimed under 35 U.S.C. §120. Application Ser. No. 09/180,188 is the national phase of PCT International Application No. PCT/JP97/03825 filed on Oct. 23, 2997 under 35 U.S.C. §371. This application also claims priority of Application No. PCT/JP97/00834 filed in Japan on Mar. 17, 1997 under 35 U.S.C. §119. The entire contents of each of the above-identified applications are hereby incorporated by reference.

TECHNICAL FIELD

The present invention relates to a highly efficient picture (image) encoding and decoding system for performing motion compensated prediction of a picture (image) to be encoded or decoded for encoding a prediction error, and for decoding reference picture (image) data together with the prediction error by referring to an encoded picture (image).

BACKGROUND ART

Conventional motion compensated prediction methods for performing highly efficient encodation of a picture are described below.

The first example of a conventional motion compensated prediction method which will be discussed is a motion compensated prediction method using block matching that compensates for translational motion of an object. For example, in ISO/IEC 11172-2 (also known as the MPEG 1 video standard), a forward/backward/interpolative motion compensated prediction method using block matching is described. The second example of a conventional motion compensated prediction method which will be discussed is a motion compensated prediction method using an affine motion model. For example, "Motion Compensated Prediction Using An Affine Motion Model" (the technical report of IE94-36, by the Institute of Electronics, Information and Communication Engineers of Japan) describes the motion compensated prediction method in which the displacement of an object in each arbitrarily shaped segment is modeled and expressed using affine motion parameters, and in which the affine motion parameters are detected so as to perform motion compensated prediction.

Now, the conventional motion compensation method using block matching by a translational motion and the conventional motion compensation method using the affine motion model will be described in more detail below.

FIG. 42 shows a known motion compensated prediction which utilizes block matching. In FIG. 42, i represents a position of a block on a display as a unit used for motion compensated prediction; fi(x, y, t) represents the pel value (x, y) in the block i at time t on the display; R represents a motion vector search range; and v represents a motion vector (∈R). Block matching is a process for detecting, within the search range R of a reference picture 201, a block whose pel value is most approximate to the pel value fi(x, y, t) of the block i in an input picture 202, or for detecting a pel value fi+v (x, y, t−1) which will minimize a prediction error power Dv which may be expressed in one of the following equations (1).

$$D_v = \sum_{x,y} \{f_{i+v}(x, y, t-1) - f_i(x, y, t)\}^2 \quad (1)$$

or $$\sum_{x,y} |f_{i+v}(x, y, t-1) - f_i(x, y, t)|$$

The value v which minimizes Dv will be the motion vector. In FIG. 42, a block matching search method using real sample point integer pels in a reference picture is referred to as an integer pel precision search, and a block matching search method using half-pels (interposed midway between the integer pels) in addition to integer pels is referred to as a half-pel precision search. Generally, under the same block matching search range, more search pel points can be obtained in the half-pel precision search than in the integer pel precision search. Consequently, increased prediction accuracy will be obtained with the half-pel precision search.

FIG. 43 is a block diagram showing a configuration of a motion compensated predictor (also referred to as a block matching section) using a motion compensated prediction method in accordance with, for example, the MPEGI video standard.

In the figure, reference numeral 207 is a horizontal displacement counter, 208 is a vertical displacement counter, 211 is a memory readout-address generator, 213 is a pattern matching unit, and reference numeral 216 is a minimum prediction error power determinator. Reference numeral 203 is a horizontal displacement search range indication signal, 204 is a vertical displacement search range indication signal, 205 is input picture block data, 206 is an input picture block position indication signal, 209 is horizontal displacement search point data, 210 is vertical displacement search point data, 212 is a readout address, 214 is readout picture data, 215 is a prediction error power signal, 217 is a motion vector, 218 is a minimum prediction error power signal, and 219 is a frame memory for storing reference picture data.

FIG. 44 is a flow chart showing the operations of the conventional motion compensated predictor having the above-mentioned configuration of FIG. 43.

In FIG. 44, dx represents a horizontal displacement search pel point;

dy represents a vertical displacement search pel point;

range_h_min represents a lower limit in a horizontal displacement search range;

range_h_max represents an upper limit in the horizontal displacement search range;

range_v_min represents a lower limit in a vertical displacement search range;

range_v_max represents an upper limit in the vertical displacement search range;

D_min represents the minimum prediction error power;

(x, y) are coordinates representing the position of a pel in a macroblock;

D(dx, dy) represents prediction error power produced when dx and dy are searched;

f(x, y) is the value of a pel (x, y) in an input picture macroblock;

fr(x, y) is the value of a pel (x, y) in a reference picture;

D(x, y) is a prediction error for the pel (x, y) when dx and dy are searched;

MV_h is a horizontal component of a motion vector (indicating horizontal displacement); and MV_v is a vertical component of a motion vector (indicating vertical displacement).

The block matching operation will be described in more detail, by referring to FIGS. 43 and 44.

1) Motion Vector Search Range Setting

Range_h_min and range_h_max are set through the horizontal displacement counter 207 according to the horizontal displacement search range indication signal 203. Range_v_min and range_v_max are set through the vertical displacement counter 208 according to the vertical displacement search range indication signal 204. In addition, the initial values of dx for the horizontal displacement counter 207 and dy for the vertical displacement counter 208 are set to range_h_min and range_v_min, respectively. In the minimum prediction error power determinator 216, the minimum prediction error power D_min is set to a maximum integer value MAXINT (for example, 0xFFFFFFFF). These operations correspond to step S201 in FIG. 44.

2) Possible Prediction Picture Readout Operation

Data on the pel (x+dx, y+dy) in a reference picture, which are distant from the pel (x, y) in the input picture macroblock by dx and dy are fetched from the frame memory. The memory readout address generator 211 illustrated in FIG. 43 receives the value of dx from the horizontal displacement counter 207 and the value of dy from the vertical displacement counter 208, and generates the address for the pel (x+dx, y+dy) in the frame memory.

3) Prediction Error Power Calculation

First, the prediction error power D(dx, dy) for the motion vector representing (dx, dy) is initialized to zero. This corresponds to step S202 in FIG. 44. The absolute value for the difference between the pel value readout in 2) and the value of the pel (x, y) in the input picture macroblock is accumulated into D(dx, dy). This operation is repeated until the value of x and the value of y become x=y=16. Then, the prediction error power D(dx, dy) produced when (dx, dy) is searched, or Dv given by numeral equations (1) is obtained. This operation is executed by the pattern matching unit 213 illustrated in FIG. 43. Then, the pattern matching unit 213 supplies D(dx, dy) to the minimum prediction error power determinator 216 through the prediction error power signal 215. These operations correspond to steps S203 through S209 in FIG. 44.

4) Minimum Prediction Error Power Updating

It is then determined whether the resultant D(dx, dy) obtained in 3) has given the minimum prediction error power among the searched results which have been obtained so far. This determination is made by the minimum prediction error power determinator 216 illustrated in FIG. 43. This corresponds to step S210 in FIG. 44. The minimum prediction error power determinator 216 compares the value of the minimum prediction error power D_min therein with D(dx, dy) supplied through the prediction error power signal 215. If D(dx, dy) is smaller than D_min, the minimum prediction error power determinator 216 updates the value of D_min to D(dx, dy). In addition, the minimum prediction error power determinator 216 retains the values of dx and dy at that time as the possible motion vector (MV_h, MV_v). This updating operation corresponds to step S211 in FIG. 44.

5) Motion Vector Value Determination

The above-mentioned 2) through 4) operations are repeated for all (dx, dy) within the motion vector search range R. (These operations correspond to steps S212 through S215 in FIG. 44.) The final values (MV_h, MV_v) retained by the minimum prediction error power determinator 216 are output as the motion vector 217.

FIG. 45 schematically shows a motion compensated prediction system in accordance with the MPEG1 video standard.

Under the MPEG1 video standard, a motion picture frame is typically referred to as a picture. One picture is divided into macroblocks, each of which includes 16×16 pels (color difference signal includes 8×8 pels). For each macroblock, motion compensated prediction using block matching is performed. The resultant motion vector value and a prediction error are then encoded.

Under the MPEG1 video standard, different motion compensation methods can be applied to different individual pictures. Referring to the figure, I-pictures are encoded, without being subjected to motion compensated prediction and without reference to other pictures. P-pictures are encoded using forward motion compensated prediction from a past encoded picture. B-pictures may be encoded using forward motion compensated prediction from a future picture to be encoded, backward motion compensated prediction from a past picture, and interpolative prediction from the mean value between the past encoded picture and the future picture to be encoded. However, forward/backward/interpolative motion compensated predictions are basically all motion compensated prediction using block matching which utilize different reference pictures for implementing the prediction.

As described above, block matching has been established as a main method for implementing motion compensated prediction for current video encoding systems. Block matching, however, is an operation which determines the translational displacement of an object for each square block such as a macroblock. Block matching is based on the assumption that "a picture portion having the same luminance belongs to the same object". Consequently, in principle, it is impossible to detect motions of an object other than square-block-based motions. For portions in which the object does not move according to a simple translational motion such as rotation, scaling up and down, zooming, or three-dimensional motion prediction accuracy will be reduced.

In order to solve the above-mentioned motion detecting problems that are associated with the conventional block matching method described above, motion compensated prediction using the affine motion model have been proposed and aim at more accurately detecting the displacement of an object including rotation and scaling of the object as well as translational motion. This known solution is based on the assumption that (x, y), the value of a pel in a picture segment to be predicted is converted to a reference picture pel value (x', y') using the affine motion model as shown in the following equation (2). Under this assumption, all the affine parameters are searched and detected as affine motion parameters. Motion compensated prediction performed on each arbitrarily shaped prediction picture segment after the detection of affine motion parameters is proposed and described in "Motion Compensated Prediction Using An Affine Motion Model" (a technical report of IE94-36 by the Institute of Electronics, Information and Communication Engineers of Japan).

$$\begin{pmatrix} x' \\ y' \end{pmatrix} = \begin{pmatrix} \cos\theta & \sin\theta \\ -\sin\theta & \cos\theta \end{pmatrix} \begin{pmatrix} C_x & 0 \\ 0 & C_y \end{pmatrix} \begin{pmatrix} x \\ y \end{pmatrix} + \begin{pmatrix} t_x \\ t_y \end{pmatrix} \quad (2)$$

The definition of θ, (Cx, Cy), (tx, ty) will be described later.

FIG. 46 shows a concept of the motion compensated prediction process using the affine motion model.

In the figure, i represents the position of a segment on a display used as a unit for motion compensated prediction;

fi(x, y, t) represents a pel (x, y) in the segment position i and at time t;

Rv represents a translational displacement search range;

Rrot, scale represents a search range for a rotated angle/scaled amount;

v represents translational motion vector including translational motion parameters (=(tx, ty));

rot is a rotation parameter (=a rotated angle θ); and scale is scaled amount parameters (=(Cx, Cy)).

In the motion compensated prediction using the affine model, five affine motion parameters including the rotated angle θ, scaled amount parameters (Cx, Cy) as well as the translational motion parameters (tx, ty) representing the motion vector must be detected. The optimum affine motion parameters can be calculated by searching through all parameters. In order to find the optimum affine motion parameters, however, the number of the arithmetic operations required is enormous. Thus, based on an assumption that the translational displacement is predominant, two stages of affine motion parameter search algorithms are used. In the first stage, the translational displacement parameters (tx, ty) are searched. Then, in the second stage, the rotated angle θ and the scaled amount parameters (Cx, Cy) are searched around the area which the translational displacement parameters (tx, ty) determined in the first stage represents. Further, minute adjustment for the translational displacement is implemented. Among the possible parameters, a combination of affine motion parameters representing the segment which has produced the minimum prediction error power is determined to be the combination of parameters for a prediction picture segment. Then, a difference between the prediction picture segment and the current picture segment is calculated and regarded as a prediction error. And the prediction error is encoded. The prediction error power in accordance with motion compensated prediction using the affine motion model is given by the following equation (3):

$$D_{v,rot,scale} = \sum_{x,y} \{M_{rot} \cdot M_{scale} \cdot f_{i+v}(x, y, t-1) - f_i(x, y, t)\}^2 \quad (3)$$

or $$= \sum_{x,y} |M_{rot} \cdot M_{scale} \cdot f_{i+v}(x, y, t-1) - f_i(x, y, t)|$$

where, $$M_{rot} = \begin{pmatrix} \cos\theta & \sin\theta \\ -\sin\theta & \cos\theta \end{pmatrix}$$

$$M_{scale} = \begin{pmatrix} C_x & 0 \\ 0 & C_y \end{pmatrix}$$

FIG. 47 shows an example of a configuration of a conventional motion compensated predictor for performing motion compensated prediction using the affine motion model.

In the figure, reference numeral 220 is a translational displacement minute adjusted amount search range indication signal, reference numeral 221 is a rotated angle search range indication signal, 222 is a scaled amount search range indication signal, 223 is a translational displacement search range indication signal, 224 is a signal indicating a position of an input picture segment on a display, and 225 is input picture segment data. Furthermore, reference numeral 226 is a horizontal displacement counter, 227 is a vertical displacement counter, 228 is a translational displacement adder, 229 is a first minimum prediction error power determinator, 230 is a memory readout address generator, 231 is an interpolator, 232 is a half-pel interpolator, 233 is a rotated angle counter, 234 is a scaled amount counter, 235 is a translational displacement/rotated angle/scaled amount adder, 236 is a second minimum prediction error power determinator, 237 is a translational displacement minute adjusted amount counter, 238 is a translational displacement minute adjusted amount adder, and 239 is a final minimum prediction error power determinator.

FIG. 48 is a flow chart showing the conventional operations of the above-mentioned motion compensated predictor. FIG. 49 is a flow chart showing the details of the affine motion parameters detection step illustrated at S224 of FIG. 48.

In these flow charts,

MV_h[4] represents horizontal motion vector components (four possible components);

MV_v[4] represents vertical motion vector components (four possible components);

D_min represents the minimum prediction error power;

θ represents a rotated angle [radian];

Cx and Cy represent scaled amount parameters; and tx and ty are motion vector minute adjusted amount parameters.

Furthermore, D(θ[i], Cx[i], Cy[i], tx[i], ty[i]) represent the minimum prediction error power obtained after the detection of the affine motion parameters when MV_h[i] and MV_v[i] have been selected;

dθ represents a rotated angle search pel point;

dCx represents a horizontal scaled amount search pel point;

dCy represents a vertical scaled amount search pel point;

dtx represents a horizontal displacement minute adjusted amount search pel point;

dty represents a vertical displacement minute adjusted amount search pel point;

range_radian_min represents a lower limit within a rotated angle search range;

range_radian_max represents an upper limit within the rotated angle search range;

range_scale_min represents a lower limit within a scaled amount search range;

range_scale_max represents an upper limit within the scaled amounts search range;

range_t_h_min represents a lower limit within a horizontal displacement minute adjusted amount search range;

range_t_h_max represents an upper limit within the horizontal displacement minute adjusted amount search range;

range_t_v min represents a lower limit within a vertical displacement minute adjusted amount search range;

range_t_v_max represents an upper limit within the vertical displacement minute adjusted amount search range;

D_min represents the minimum prediction error power;

(x, y) represents a position of a pel in an input picture segment to be predicted;

f(x, y) represents the value of the pel (x, y) in the input picture to be predicted;

fr(x, y) represents the value of a pel (x, y) in a reference picture;

ax represents a value representing horizontal displacement obtained by using the affine motion model;

ay represents a value representing vertical displacement obtained by using the affine motion model;

D(ax, ay) represents a prediction error power produced when ax and ay are searched; and D(x, y) is a prediction error for the pel (x, y) when ax and ay are searched.

Referring to FIG. 47 through FIG. 49, an operation of the conventional motion compensated prediction process using the affine motion model will be described in more detail.

It is assumed in these figures that like elements or like steps which are given like reference numerals and signs represent the same elements or represent the same processes.

1) First Stage

In the first stage of the conventional operation, detection of translational motion parameters (=the motion vector) obtained by the process similar to the above-mentioned block matching process is performed within a picture segment search range.

Referring to FIG. 47, the picture segment search range is set through the horizontal displacement counter 226 and the vertical displacement counter 227 by using the translational displacement search range indication signal 223. Then, the search pel points are moved. Through the translational displacement adder 228, the value indicating the position of a pel in an input picture segment is added to the counter values. Then, the added result is supplied to the memory readout address generator 230, and the pel value in a possible prediction picture portion is read out from the frame memory 219. The readout pel value is supplied to the pattern matching unit 213, and an error calculation operation similar to that used in the block matching method is performed. This matched result is supplied to the first minimum prediction error power determinator 229 so as to obtain four possible translational motion parameters representing prediction errors in the reverse order of magnitude. These four possible translational motion parameters are expressed as MV_h[4] (horizontal components) and MV_v[4] (vertical components). The operation of the first minimum prediction error power determinator 229 is similar to that of the minimum prediction error power determinator 216. These process steps correspond to steps S221 and S222 in FIG. 48.

2) Second Stage 2-1) Preparations (Picture Segment Search Range Setting and Initialization of the Minimum Prediction Error Power)

For each MV_h[i]/MV_v[i] (0≦i≦3), the rotated angle/the scaled amount are searched around the minute space conterminous therewith. This operation corresponds to step S224 in FIG. 48 and the detailed process steps thereof are illustrated in FIG. 49, and will be described in conjunction with the operation of the motion compensated predictor shown in FIG. 47.

First, through the rotated angle search range indication signal 221 and the scaled amount search range indication signal 222, the rotated angle search range and the scaled amount search range are set in the rotated angle counter 233 and the scaled amount counter 234, respectively. Through the translational displacement minute adjusted amount search range indication signal 220, the translational displacement search range is also set in the translational displacement minute adjusted amount counter 237. The second minimum prediction error power determinator 236 sets the value of the minimum prediction error power D_min retained therein to MAXINT. These operations correspond to step S229 in FIG. 49.

2-2) Rotated Angle Search

The same operation is repeated for each of MV_h[i]/MV_v[i] (0≦i≦3). Thus, a description about the rotated angle search will be directed to the case of MV_h[0]/MV_v[0] alone, and descriptions about other cases will be omitted. The affine motion models ax and ay expressed in the following equations and obtained by changing the rotated angle θ within the rotated angle search range while keeping the scaled amount parameters Cx and Cy and the translational motion minute adjusted amounts tx and ty unchanged:

$$ax = dCx*\cos(d\theta)*x + dCy*\sin(d\theta)*y + MV\_h[i] + dtx$$

$$ay = -dCx*\sin(d\theta)*x + dCy*\cos(d\theta)*y + MV\_v[i] + dty \quad (4)$$

The absolute value for a difference between the pel value fr(ax, ay) in a reference picture segment and the pel value f(x, y) in an input picture segment is determined and accumulated to D(ax, ay).

Referring to FIG. 47, the above-mentioned operation is executed by fixing the counted values of the scaled amount counter 234 and the translational displacement minute adjusted amount counter 237, determining ax and ay given by equations (4) through the translational displacement/rotated angle/scaled amount adder 235 based on the counted value of the rotated angle counter 233, reading out the pels necessary for calculating fr(ax, ay) from the frame memory 219 through the memory readout address generator 230, calculating fr(ax, ay) from these pels through the interpolator 231, and determining the absolute value for the difference between the pel value f(x, y) in the input picture segment and the pel value fr(ax, ay) in the reference picture segment through the pattern matching unit 213. Referring to FIG. 49, these operations correspond to steps S231 through S234.

The above-mentioned operations are performed all around the rotated angle search range. Then, the rotated angle θ which has produced the minimum prediction error within the rotated angle search range is determined through the second-stage minimum prediction error determinator 236.

2-3) Scaled Amount Search

The affine motion models ax and ay given by numeral equation (4) are also obtained by fixing the counted value of the translational displacement minute adjusted amount counter 237 as in the rotated angle search, substituting the rotated angle θ determined in 2-2) into numeral equation (4), and changing the scaled amount parameters Cx and Cy within the scaled amount search range.

The scaled amount parameters Cx and Cy which have minimized D(ax, ay) are obtained by performing the operations similar to those in the rotated angle search. The scaled amount counter 234 counts scaled amount search pel points.

2-4) Translational Displacement Minute Adjusted Amount Search

The affine motion models ax and ay given by numeral equation (4) are also obtained by using the rotated angle θ determined in 2-2) and the scaled amount parameters Cx and Cy determined in 2-3) and changing the value of the translational displacement minute adjusted amounts tx and ty within the translational displacement minute adjusted amount search range.

Then, operations similar to those in the rotated angle search or the scaled amount search are performed. The translational displacement minute adjusted amount counter 237 counts translational displacement minute adjusted amount search pel points. In this case, tx and ty are searched with a half-pel precision. Then, the half-pel values for tx and ty are calculated through the half-pel interpolator 232, if necessary, before the half-pel value data for tx and ty are supplied to the pattern matching unit 213. The half-pel values are calculated as shown in FIG. 50 and as follows in the following equation (5), based on the spatial position relationship between half-pels and integer pels:

$$\hat{I}(x,y) = [I(x_p, y_p) + I(x_p+1, y_p) + I(x_p, y_p+1)I(x_p+1, y_p+1)]/4;$$
$$x,y:\text{ODD}$$

$$[I(x_p, y_p) + I(x_p+1, y_p)]/2; \ x:\text{ODD}, y:\text{EVEN}$$

$$[I(x_p, y_p) + I(x_p, y_p+1)]/2; \ x:\text{EVEN}, y:\text{ODD} \quad (5)$$

in which, both x and y are integers equal to or greater than zero. When x and y are both even numbers, half-pels having such coordinates of x and y will become integer pels.

The process flow of the operations illustrated in FIG. 49 will be completed as described above.

2-5) Final Affine Motion Parameters Determination

A prediction error between a prediction picture segment and an input picture segment is then determined. This prediction error can be obtained by using δ[i], Cx[i], Cy[i], tx[i], and ty[i] given by the above-mentioned affine motion parameters search from 2-2) through 2-4) for all of MV_h[i] and MV_v [i]. The picture segment position i and the set of affine motion parameters therefor which has given the smallest prediction error are regarded as the final search result. These operations correspond to steps S225 through S228 in FIG. 48.

As described above, the affine motion parameters search requires an enormous calculational burden as well as a great many process steps.

FIG. 51 is a diagram showing a method of calculating a non-integer pel value produced when the rotated angle and the scaled amount are searched. In other words, the figure is a diagram showing a method of calculating fr(ax, ay) through the interpolator 231.

In the figure, ○ represents a real sample point in a picture, while • represents a virtual pel value obtained by performing the above-mentioned calculation method. fr(ax, ay) are represented by $\hat{I}(x, y)$ calculated in a reference picture and given by the following equation (6) (in which x=ax, y=ay):

$$\hat{I}(x,y) = w_{x1}w_{y1}I(x_p, y_p) + w_{x2}w_{y1}I(x_p+1, y_p) + w_{x1}w_{y2}I(x_p, y_p+1) + w_{x2}w_{y2}I(x_p+1, y_p+1)$$

$$w_{x2} = x' - x_p$$

$$w_{x1} = 1.0 - w_{x2}$$

$$w_{y2} = y' - y_p$$

$$w_{y1} = 1.0 - w_{y2} \quad (6)$$

During the affine motion parameters search, pel matching is performed and the segment which has produced the minimum prediction error power is selected. Consequently, each time any of the above-mentioned five affine motion parameters is changed, the possible prediction picture segment should be formed again. In addition, rotation and scaling of an object produces non-integer pel values. Thus, the operations expressed in equation (6) are repeated over and over again during the affine motion parameters search. Consequently, the affine motion parameters search is very tedious and time-consuming.

As another motion compensation method using block matching for applying a simple enlarged or reduced picture, Japanese Unexamined Patent Publication No. HEI6-153185 discloses a motion compensator and an encoder utilizing the above motion compensation method. In this method, a reference picture portion included in a frame memory is reduced or enlarged by a thin-out circuit or interpolator, and then a motion vector indicating the above reduction or enlargement is detected. In this configuration, a fixed block is extracted from the reference picture portion to perform an interpolation or a thin-out operation, instead of a complex arithmetic operation such as required by a motion compensation method using affine motion model. Namely, after implementing a predetermined process on an extracted fixed picture portion, the extracted picture portion is compared with an input picture. The process is a simple and fixed one, so that this method can be applied only to a motion prediction of a picture such as simple reduction or enlargement of an input picture.

The conventional motion compensated prediction methods are constituted and implemented as described above.

In the first conventional motion compensated prediction method using block matching, formation of a prediction picture portion is implemented by translational motion of a macroblock from a reference picture. Thus, the process itself is simple. However, in this process, only the translational displacement of an object can be predicted, and prediction performance deteriorates when rotation, scaling up and down, or zooming of the object are involved in the motion.

On the other hand, in the second conventional motion compensated prediction method using the affine motion model, a prediction picture segment is formed using the affine motion model. Thus, when the motion of an object involves the more complicated types of motion such as rotation, this method can be applied. However, the operations needed for implementing the process according to this method are very complex and such a motion compensated predictor must be provided with a complex circuit having a large number of units.

In general, as the motion compensated prediction process becomes more simplified, prediction often becomes less accurate. In contrast, the motion compensated prediction using the affine motion model increases prediction accuracy at the expense of more complex and tedious operations.

As for a decoder, any concrete method performing a complex process with a conventional configuration has not been proposed.

SUMMARY OF THE INVENTION

According to an embodiment of the invention, a video decoding method for decoding a bitstream of video data is provided. The method comprising the following steps: information receiving step for receiving information of a position of picture portion to which motion compensation is applied and information of a number of corresponding motion vectors and each value of the corresponding motion vectors, characterized by corresponding pel determining step for computing a prediction picture sample pel position corresponding to each pel within said position of picture portion in case that the number of corresponding motion vectors is three, using following procedure: transforming a left upper corner coordinate value of a circumscribing rectangle within said picture portion by using a first motion vector received, obtaining a provisional right upper corner coordinate value of the circumscribing rectangle by extending to make the distance between said left upper corner coordinate and the provisional right upper corner coordinate be power of 2, transforming said provisional right upper corner coordinate value based on a second motion vector received, and obtaining a first virtual coordinate value as a result, obtaining a provisional left lower corner coordinate value of the circumscribing rectangle by extending to make the distance between said left upper corner coordinate and the provisional left lower corner coordinate be power of 2, transforming said provisional left lower corner coordinate based on a third motion vector received, and obtaining a second virtual coordinate value as a result, obtaining a transformation equation having the transformed coordinate values including the first virtual coordinate value and the second virtual coordinate value in a numerator and a distance from said left upper corner coordinate value to said provisional right upper corner coordinate value and a distance from said left upper corner coordinate value to said provisional left lower corner coordinate value in a denominator and computing a pel position based on bit shifting operation for division by using the transformation equation having the numerator and the denominator.

BRIEF DESCRIPTION OF THE DRAWINGS

FIG. 22 is a explanatory drawing showing a filtering operation of integer pels constituting a prediction picture portion according to the sixth embodiment.

DETAILED DESCRIPTION OF THE INVENTION

Embodiment 1

A video encoder and a video decoder according to the present invention may be used in, for example, a digital video transmitting system, a digital video recording apparatus, a digital video storage data base, or a digital video retrieval and reading system using a satellite, ground wave, or priority communication network.

Figure 1:
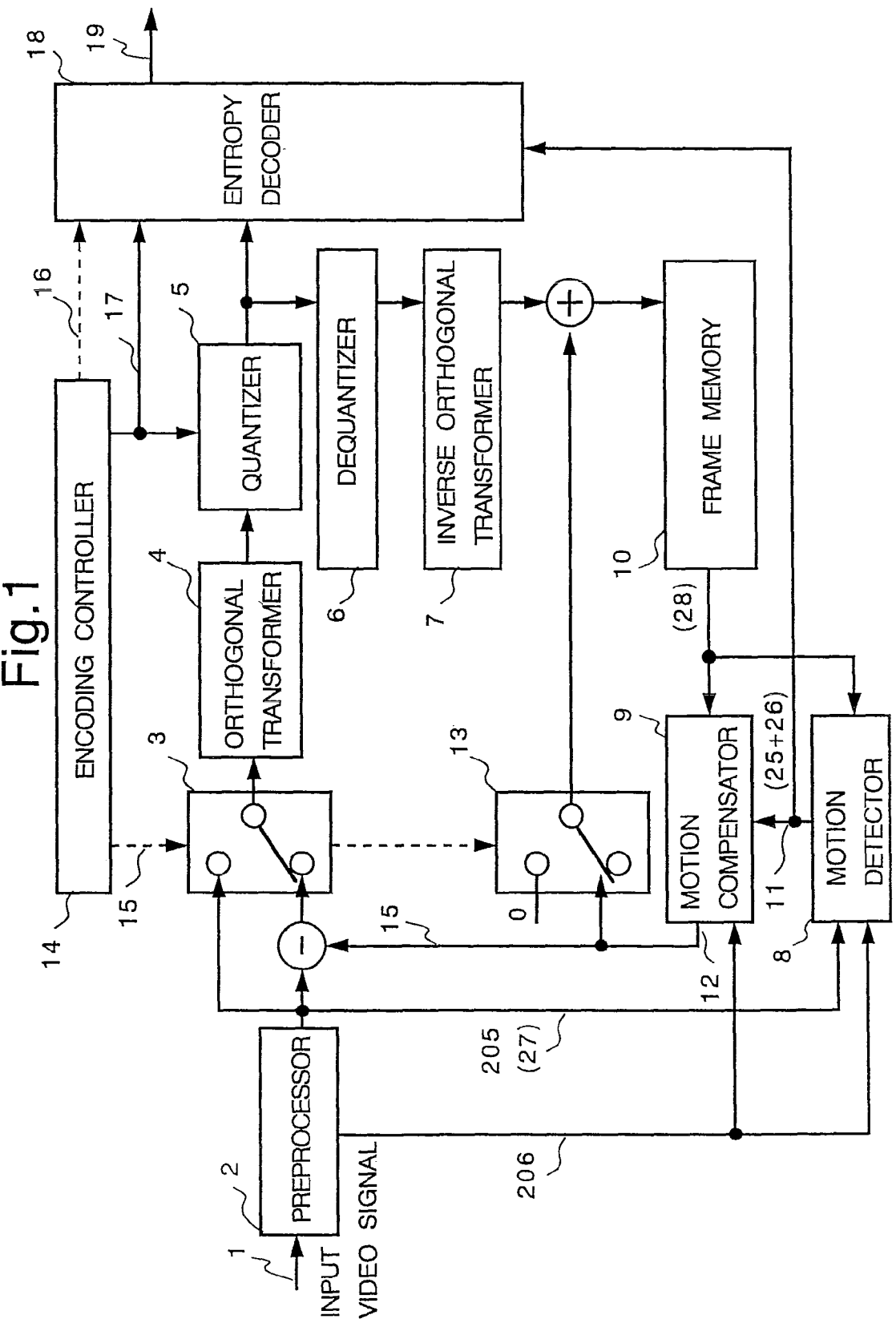
FIG. 1 is a block diagram showing a basic configuration of a video encoder according to the present invention.

FIG. 1 shows a basic configuration of a video encoder.

Referring to the figure, reference numeral 1 is an input digital video signal, reference numeral 2 is a preprocessor, reference numerals 3 and 13 are intra-/interframe (inside of the frame/between the frames) encoding selectors, 4 is an orthogonal transformer, 5 is a quantizer, 6 is a dequantizer, 7 is an inverse orthogonal transformer, 8 is a motion detector, 9 is a motion compensator, 10 is a frame memory (reference picture (image)), 11 indicates motion parameters including the motion vector, 12 is prediction picture (image) data, 14 is an encoding controller, 15 is a mode selection prompting flag, 16 is an intra-/interframe encoding indication flag, 17 is a quantizing step parameter, and reference numeral 18 is an entropy encoder, 19 is a compression video data. The essential elements of the present invention are the motion detector 8 and the motion compensator 9.

The operation of a video encoder according to the first embodiment of the present invention will now be described.

The video encoder receives a video signal 1 representing a frame which is a component of a color video sequence. The input video signal 1 is digitized, preprocessed in the preprocessor 2 where it is subjected to format conversion, and separated into block data. It is assumed herein that the separated block data includes a pair of the luminance signal component and color difference signal components spatially correspond thereto. From now on, the luminance signal component will be referred to as a luminance block, while the color difference signal component will be referred to as a color difference block.

Next, the intra-/interframe encoding selector 3 determines whether each block data is subject to intraframe encoding or interframe encoding. When intraframe (inside of the frame) encoding has been selected, the block data representing input original picture (image) data supplied from the preprocessor 2 is supplied to the orthogonal transformer 4. On the other hand, when interframe (between the frames) encoding has been selected, prediction error block data, which is a difference between the input original picture data 1 supplied from the preprocessor 2 and the prediction picture data 12 supplied from the motion compensator 9, is supplied to the orthogonal transformer 4. This mode selection between the intraframe encoding and the interframe encoding may be implemented by the mode selection prompting flag 15 conditioned by the command of the encoding controller 14. The selected encoding mode is transmitted to the entropy encoder 18 in the form of the intra-/interframe encoding indication flag 16 and multiplexed onto an encoded bitstream 19.

The orthogonal transformer 4 uses an orthogonal transform such as Discrete Cosine Transform (DCT). The orthogonal transforming coefficient is quantized by the quantizer 5 by using the quantizing step parameter 17 prepared by the encoding controller 14. Then, the redundancy of the quantized orthogonal transforming coefficient is reduced through the entropy encoder 18 and multiplexed onto the encoded bitstream 19. At the same time, the quantized coefficient is dequantized by dequantizer 6 and is further subjected to the inverse orthogonal transformation through the inverse orthogonal transformer 7 such that the prediction error signal is restored. A local, decoded picture is generated by adding the restored prediction error signal to the prediction picture data 12 supplied from the motion compensator 9. When the intra-/interframe encoding indication flag 16 indicates the intraframe encoding mode, the zero signal will be selected via the encoding selector 13, and the prediction error signal will not be added to the prediction picture data. The local, decoded picture is used as a reference picture in motion compensated prediction for subsequent frames. Consequently, the local, decoded picture data are written into the frame memory 10.

Now, the motion compensated prediction method and apparatus, which is one of the important features of this embodiment, will be described.

In this embodiment, it is assumed that block data separated by the preprocessor 2 is subjected to motion compensated prediction. The motion compensated prediction process is implemented by the motion detector and the motion compensator 9. Then, in the motion detector 8, the motion parameters 11 including the motion vector for the block subject to the motion compensated prediction are detected. The motion compensator 9 uses the motion parameters 11 and fetches the prediction picture data 12 from the frame memory 10. The motion detection process is implemented by using luminance blocks. The motion compensated prediction for color difference blocks uses the motion detected result of the luminance blocks. Now, a description will be directed to the motion compensated prediction for luminance blocks alone.

First, the motion detection process will be described.

The motion detector 8 implements the motion detection process. The motion detector 8 searches within a predetermined reference picture range for a picture portion that is most similar to an input picture luminance block. Then, the parameters representing the change of the input picture block on the display are detected. In the conventional block matching method which has been described above in the conventional related art, a block which is most similar to an input picture luminance block is searched. Then, the translational displacement of the input picture block on the display is detected in the form of the motion vector.

The motion detector 8 according to this embodiment implements both conventional block matching using square blocks and block matching using transformed blocks which will be described later. The motion detector 8 selects data exhibiting the higher prediction accuracy obtained by using conventional block matching or transformed block matching.

Now, the operation of the motion detector 8 according to this embodiment will be described.

Figure 2:
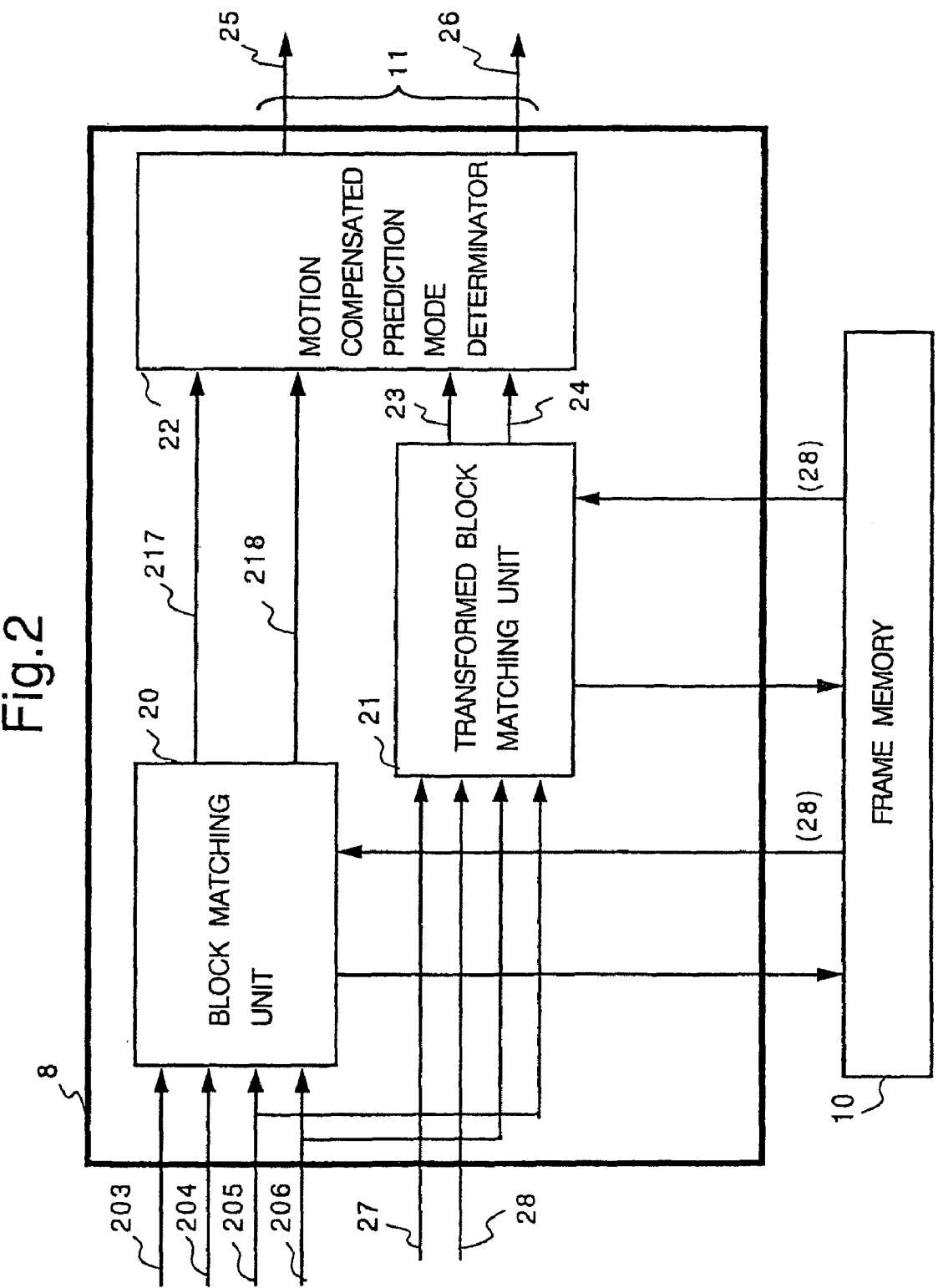
FIG. 2 is a block diagram showing an internal configuration of a motion detector 8 illustrated in FIG. 1.
Figure 3:
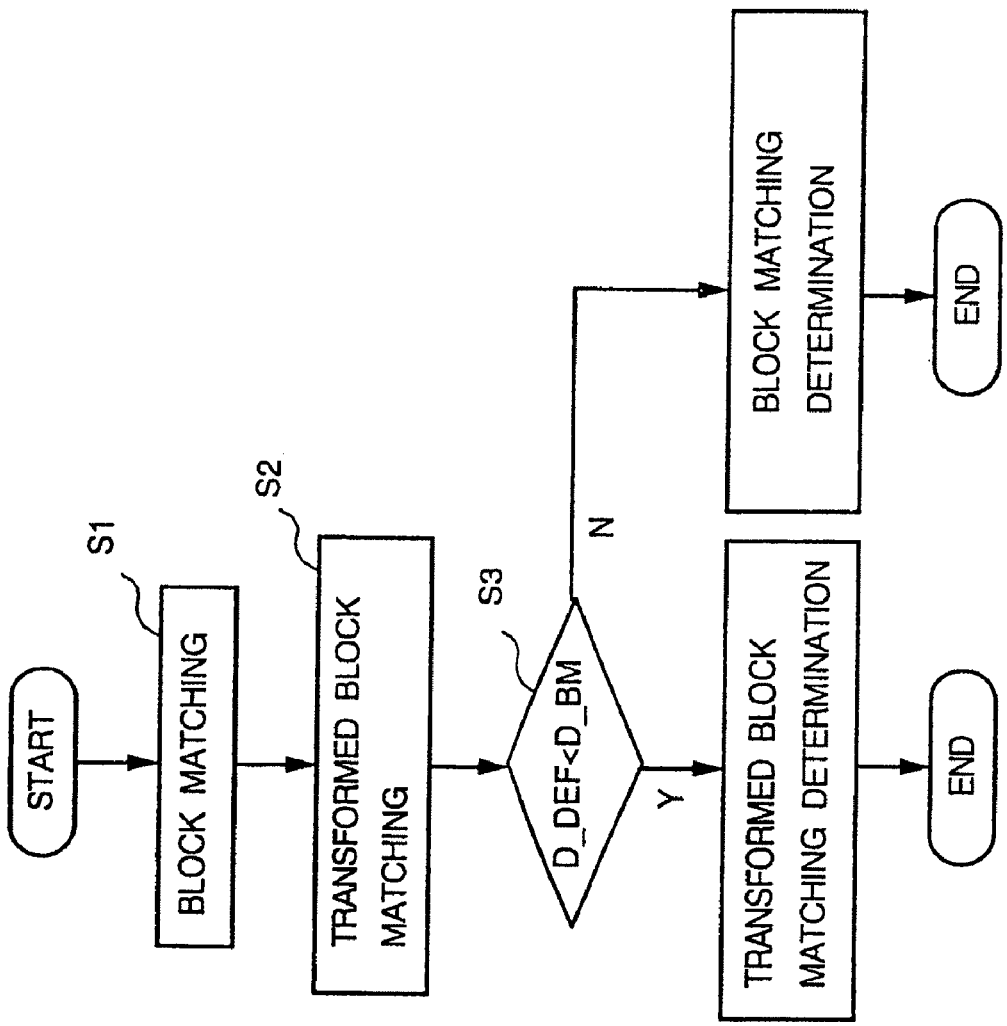
FIG. 3 is a flow chart showing operations of the motion detector 8 configured as shown in FIG. 2.

FIG. 2 is a block diagram showing a detailed configuration of the motion detector 8 illustrated in FIG. 1. FIG. 3 is a flow chart showing the operations of the motion detector 8.

Referring to FIG. 2, reference numeral 20 is a block matching unit, reference numeral 21 is a transformed block matching unit, 22 is a motion compensated prediction mode determinator, 23 is a motion vector obtained by implementing transformed block matching, 24 is the minimum prediction error produced by implementing transformed block matching, 25 is a final motion vector, and reference numeral 26 is a motion compensated prediction mode indication signal. It is assumed herein that the final motion vector 25 and the motion compensated prediction mode indication signal 26 are both included within the motion parameters 11.

Figure 43:
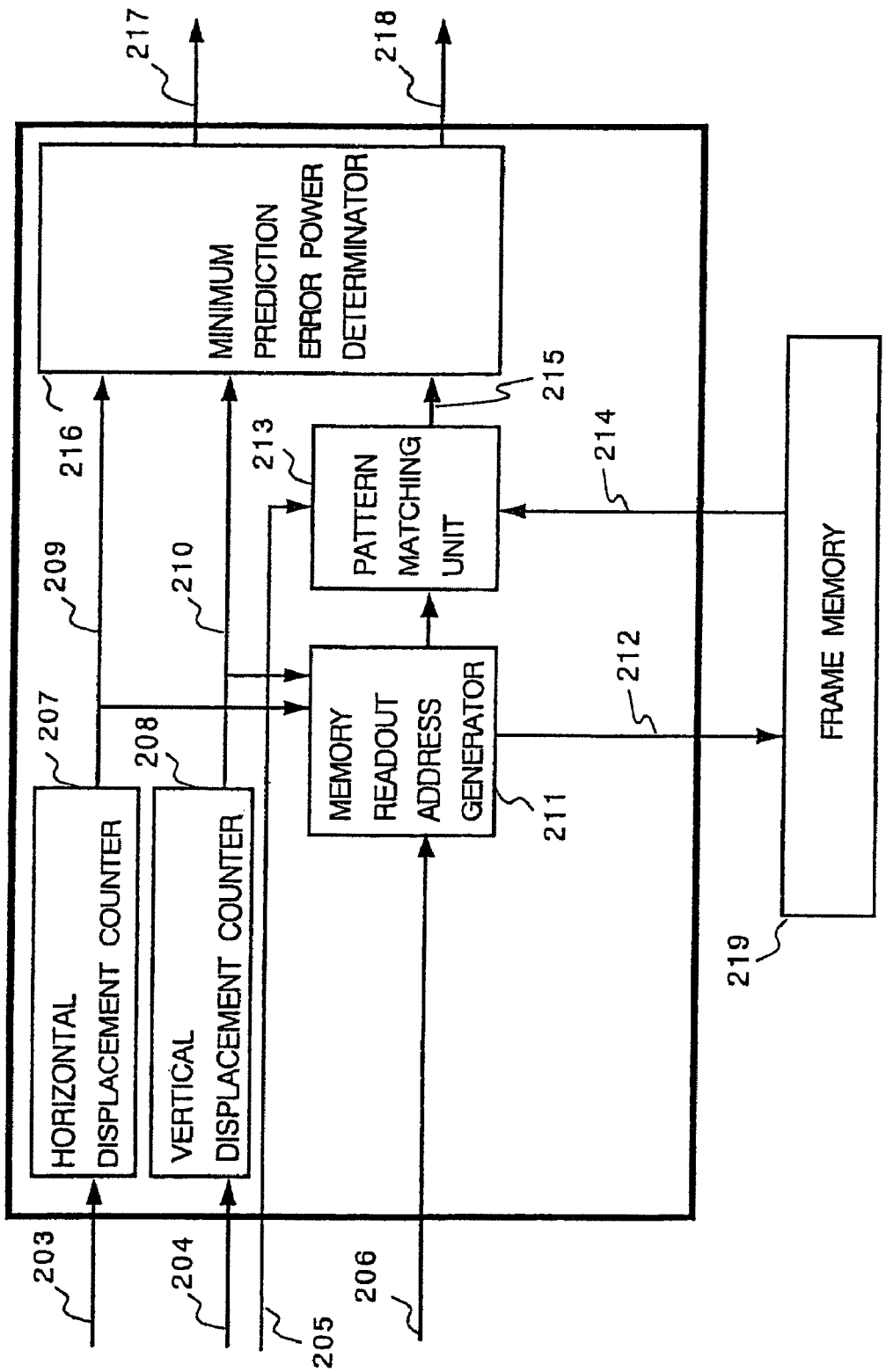
FIG. 43 is a block diagram showing a configuration of a motion compensated predictor (block matching section) of a video encoder according to the first conventional related art.
Figure 44:
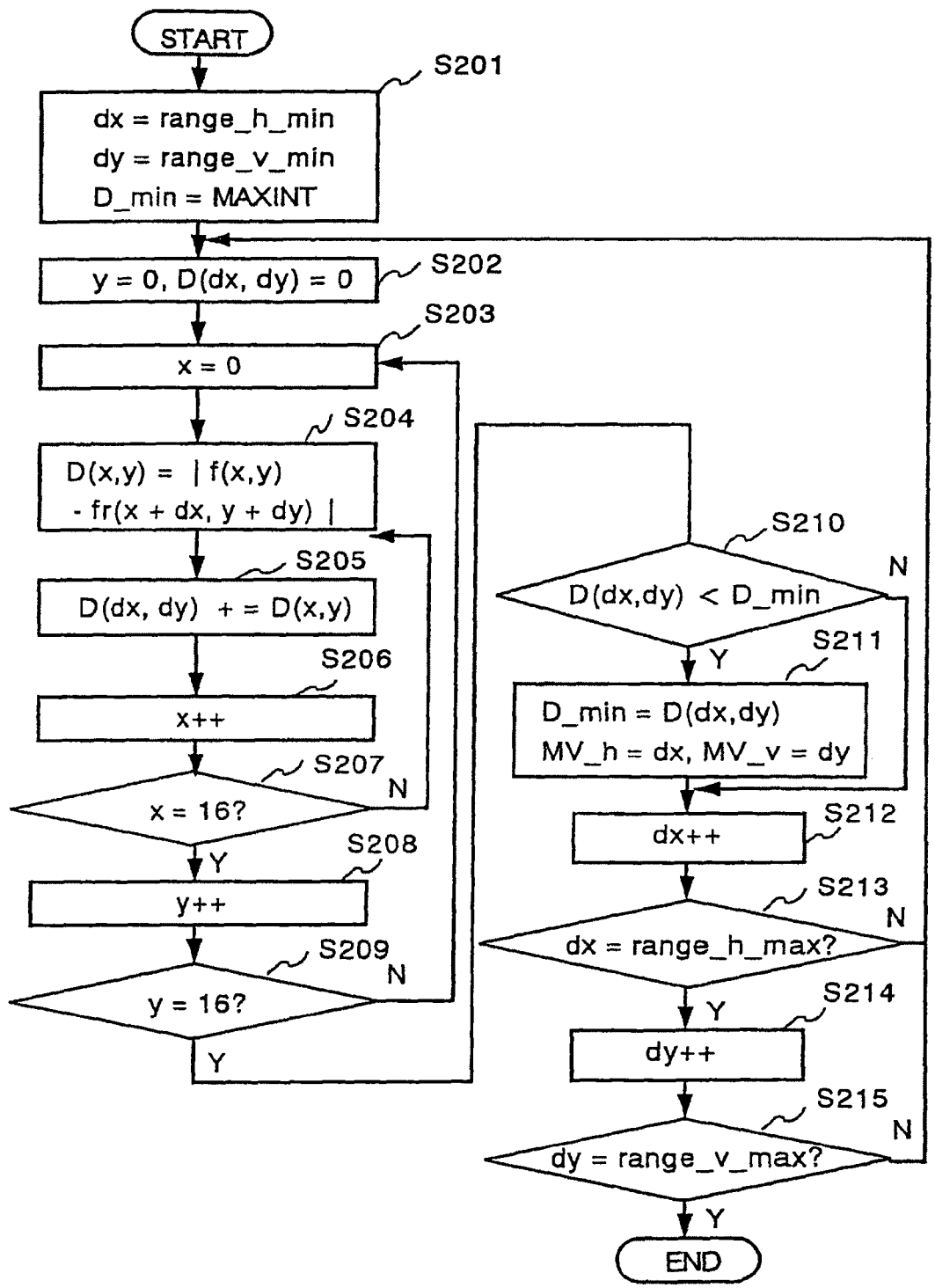
FIG. 44 is a flow chart showing operations of the motion compensator according to the first conventional related art.
Figure 45:
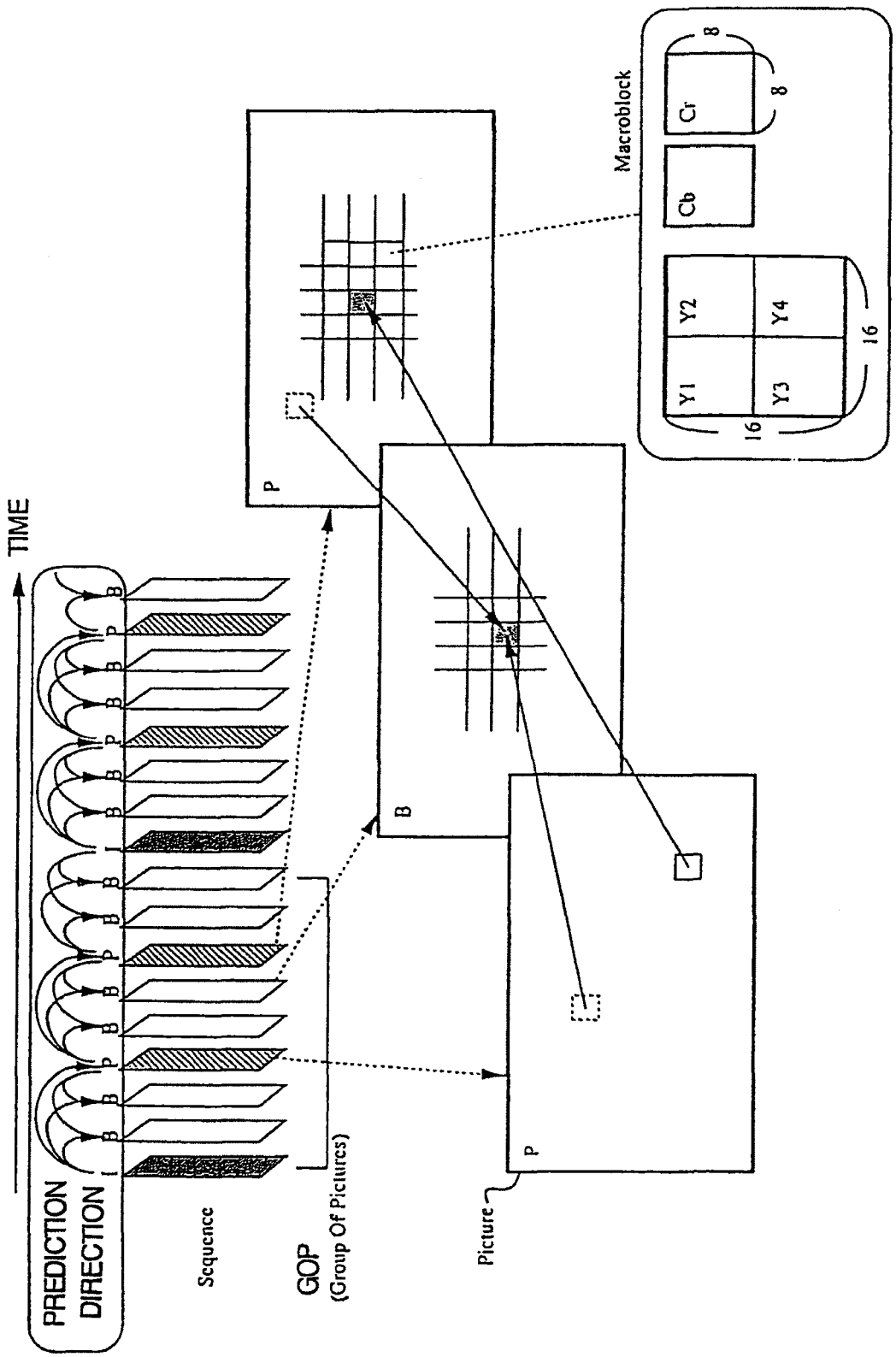
FIG. 45 is a combination of explanatory drawings which describe a motion compensated prediction method used in the MPEG1 video standard.
Figure 46:
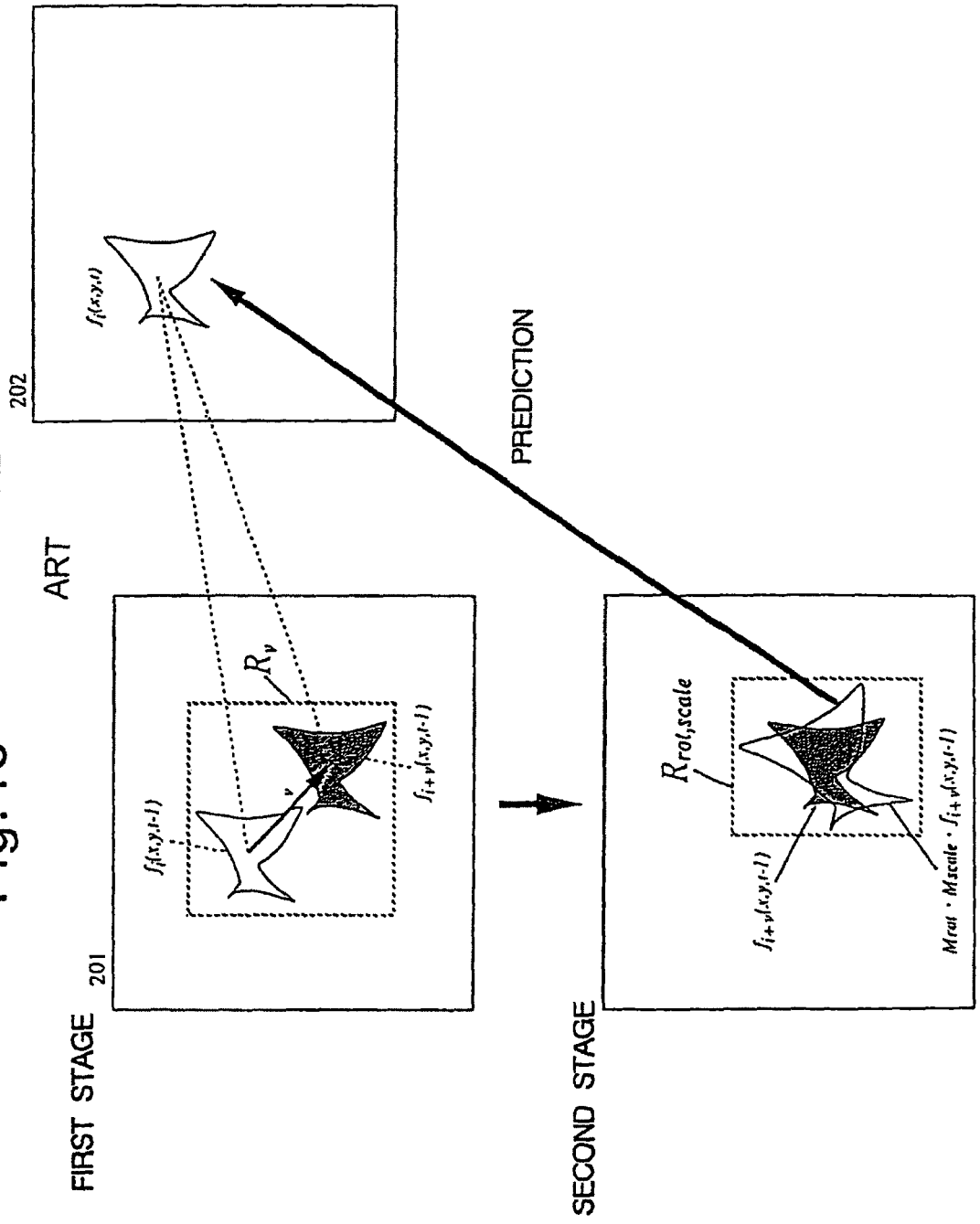
FIG. 46 is a combination of explanatory drawings which describe a concept of motion compensated prediction using an affine motion model according to a second conventional related art.

The internal configuration of the block matching unit 20 and the flow chart showing the operations of the block matching unit 20 are as illustrated in FIGS. 43 and 44 showing the conventional block matching unit. In FIG. 3, D_BM represents the minimum prediction error produced by implementing block matching, and D_DEF represents the minimum prediction error produced by implementing transformed block matching.

Figure 4:
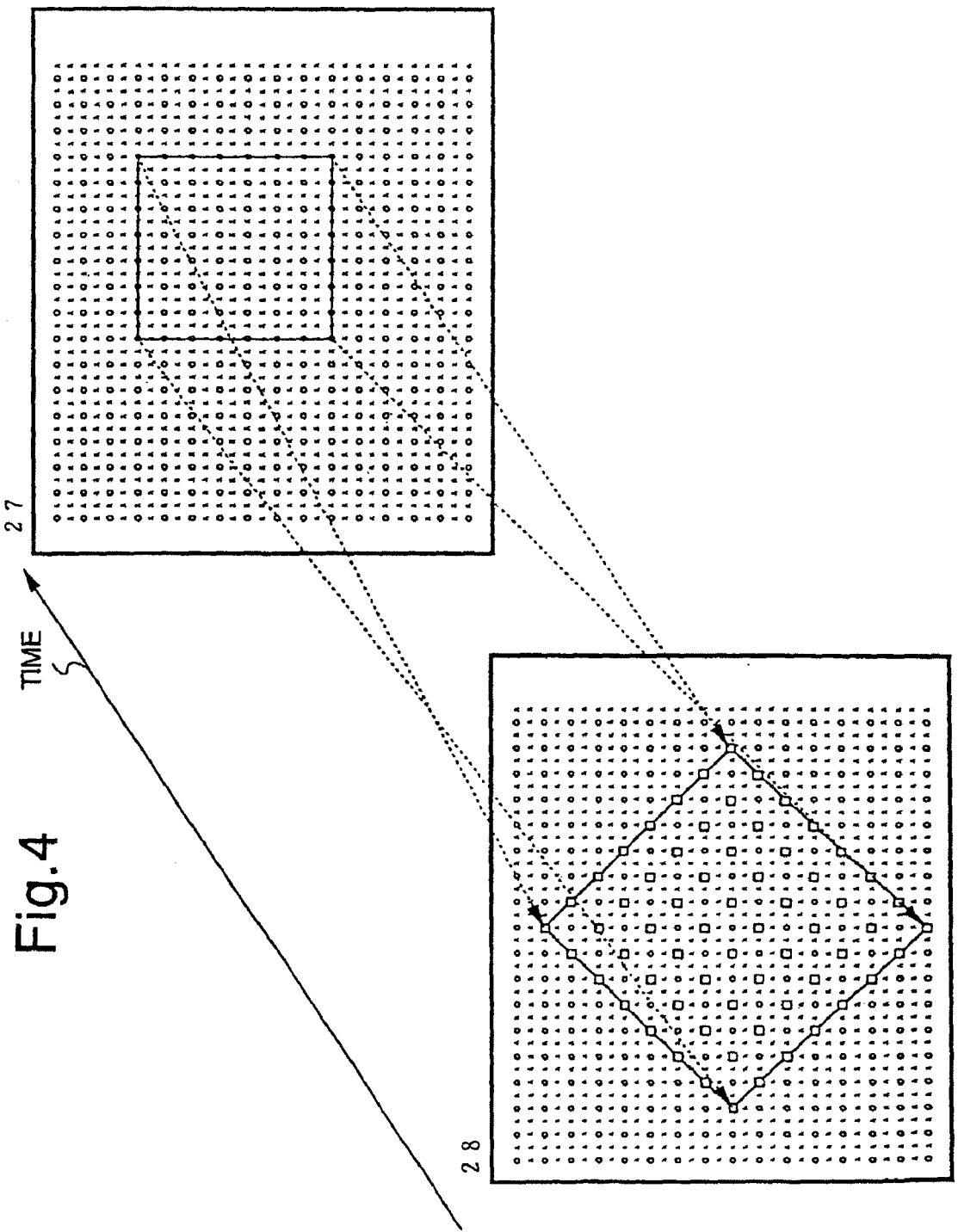
FIG. 4 is a combination of explanatory drawings which describe an operation outline of a transformed block matching unit 21 according to a first embodiment of the invention.
Figure 5:
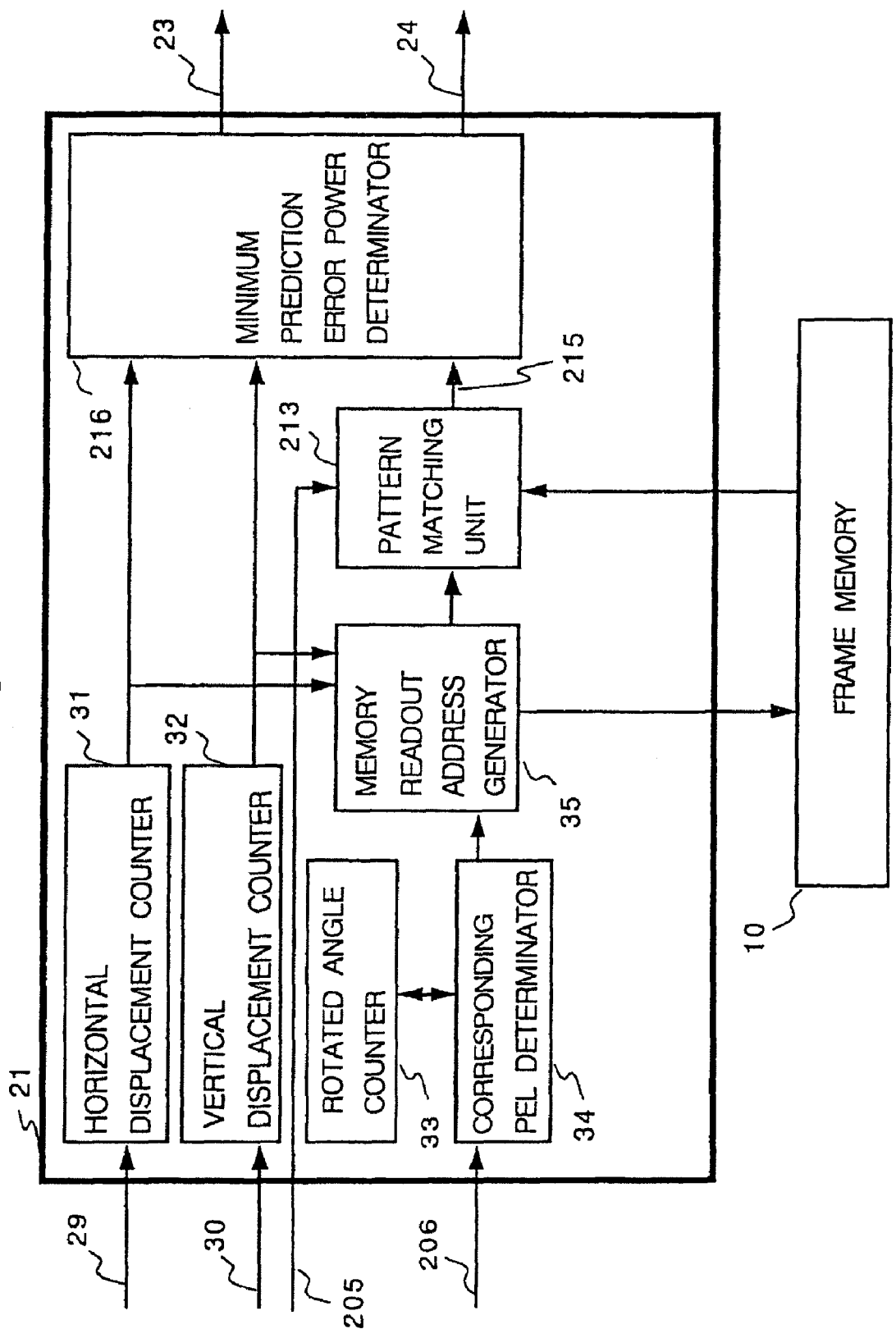
FIG. 5 is a block diagram showing an internal configuration of the transformed block matching unit 21.
Figure 6:
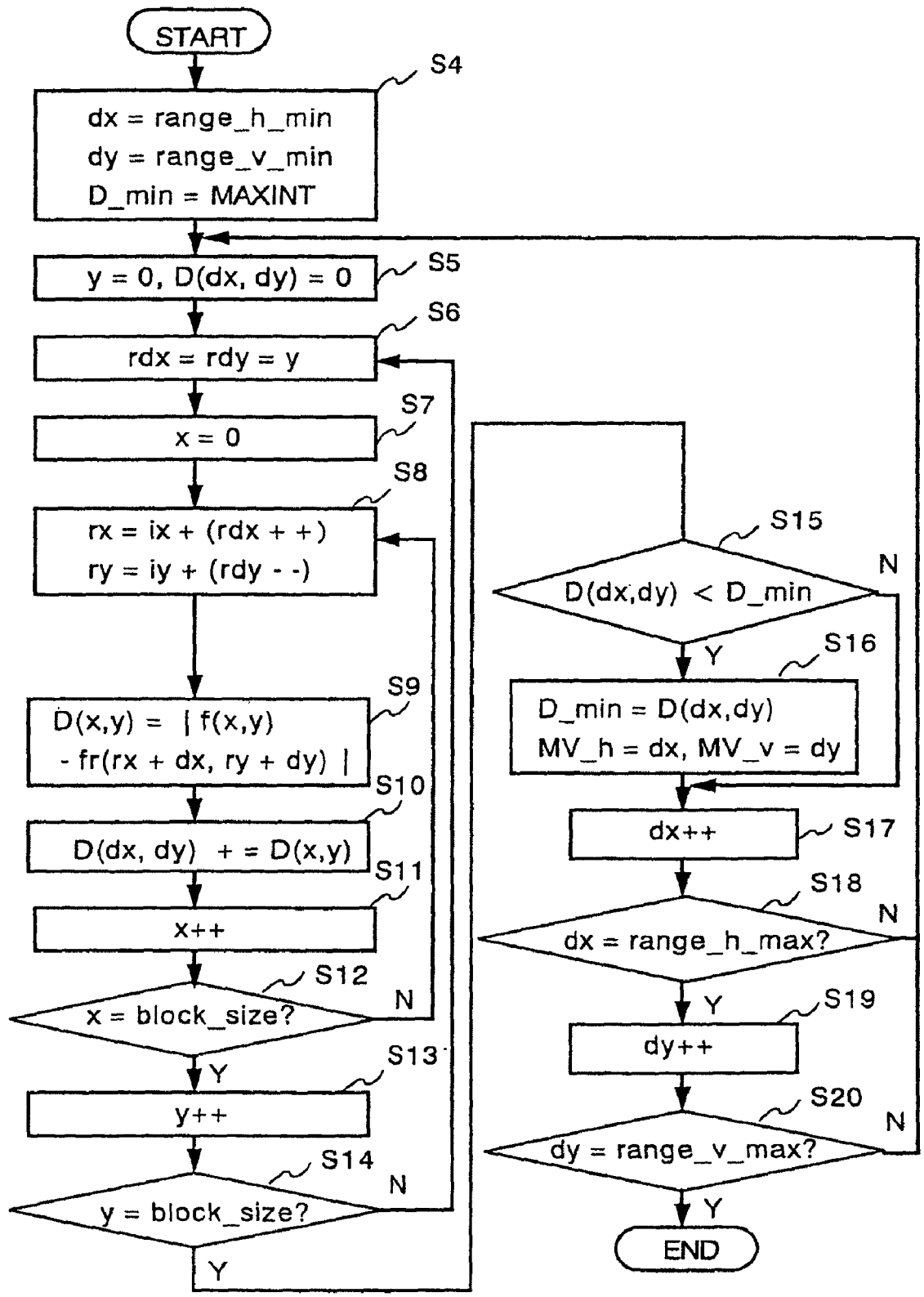
FIG. 6 is a flow chart showing operations of the transformed block matching unit 21.

FIG. 4 is a combination of explanatory drawings which describe an operational outline of the transformed block matching unit 21 which is one of the most essential structural elements of the present invention. FIG. 5 is a block diagram showing a detailed internal configuration of the transformed block matching unit 21. FIG. 6 is a flow chart showing the operations of the transformed block matching unit 21.

Figure 47:
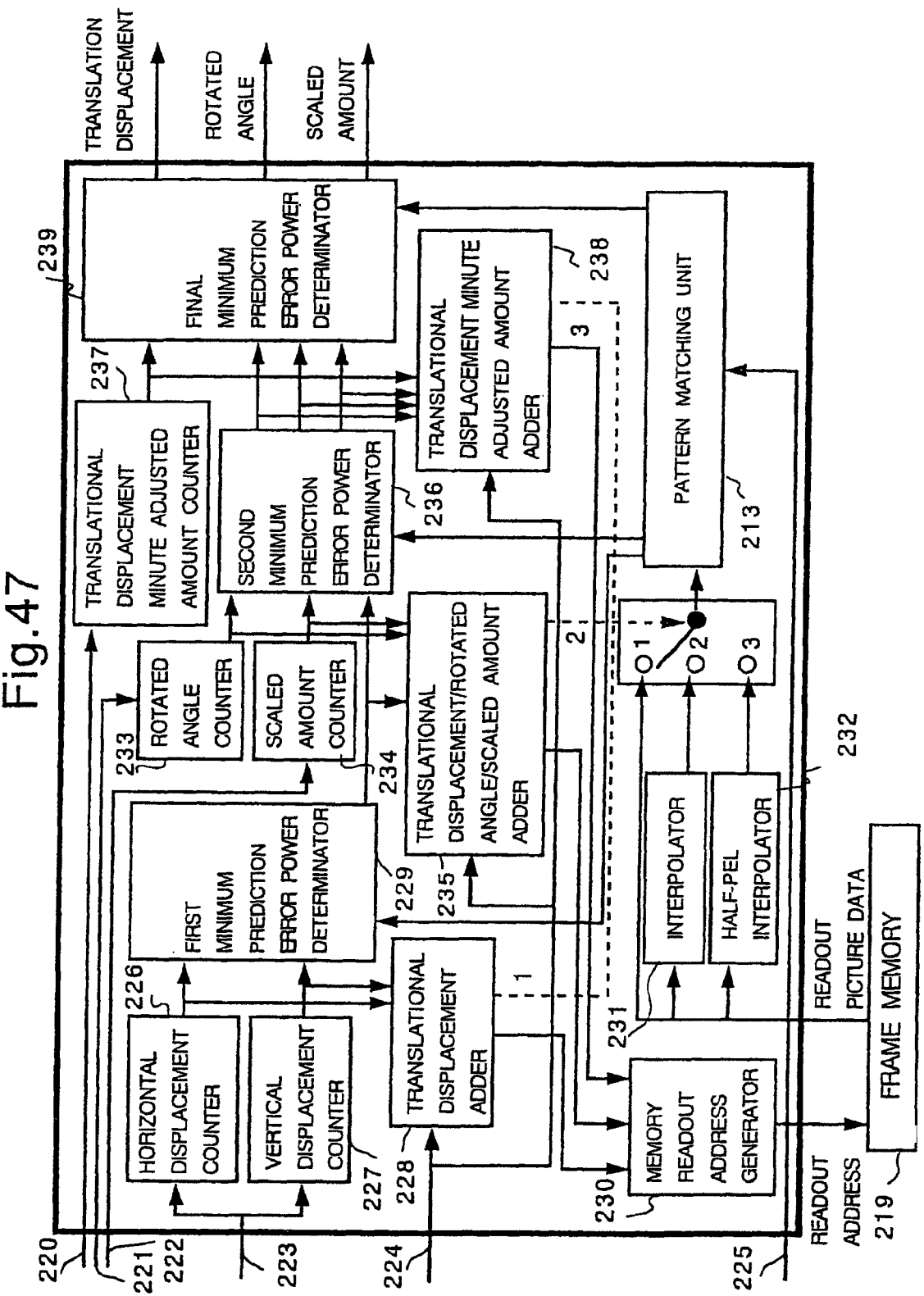
FIG. 47 is a block diagram showing a configuration of a motion compensator for performing motion compensated prediction using the affine motion model according to the second conventional related art.
Figure 48:
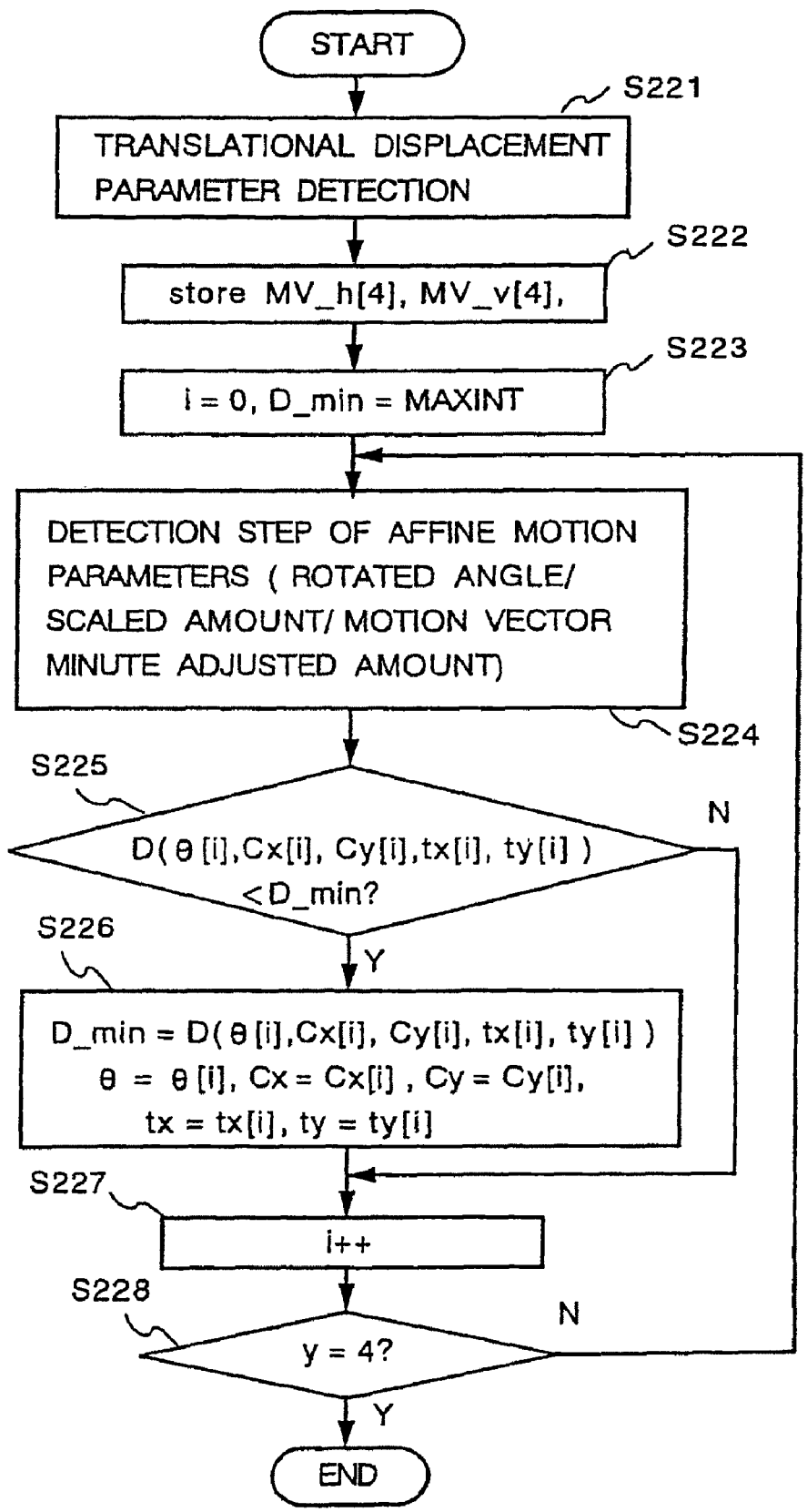
FIG. 48 is a flow chart showing operations of the motion compensated predictor according to the second conventional related art.
Figure 49:
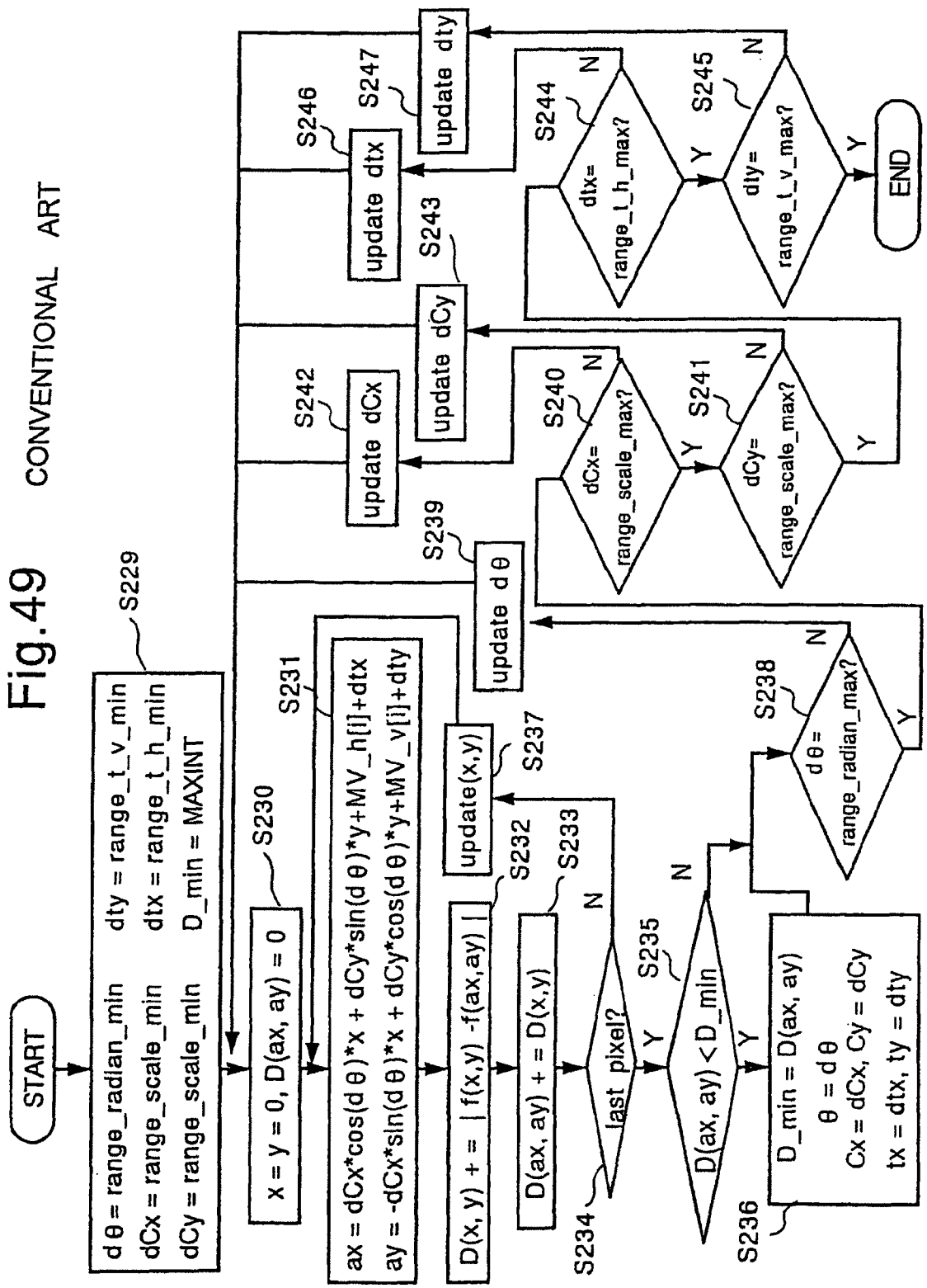
FIG. 49 is a flow chart showing details of an affine motion parameters detection step illustrated in FIG. 48.
Figure 50:
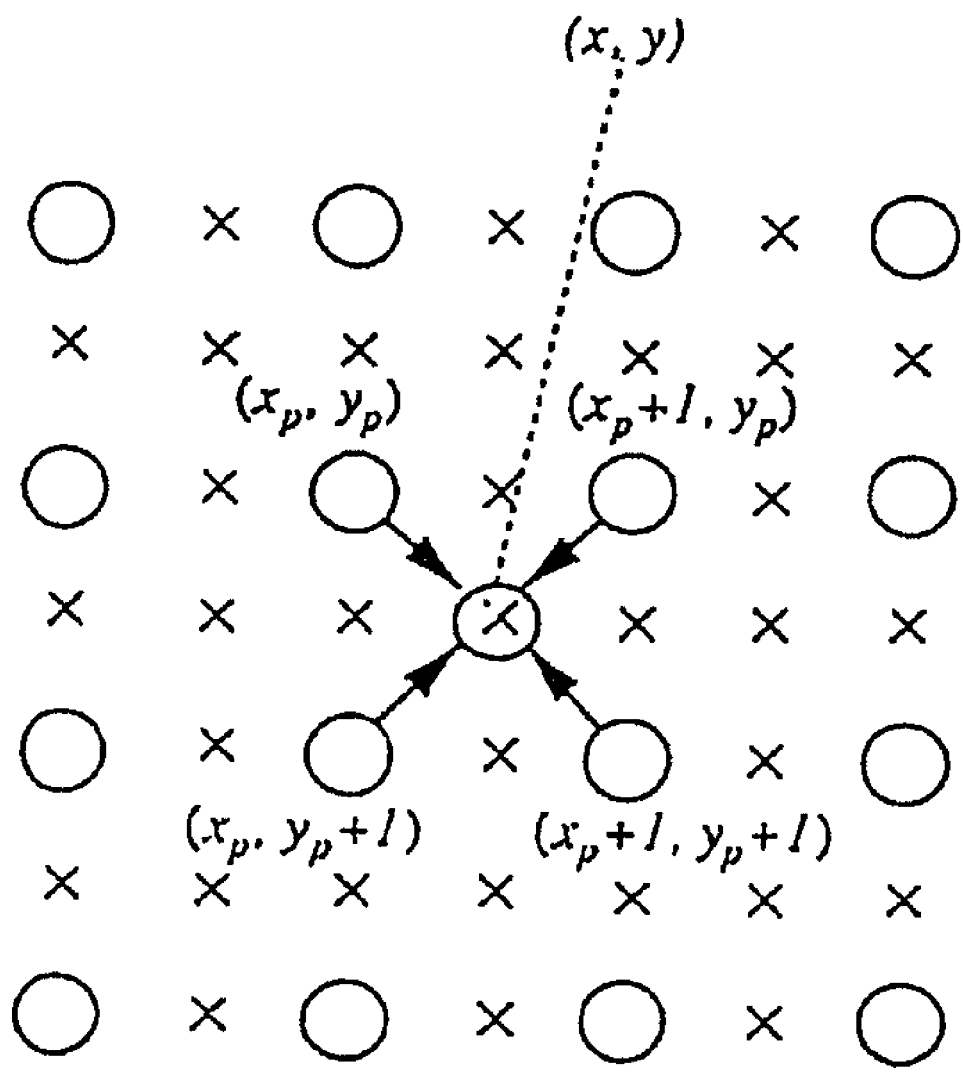
FIG. 50 is a explanatory drawing showing half-pel interpolation implemented by a half-pel interpolater 232.
Figure 51:
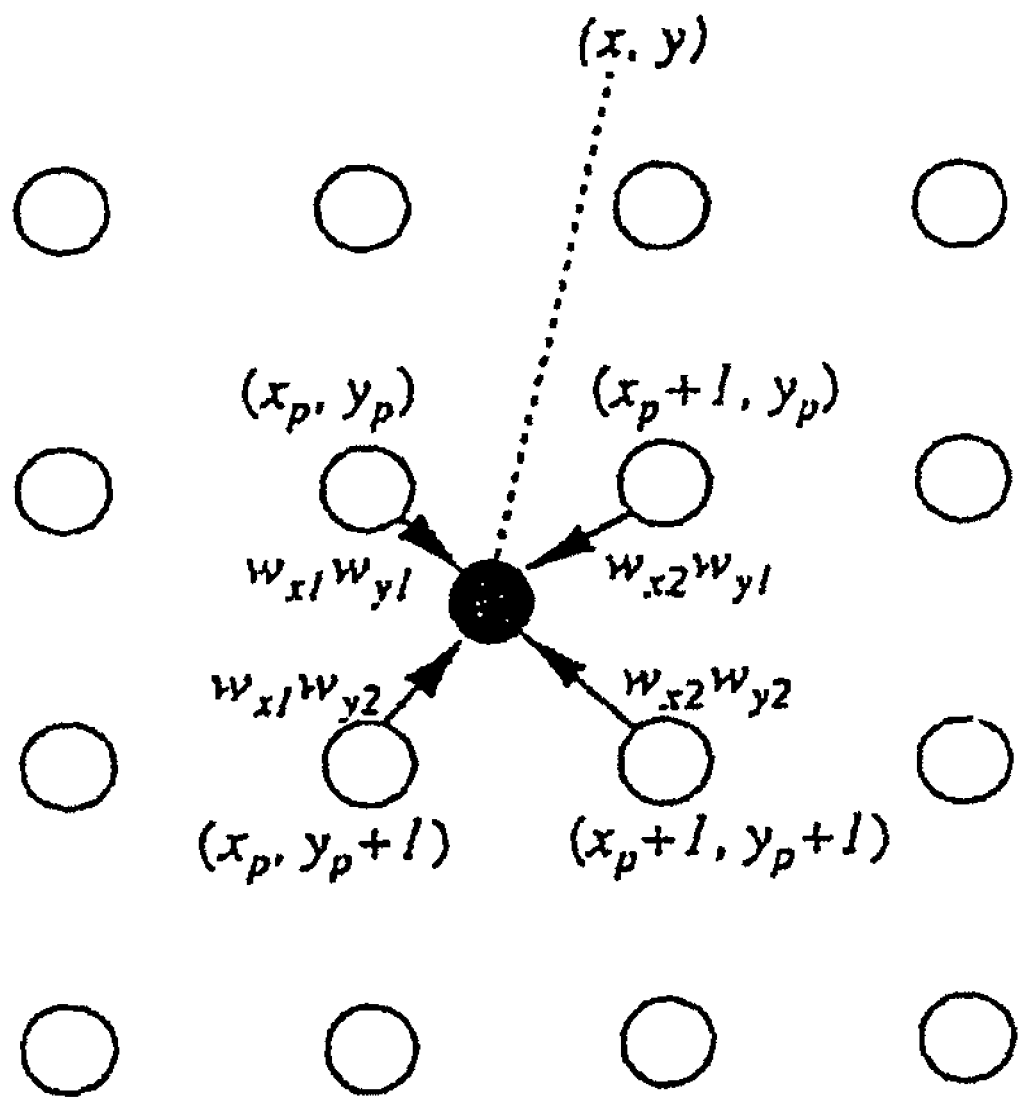
FIG. 51 is a explanatory drawing which describes a non-integer pel interpolation method at a rotated angle/scaled amount search step executed by an interpolator 231.

Referring to FIG. 5, reference numeral 29 is a horizontal displacement search range indication signal, reference numeral 30 is a vertical displacement search range indication signal, 31 is a horizontal displacement counter, 32 is a vertical displacement counter, 33 is a rotated angle counter, 34 is a corresponding pel determinator, and reference numeral 35 is a memory readout address generator. The pattern matching unit 213 and the minimum prediction error power determinator 216 perform the same operations as those of the corresponding structural elements illustrated in FIG. 47.

Referring to FIG. 6, dx represents a horizontal displacement search pel point;

dy represents a vertical displacement search pel point;

range_h_min represents a lower limit within a horizontal search range;

range_h_max represents an upper limit within the horizontal search range;

range_v_min represents a lower limit within a vertical search range;

range_v_max represents an upper limit within the vertical search range;

D_min represents the minimum prediction error power;

D(dx, dy) is prediction error power produced when dx and dy are searched;

(x, y) represents the position of a pel in an input picture block;

(rx, ry) represents a pel in a reference picture corresponding to the pel (x, y);

(rdx, rdy) are rotated angle parameters;

D(dx, dy) represents a prediction error for the pel (x, y) when dx and dy are searched;

f(x, y) represents the value of the pel (x, y) in the input picture;

fr(x, y) represents the value of the pel (rx, ry) in the reference picture;

MV_h represents a motion vector horizontal component;

MV_v represents a motion vector vertical component;

ix represents an offset value for horizontal displacement (constant);

iy represents an offset value for vertical displacement (constant); and block_size represents the size of the input picture block.

1) Motion Vector Detection by Using Block Matching

The motion vector for the input picture block is determined through the block matching unit 20 by using the procedures and the operations described hereinbefore in relation to the conventional art. Consequently, the motion vector 217 and the minimum prediction error power D_BM 218 to be supplied from the block matching unit 20 are obtained. These operations correspond to step S1 in FIG. 3.

2) Motion Vector Detection by Using Transformed Block Matching

Then, the transformed block matching process is implemented through the transformed block matching unit 21 (step S2 in FIG. 3).

Now, the transformed block matching process will be described in more detail. It is assumed herein that an input picture block which includes 8×8 integer pels is used as a unit for implementing the transformed block matching process.

2-1) Operation Outline

FIG. 4 shows an outline of the transformed block matching process implemented by the transformed block matching unit 21.

Referring to the figure, an input picture 27 is encoded by using motion compensated prediction. For example, a frame (picture) within the preprocessor 2, that is, a reference picture 28 is a local decoded frame (picture) which had been encoded prior to the input picture 27 and stored in the frame memory 10. ○ represents a real sample integer pel in a frame portion represented by the luminance signal, x represents a half-pel interposed midway between the real sample integer pels. Herein, (the luminance block of) the input picture block is a picture portion including 8×8 (integer pels) in the input picture 27, while the transformed block is a picture portion including □ pels in the reference picture 28 of possible prediction picture. The output of the frame memory 10 and the output of the preprocessor 2, both of which are indicated by parenthesized reference numerals in FIGS. 1 and 2, are extracted and supplied to the transformed block matching unit 21 in the motion detector 8 and compared.

In this embodiment, a transformed block is defined to be a picture portion rotated 45 degrees clockwise or counterclockwise relative to the luminance block of the reference picture and having four sides $\sqrt{2}$ times scaled up from the sides of the input picture block. That is, a length of the reference picture block becomes $1/\sqrt{2}$ times of the length of the input picture. Intervals of the pels within the reference picture block becomes identical to horizontal/vertical length of intervals of the sample points of the input digital picture 1 of the frame. The transformed block in this embodiment includes only integer pels from the reference picture 28. Namely, transformed block matching according to this embodiment is a process for finding, within a given search range, a transformed block that is most similar to the luminance block of the input picture block including 8×8 integer pels in the reference picture 28 as shown in FIG. 4.

2-2) Initial Settings (Transformed Block Search Range Setting, Initial Value Setting)

Because an input picture block has a different shape than a possible prediction picture portion, it is necessary to specify the starting point of the motion vector to be detected. Namely, a one-to-one correspondence is established in advance between the integer pels constituting the input picture luminance block and the integer pels constituting a transformed block within a prediction picture portion.

Herein, as shown in the dotted arrows in FIG. 4, the integer pel at the upper left corner of an input picture block is made to correspond to the integer pel at the left top of a transformed block. In other words, the possible prediction picture portion is a picture portion rotated 45 degrees clockwise relative to the transformed block within the reference picture 28 and having four sides $1/\sqrt{2}$ scaled down with respect to the sides of the transformed block. A change in this correspondence will lead to a change in the rotated direction of the possible prediction picture portion. In addition, because this one-to-one correspondence is also established between the integer pels of the input picture block and the integer pels of the possible prediction picture portion, motion detection similar to that implemented by using block matching can be performed.

Namely, a shape for extracting picture portion of the reference picture 28 in FIG. 4 is patternized for block matching and indicated by a predetermined address (pel position) comprised of only integer pels. The difference between the pel of the address and the pel included in the input picture 27 corresponding to the pels of an original picture data is accumulated to determine a minimum prediction error power. Consequently, block matching is implemented only by indicating the address without complex operation, which enables a high-speed block matching. Furthermore, by providing a various addressing (indicating pel position), an indication can be flexible to extract the reference picture portion such as rotating, combination of rotating and enlarging or reducing other than simply enlarging, reducing.

More specifically, a transformed block search range for implementing transformed block matching is set in the horizontal displacement counter 31 and the vertical displacement counter 32 through the horizontal displacement search range indication signal 29 and the vertical displacement search range indication signal 30. Then, in the minimum prediction error power determinator 216, the minimum prediction error power D_min is set to a maximum integer value MAXINT (0xFFFFFFFF, for example). These operations correspond to step S4 in FIG. 6.

2-3) Block Transformation Parameters Setting

In this embodiment, rdx and rdy shown in steps S6 and S8 in FIG. 6 will be used as block transformation parameters. The setting of these parameters is implemented by the rotated angle counter 33 such that the block to be transformed within the reference picture illustrated in FIG. 4 is rotated 45 degrees clockwise. The value of y is regarded as the initial value of rdx or rdy. Then, each time x is incremented, rdx is incremented, and rdy is decremented. These operations correspond to steps S6 through S8 in FIG. 6. The setting in this way is implemented such that the block to be transformed is rotated clockwise. If the setting is done as rdy=−y at step S6, and ry=iy+(rdy++) at step S8, the block to be transformed will be rotated counterclockwise. The operation of step S8 can be also represented as rx=ix+(rdx+1) and ry=iy+(rdy−1).

Namely, an addressing of pels to be extracted from the reference picture 28 is indicated at step S8. An address of integer pels rotated 45 degrees clockwise is indicated as next pels rx, ry. At step S12, this operation is repeated until addressing of the pel equals to block size of x, and is also repeated until addressing of the pel equals to block size of y at step S14. In this way, a prediction error of the pel extracted by addressing at step S8 is detected at step S9, and the error is accumulated at step S10. As shown in the operation flow of FIG. 6, no computation is needed, and high-speed processing can be performed. The operation of step S10 can be also represented as D(dx,dy)=D(dx,dy)+D(x,y). Similarly, the operations of steps S11, S13, S17 and S19 are represented as x=x+1, y=y+1.

This can be also said in flowcharts which will be described hereinafter.

2-4) Possible Prediction Picture Portion Readout Operation

First, the reference picture portion pel (rx, ry) corresponding to the input picture block pel (x, y) in the input picture luminance block is determined. In other words, the initial positioning correspondence between the integer pels of the input picture block and the integer pels of the possible prediction picture portion shown in FIG. 4 is established. The corresponding pel determinator 34 implements this operation. As shown at step S8 in FIG. 6, rx and ry can be obtained by adding rdx and rdy obtained in 2-3) to the predetermined offset value ix and iy, respectively. Then, data on a reference picture portion pel (rx+dx, ry+dy) is fetched from the frame memory. The memory readout address generator 35, shown in FIG. 5, receives the value of dx from the horizontal displacement counter 31, the value of dy from the vertical displacement counter 32, and the value of rx and ry from the corresponding pel determinator 34 so as to generate the address for the pel (rx+dx, ry+dy) in the frame memory.

2-5) Prediction Error Power Calculation

First, the prediction error power D(dx, dy), produced from the motion vector indicating the pel position (dx, dy), is initialized to zero. This operation corresponds to step S5 in FIG. 6. The absolute value for a difference between the pel value read out in 2-4) and the value of the pel corresponding thereto in the input picture luminance block is accumulated to D(dx, dy). This operation is repeated until the condition x=y=block_size holds (in this case, the operation is repeated until block_size=8 holds). Then, the prediction error power D(dx, dy) produced from the motion vector indicating the pel position (dx, dy) can be obtained. The pattern matching unit 213 illustrated in FIG. 5 implements this operation. The pattern matching unit 213 supplies D(dx, dy) to the minimum prediction error power determinator 216 through the prediction error power signal 215.

These operations correspond to steps S9 through S14 in FIG. 6.

2-6) Minimum Prediction Error Power Updating

It is then determined whether D(dx, dy) obtained in 2-5) has produced the minimum prediction error power among all the searched results that have been obtained so far. The minimum prediction error power determinator 216 illustrated in FIG. 5 makes this determination. This operation corresponds to step S15 in FIG. 6. The minimum prediction error power determinator 216 compares the value of the minimum prediction error power D_min retained therein with the value of D(dx, dy) received through the prediction error power signal 215. If only the value of D(dx, dy) is smaller than D_min, D_min is updated to the value of D(dx, dy). Further, the minimum prediction error power determinator 216 retains the value of (dx, dy) at that time as the possible motion vector (MV_h, MV_v). This updating operation corresponds to step S16 in FIG. 6.

2-7) Motion Vector Value Determination

The above-mentioned operations from 2-2) through 2-6) are repeated for all the search pel points (dx, dy) within the transformed block search range (steps S17 through S20 in FIG. 6). The finally retained (MV_h, MV_v) within the minimum prediction error power determinator 216 are output as the motion vector 23.

As described above, a prediction picture portion which has produced the minimum prediction error power and therefore is most similar to an input picture block is searched. The displacement from the predetermined starting pel point of the selected prediction picture portion as a result of the transformed block search is obtained and expressed in terms of the motion vector 23. The prediction error power D_DEF 24 produced at that time is also retained.

3) Final Motion Compensated Prediction Mode Determination

Next, the minimum prediction error power D_BM 218 supplied from the block matching unit 20 and the minimum prediction error power D_DEF 24 supplied from the transformed block matching unit 21 are compared by the motion compensated prediction mode determinator 22. The smaller of the prediction error powers is selected to determine the final motion compensated mode between block matching and transformed block matching. This operation corresponds to step S3 in FIG. 3.

The motion compensated prediction mode determinator supplies the final, selected motion compensated prediction mode indication signal 26 and the final motion vector 25 to the motion compensator 9 and the entropy encoder 18 in the form of motion parameters 11.

Next, the motion compensation process will be described.

The motion compensator 9 implements the motion compensation process. The motion compensator 9 extracts prediction picture portion data from reference picture data according to the motion parameters 11 supplied from the motion detector 8. The motion compensator 9 according to this embodiment supports both the conventional square-block-based block matching and transformed block matching using a specific transformed block as disclosed herein. According to the motion compensated prediction mode represented by the motion parameters 11, the motion compensator 9 switches the operation between the conventional block matching and the transformed block matching to provide optimal performance.

Now, the operation of the motion compensator 9 according to this embodiment will be described.

Figure 7:
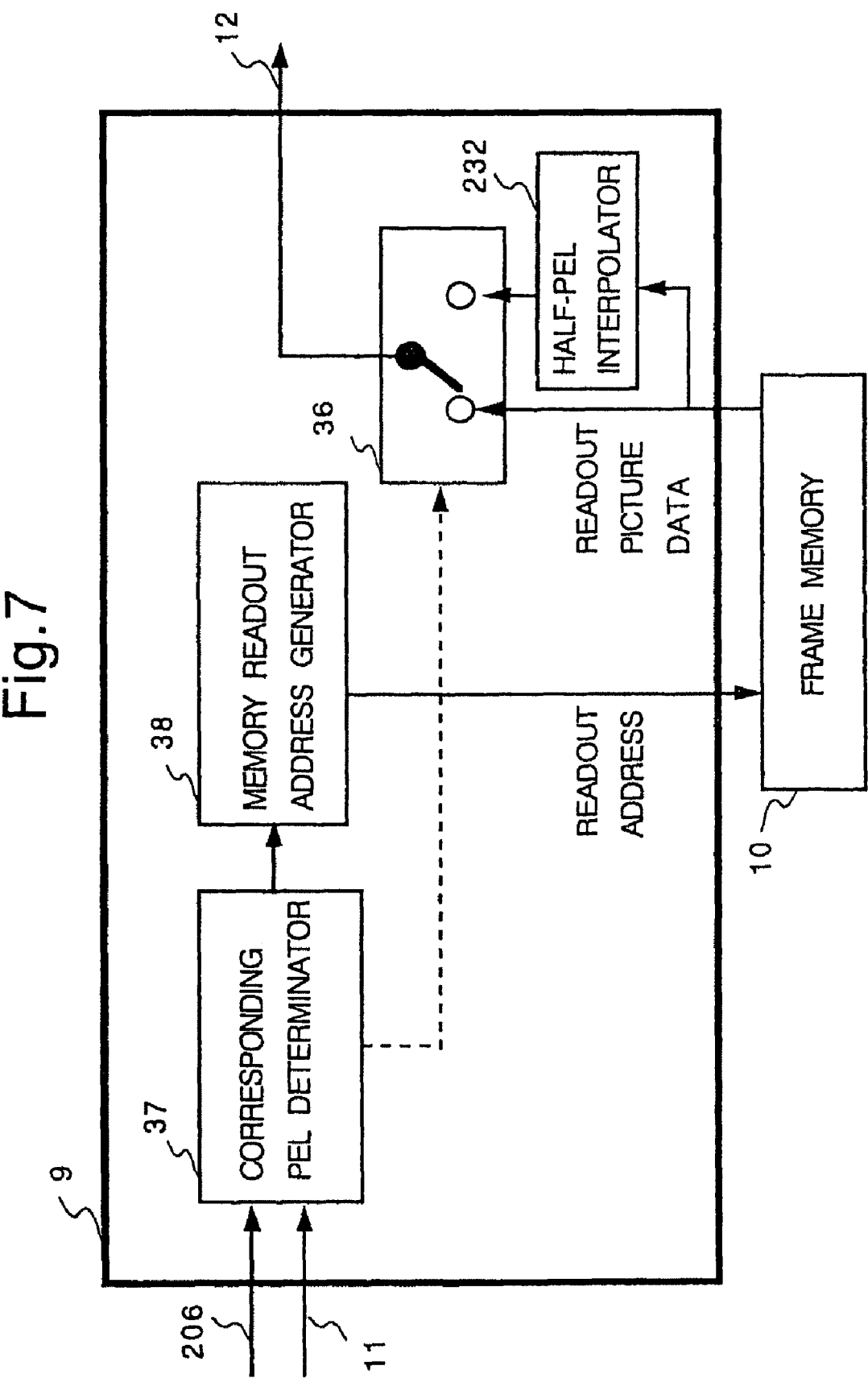
FIG. 7 is a block diagram showing an internal configuration of a motion compensator 9 illustrated in FIG. 1.
Figure 8:
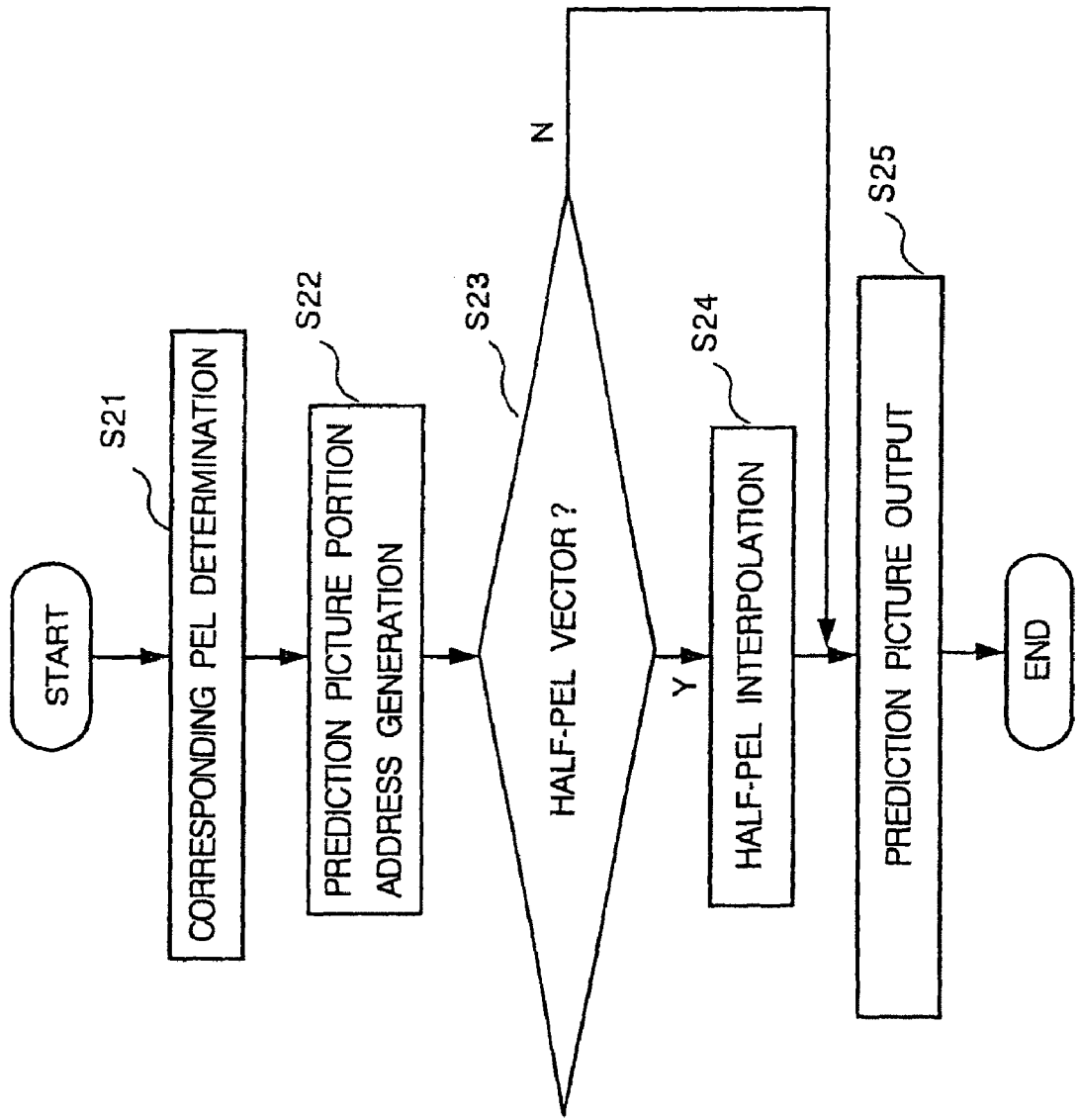
FIG. 8 is a flow chart showing operations of the motion compensator 9.

FIG. 7 is a block diagram showing a configuration of the motion compensator 9 of FIG. 1. FIG. 8 is a flow chart showing the operations of the motion compensator 9.

Referring to FIG. 7, reference numeral 37 is a corresponding pel determinator and reference numeral 38 is a memory readout address generator.

1) Corresponding Pel Determination

By using an input picture block position indication signal 206 and the motion parameters 11 supplied from the motion detector 8, the sample points of the input picture block corresponding to those of the prediction picture portion in the reference picture 28 are determined. This operation corresponds to step S21 in FIG. 8. The corresponding pel determinator 37 illustrated in FIG. 7 implements this process. When the motion compensated prediction mode, represented by the motion parameters 11, indicates block matching, the corresponding pels will become the sample points of a reference picture translated from the position indicated by the input picture block position indication signal 206 to the area specified by the motion vector. This operation corresponds to step S204 in FIG. 44, and is an operation for determining the position of the pel (x+dx, y+dy) within the reference picture 28 when dx and dy are expressed in terms of the motion vector. When the motion compensated prediction mode represented by the motion parameters 11 indicates transformed block matching, the corresponding pels will become the sample points of a reference picture block rotated by a specified angle indicated by the input picture block position indication signal 206, as described in the explanation of the motion detector 8 in the above 2-4), and then translated to the area specified by the motion vector. This operation corresponds to step S9 in FIG. 6, and is an operation for determining the position of the pel (rx+dx, ry+dy) within the reference picture 28 when dx and dy are expressed in terms of the motion vector.

2) Prediction Picture Data Readout Operation

The following operations correspond to steps S22 through S25 in FIG. 8. The memory readout address generator 38 receives the output of the corresponding pel determinator 37 and generates the memory address specifying the position of the prediction picture portion within the reference picture 28 to be stored in the frame memory 10.

When the prediction picture portion includes half-pels, half-pel values are interpolated by the half-pel interpolator 232. This operation is implemented before the prediction picture data is supplied from the motion compensator 9, and corresponds to steps S23 and S24 in FIG. 8. Whether or not the prediction picture portion includes half-pels is determined by the corresponding pel determinator 37 according to the motion vector value included in the motion parameters 11. Then, the determined result is supplied to a selective switch 36.

The transformed block matching unit 21 configured as illustrated in FIG. 5 generates the corresponding pel points for a prediction picture portion that includes only real sample points as shown in FIG. 4. However, when the prediction picture portion includes half-pels as well, the transformed block matching unit 42 in FIG. 13 will utilize configurations including the half-pel interpolator 232 as will be described later.

After aforementioned processes, the final prediction picture data 12 is supplied. In this embodiment, a description is directed to the case where a transformed block has been formed by rotating an input picture block by 45 degrees. The rotated angle may be specified arbitrarily, such as 90 degrees, 135 degrees, 180 degrees, and the like. In addition, depending on the determination of the values of dx and dy, other forms of rotation can be implemented.

Further, in this embodiment, a frame-based video encoder is described. When an input digital video sequence is separated into a plurality of picture objects through the preprocessor 2 and each of the picture objects (a picture portion having a common feature such as a motion feature, a pattern feature, etc. or a camera subject, and the like) is regarded as or is included in a block-based picture portion, the present invention may be applied to this object-based video encoder.

Figure 9:
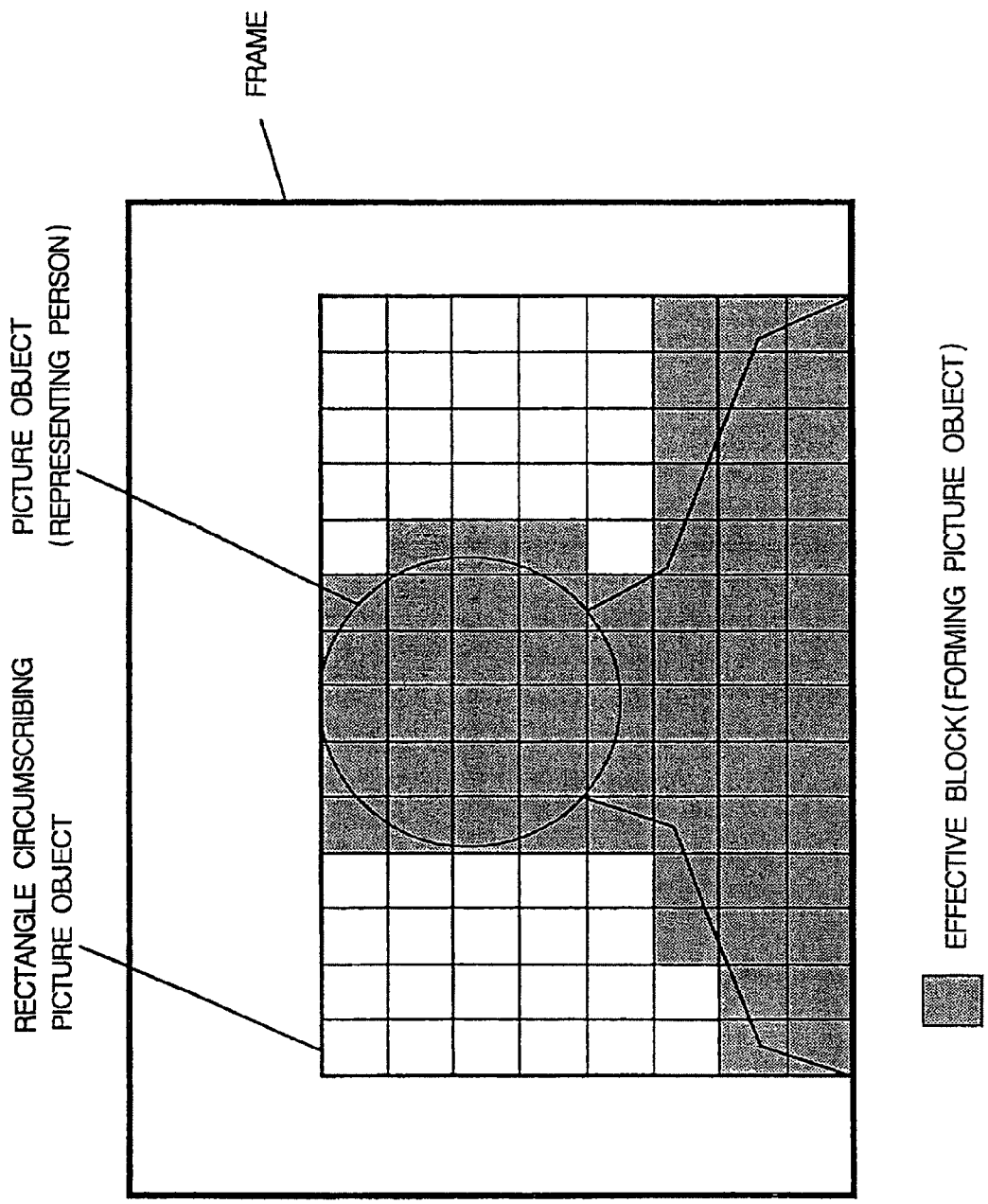
FIG. 9 is a explanatory drawing showing a picture object separating operation of a preprocessor 2.

Object-based encoding, for example, may be implemented by regarding a person with a still background as a single picture object as shown in FIG. 9, dividing the portion surrounding the person into a plurality of subblocks, and encoding data on the subblocks including the person as effective block data. Processes similar to those required for performing the above-described transformed block matching and motion compensation may also be applied to this case. This understanding also applies to other embodiments which will be described hereinafter.

In this embodiment, an encoder using an orthogonal transform encoding method is described. It is to be understood that the present invention may be applied to encoders using other encoding methods for encoding a motion compensated prediction error. This understanding also applies to other embodiments which will be described hereinafter.

Embodiment 2

Approximate displacement of a picture portion which will be subject to the transformed block matching process is determined by the value of the motion vector representing the translational motion of an object. Consequently, when the picture portion which will be subjected to the transformed block matching process is defined to be the portion represented by the motion vector 217 supplied from the block matching unit 20 and when that picture portion is transformed and compared, the number of processing steps and the amount of processing time can be reduced. In this embodiment, a configuration which allows the above-mentioned determination of approximate displacement will be described. This method can be applied to other embodiments which will be described hereinafter.

This embodiment will describe another configuration for motion detector 8.

Figure 10:
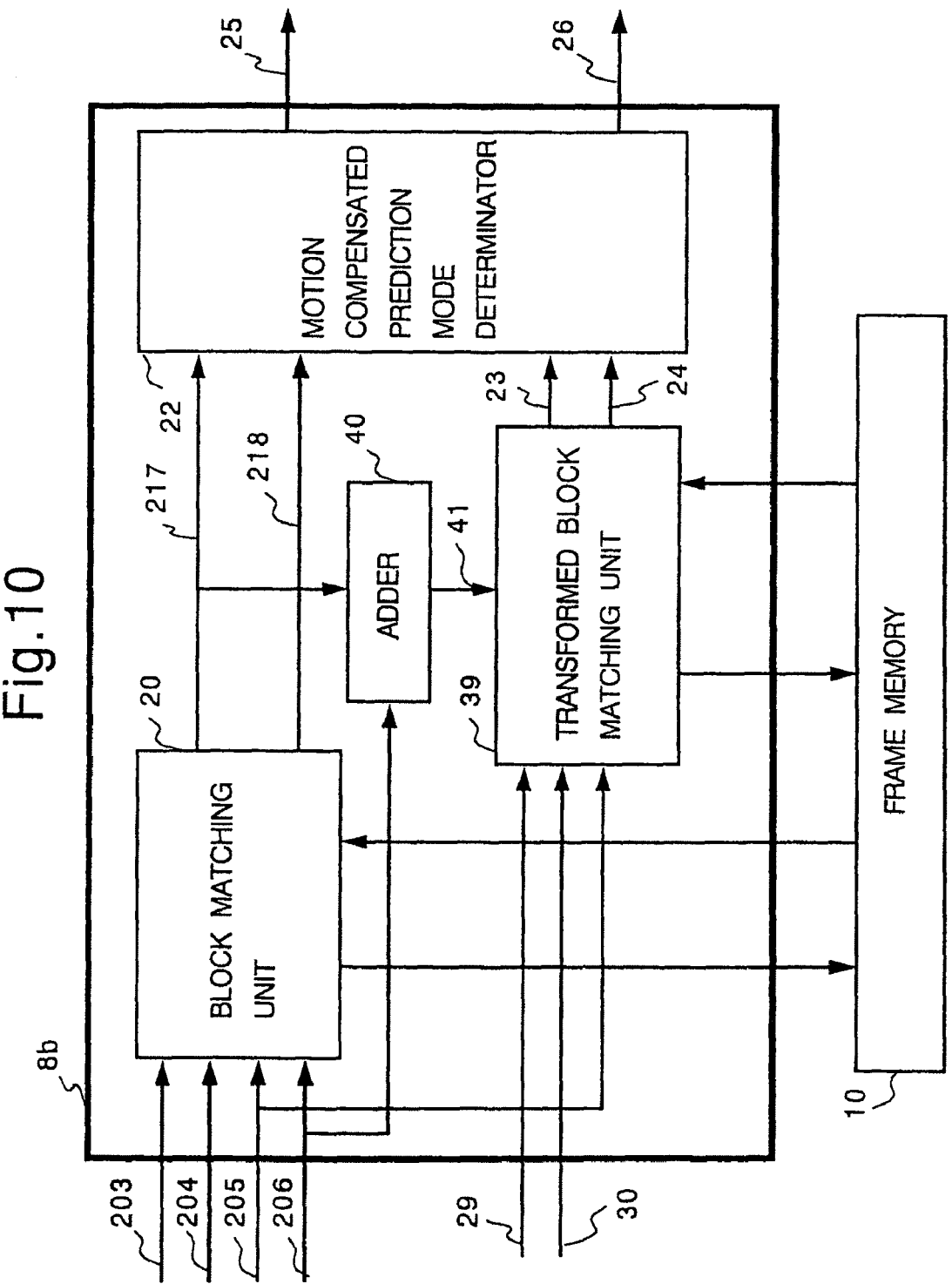
FIG. 10 is a block diagram showing an internal configuration of a motion detector 8b according to a second embodiment of the invention.

FIG. 10 is a block diagram showing an internal configuration of the motion detector 8b according to this embodiment. Reference numeral 39 is a transformed block matching unit, reference numeral 40 is an adder, and reference numeral 41 is an initial search pel position indication signal. The transformed block matching unit 39 uses the initial search pel position indication signal 41 instead of the input 206. Other operations of the transformed block matching unit are the same as those of the transformed block matching unit 21 described in the first embodiment.

FIG. 10 shows a concrete circuit of the motion detector for obtaining approximate values.

Referring to FIG. 10, the motion vector 217 supplied from the block matching unit 20 is added to the input picture block data 205 by the adder 40. Instead of the input picture block position indication signal, the added result of the adder 40 is supplied to the transformed block matching unit 39 as the initial search pel position indication signal 41. The transformed block search range set through the horizontal displacement search range indication signal 29 and the vertical displacement search range indication signal 30 is set so as to be smaller than those set in the first embodiment. Thus, the time required for implementing the repetitive operations from steps S17 through S20 in FIG. 6 can be reduced.

Embodiment 3

In the first and second embodiments, the transformed block portion in the reference picture 28 includes only integer pels. In this embodiment, the transformed block in the reference picture 28 includes half-pels as well as integer pels.

This embodiment is different from the first embodiment in that the motion detector 8 and the motion compensator 9 illustrated in FIG. 1 have different internal configurations, respectively. The operation of the transformed block matching unit in a motion detector and the operation of the corresponding pel determinator of a motion compensator according to this embodiment are different from those in the first embodiment. The operations of other elements are the same as those in the first embodiment. Consequently, the following description will be directed to the operation of the transformed block matching unit and the operation of the motion compensator. As in the first embodiment, the operation of the motion detector 8c and the operation of the motion compensator 9 will be described separately.

Figure 11:
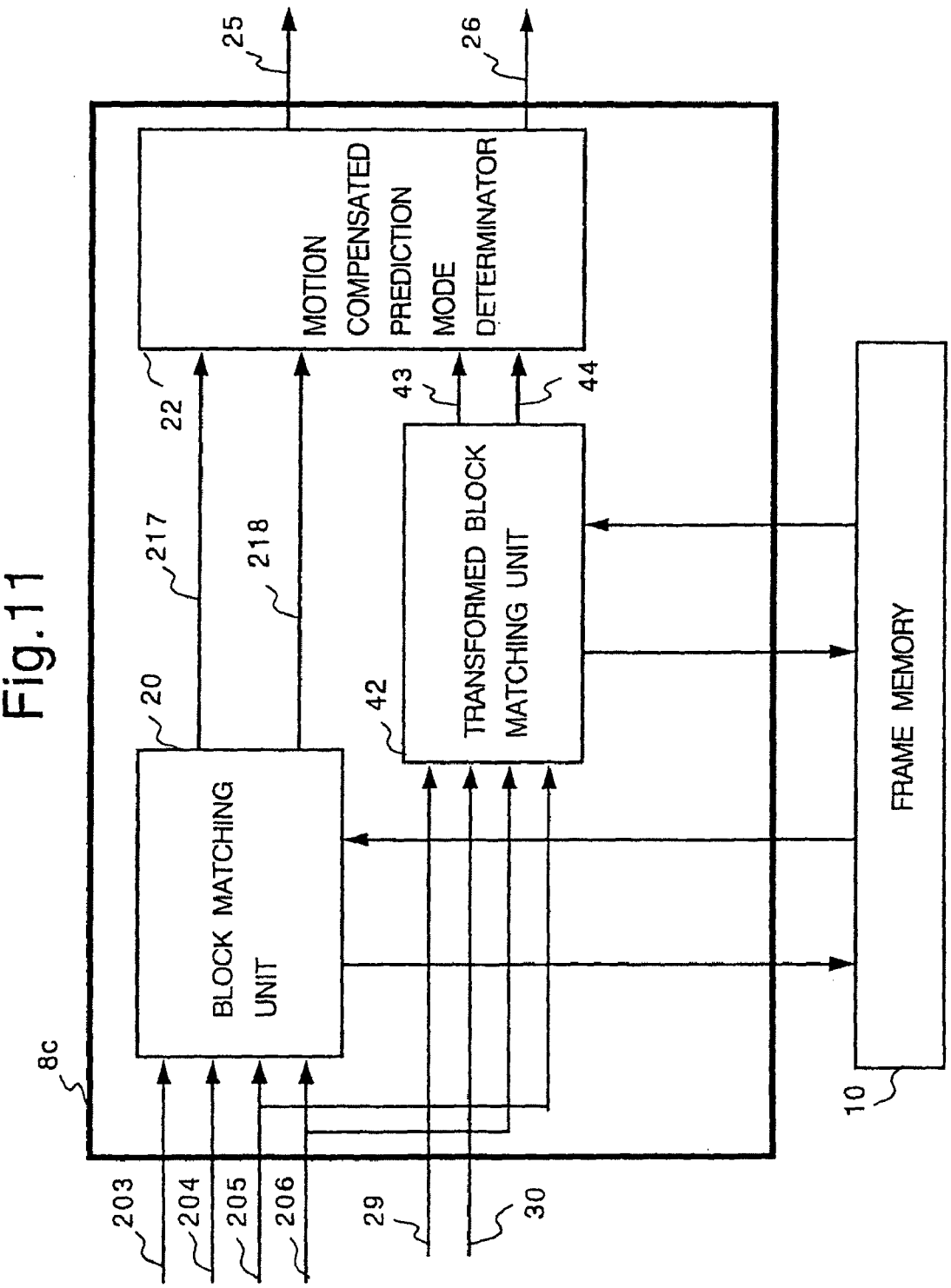
FIG. 11 is a block diagram showing an internal configuration of a motion detector 8c according to a third embodiment of the invention.
Figure 12:
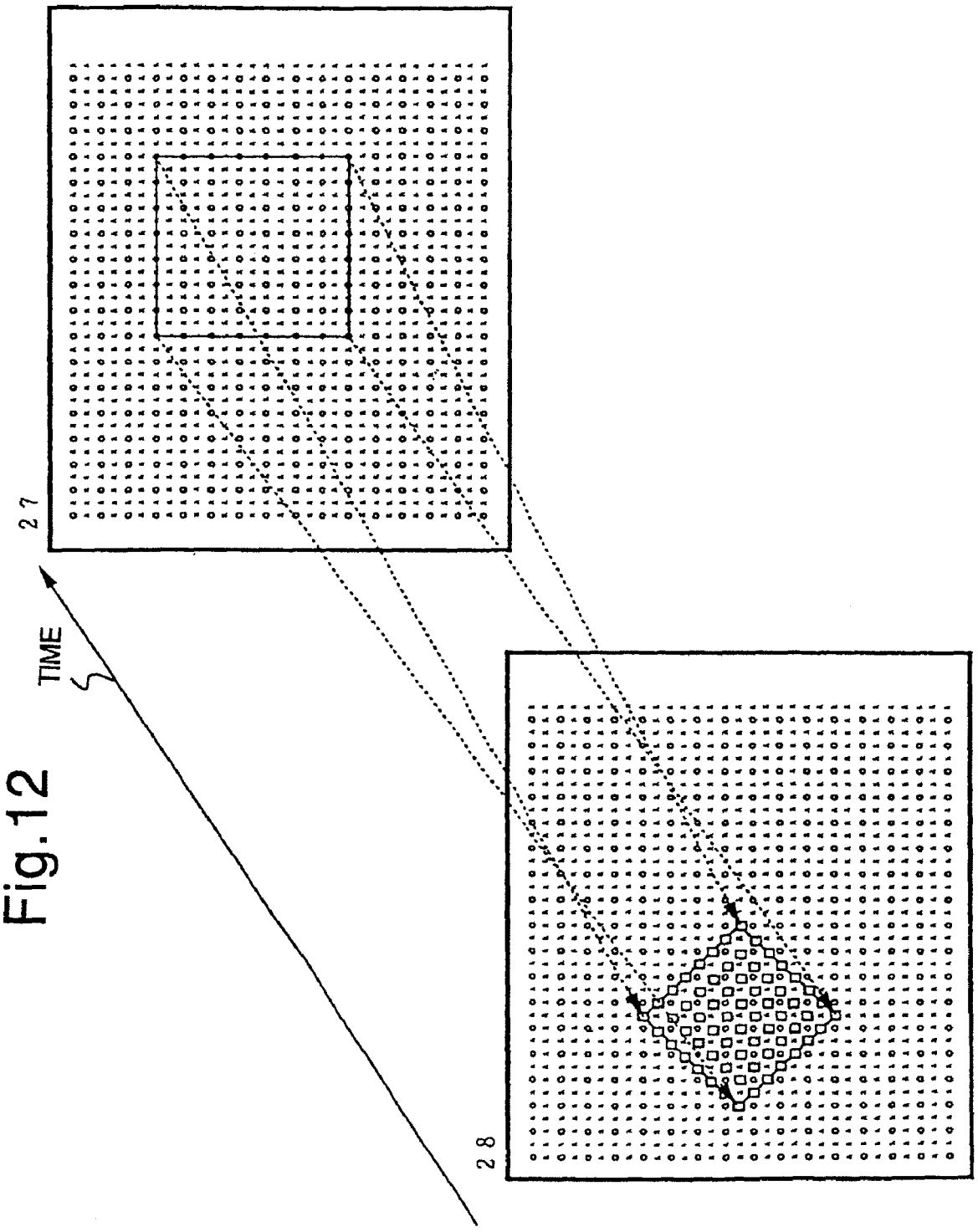
FIG. 12 is a combination of explanatory drawings which describe an operation outline of a transformed block matching unit 42.
Figure 13:
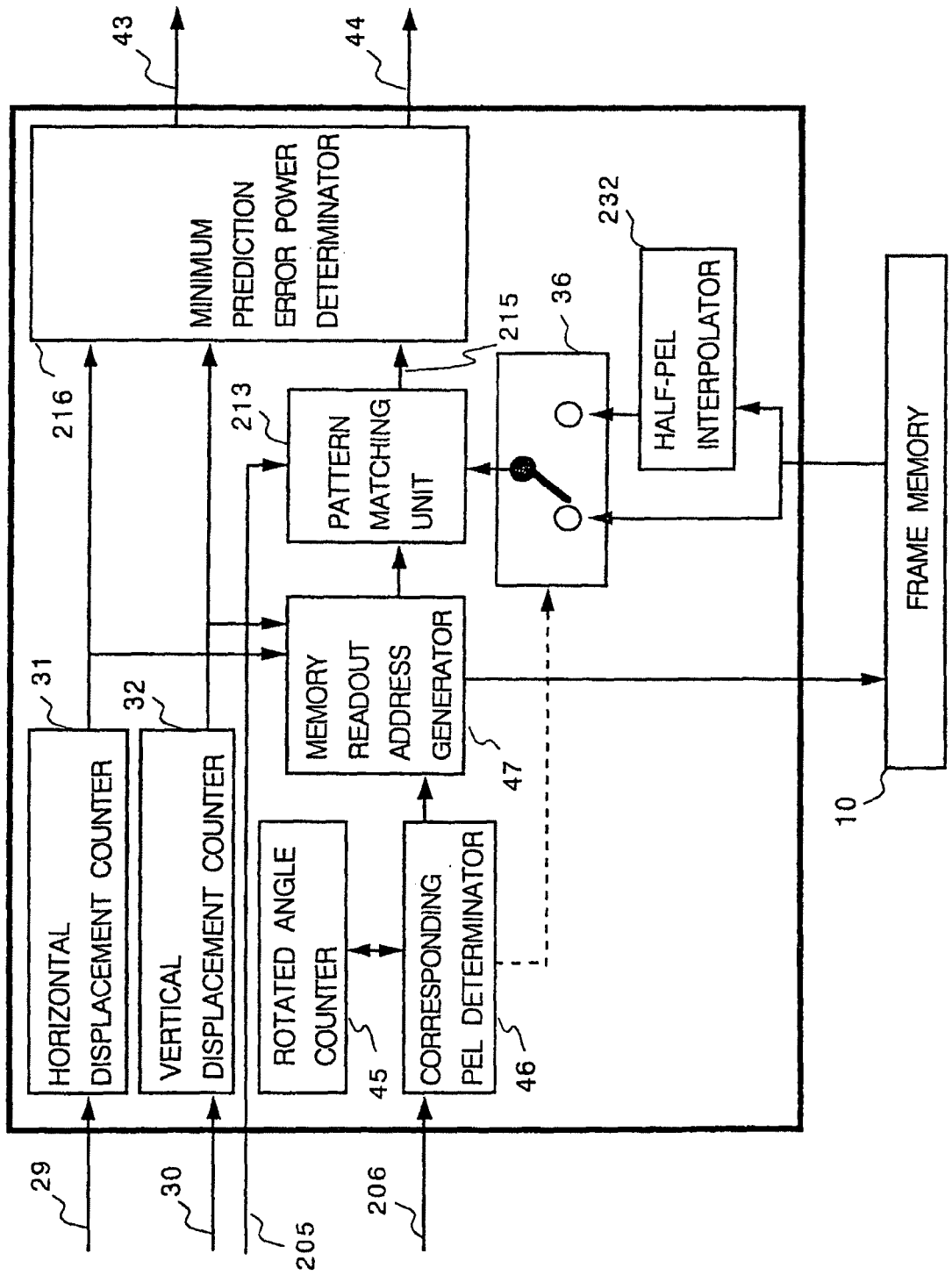
FIG. 13 is a block diagram showing an internal configuration of the transformed block matching unit 42.
Figure 14:
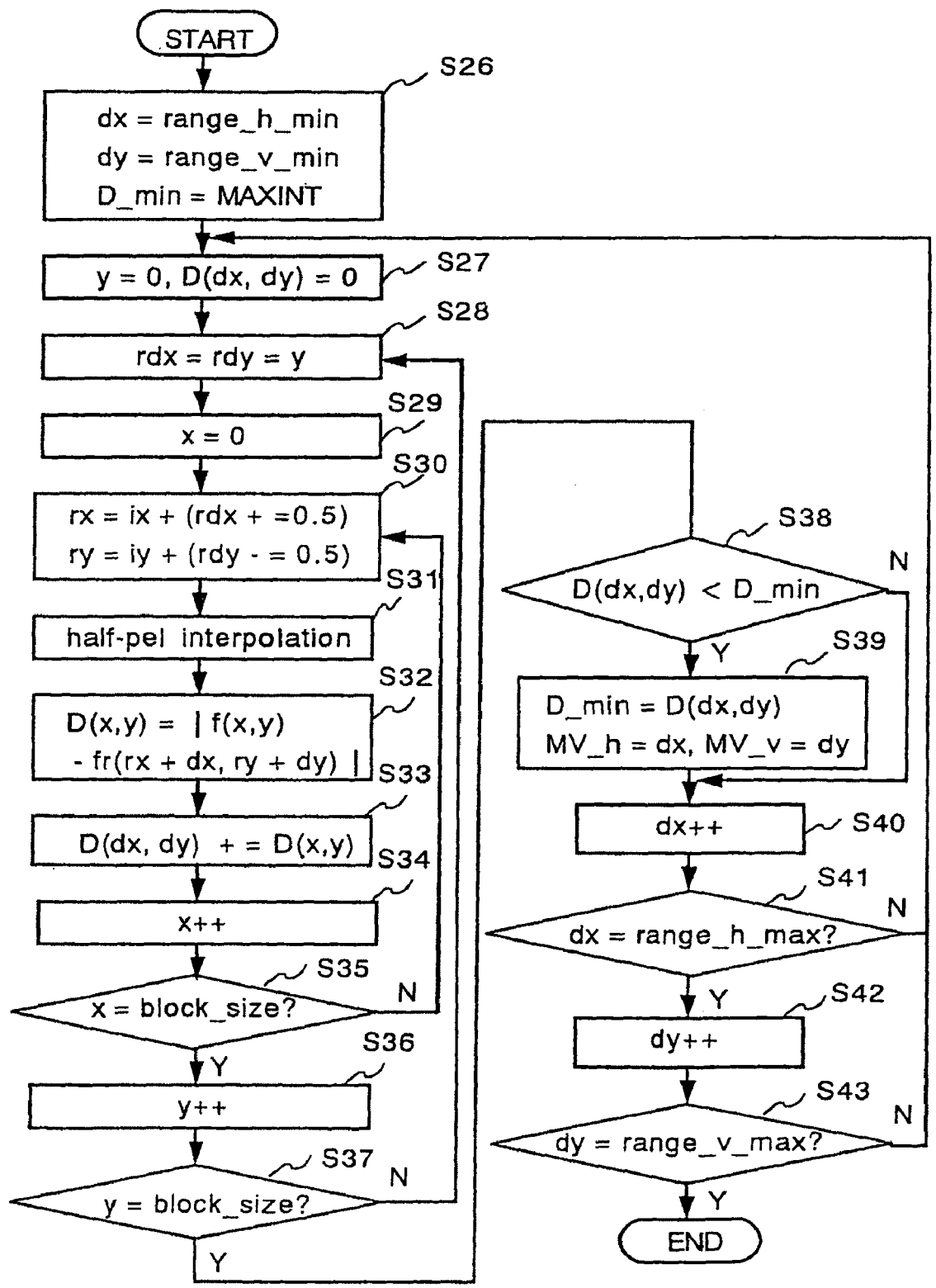
FIG. 14 is a flow chart showing operations of the transformed block matching unit 42.

FIG. 11 is a block diagram showing an internal configuration of the motion detector 8c according to this embodiment. FIG. 12 is a combination of explanatory drawings which describe an operation outline of the transformed block matching unit 42 which is one of important features of the present invention. FIG. 13 is a block diagram showing a detailed internal configuration of the transformed block matching unit 42. FIG. 14 is a flow chart showing the operations of the transformed block matching unit 42.

Referring to these figures, like structural elements and like steps which are given like reference numerals and signs represent the same elements or perform the same processes.

First, the operation of the transformed block matching unit 42 will be described.

1) Operation Outline

FIG. 12 is a combination of explanatory drawings which describe an operation outline of the transformed block matching unit 42.

Referring to the figure, as in the first embodiment, reference numerals 27 and 28 refer to an input picture to be predicted and a reference picture, respectively. Reference sign ○ means a real sample point (integer pel) in a frame represented by luminance signals, and reference sign x means an interposed pel (half-pel) interposed midway between the integer pels. It is assumed herein that the input picture 27 including 8×8 (integer pels) is (a luminance block of) an input picture block. A picture portion comprised of □ pels within the reference picture 28 is a transformed block in a possible prediction picture portion herein.

In this embodiment, a transformed block is defined to be a picture portion rotated 45 degrees clockwise or counterclockwise relative to the luminance block and having four sides $1/\sqrt{2}$ times scaled down from the sides of the input picture block. That is, a length of the reference picture block becomes $\sqrt{2}$ times of the length of the input picture. Intervals of the pels within the reference picture block becomes identical to horizontal/vertical length of intervals of the sample points of the input digital picture 1 of the frame. This block includes half-pels in addition to integer pels within the reference picture 28. Transformed block matching according to this embodiment is a process for finding, within the reference picture 28, a transformed block portion which is most similar to the input picture luminance block including 8×8 samples (hereinafter, samples mean integer pels or half-pels) as illustrated in FIG. 12.

2) Initial Settings (Transformed Block Search Range and Initial Value Setting)

As in the first embodiment, a one-to-one correspondence is established in advance between the integer or half-pels constituting the input picture luminance block and the integer or half-pels constituting a transformed block within a possible prediction picture portion. Herein, as shown in the dotted arrows in FIG. 12, the pel at the upper left corner of the input picture block is made to correspond to the pel at the left top of the transformed block. Referring to the figure, the pel at the left top of the transformed block is a half-pel which indicates that the motion vector represents a picture portion comprised of half-pels in addition to integer pels. A possible prediction picture portion herein means a picture portion rotated 45 degrees clockwise relative to the transformed block within the reference picture 28 and having four sides $\sqrt{2}$ times scaled up with respect to the sides of the transformed block in the reference picture. A change in this correspondence will lead to a change in the rotated direction of the possible prediction picture portion. In addition, establishment of this one-to-one correspondence between the pels will lead to other one-to-one correspondences between the pels of the transformed block and the pels of the input picture block. This one-to-one correspondence allows motion detection similar to that implemented by using block matching. The operations needed for setting the transformed block search range by using the transformed block matching unit are the same as those described in the first embodiment. The structural elements needed for performing transformed block search range setting are illustrated in FIG. 13. This operation corresponds to step S26 in FIG. 14.

3) Block Transformation Parameters Setting

As in the first embodiment, rdx and rdy shown in FIG. 14 will be used as block transformation parameters. The setting of these parameters is implemented by the rotated angle counter 45. The value of y is regarded as the initial value of rdx or rdy. Then, each time x is incremented, rdx is incremented by 0.5, and rdy is decremented by 0.5. These operations correspond to steps S28 through S30 in FIG. 14. The setting of the parameters rdx and rdy in this way is implemented such that the block to be transformed is rotated clockwise. If the setting is performed as rdy=−y at step S28 and ry=iy+(rdy+=0.5) at step S30, the block to be transformed will be rotated counterclockwise.

4) Possible Prediction Picture Portion Readout Operation

First, the reference picture portion pel (rx, ry) corresponding to the input picture block pel (x, y) in the input picture luminance block is determined. The corresponding pel determinator 46 implements this operation. As shown in step S30 in FIG. 14, rx and ry can be obtained by adding rdx and rdy obtained in 3) to the predetermined offset values ix and iy, respectively. Then, data on the reference picture portion pel (rx+dx, ry+dy) is fetched from the frame memory.

Next, pel (rx+dx, ry+dy) is fetched from the frame memory. The memory readout address generator 47 illustrated in FIG. 13 receives the value of dx from the horizontal displacement counter 31, the value of dy from the vertical displacement counter 32, and the value of rx and ry from the corresponding pel determinator 46 so as to generate the address for the pel (rx+dx, ry+dy) to be stored in the frame memory. Readout data is used to interpolate the value of a half-pel through the half-pel interpolator 232, if necessary, as shown in step S31 in FIG. 14.

5) Prediction Error Power Calculation

First, the prediction error power D(dx, dy) produced when dx and dy are expressed in terms of the motion vector is initialized to zero. This operation corresponds to step S27 in FIG. 14. The absolute value for a difference between the pel value read out in 4) and the corresponding pel value of the input picture luminance block is accumulated to D(dx, dy). This operation is repeated until the condition x=y=block_size (in this case, block_size=8) holds. Then, the prediction error power D(dx, dy) produced when the motion vector indicates the pel position (dx, dy) can be obtained. The pattern matching unit 213 illustrated in FIG. 13 implements this operation. The pattern matching unit 213 supplies D(dx, dy) to the minimum prediction error power determinator 216 using the prediction error power signal 215. These operations correspond to steps S32 through S37 in FIG. 14.

6) Minimum Prediction Error Power Updating

It is determined whether D(dx, dy) obtained in 5) has produced the minimum prediction error power among all the searched results that have been obtained so far. The minimum prediction error power determinator 216 illustrated in FIG. 13 makes this determination. This determination process corresponds to step S38 in FIG. 14. The determination process is the same as that in the first embodiment. The value of (dx, dy) at that time is retained as the possible motion vector (MV_h, MV_v). This updating process corresponds to step S39 in FIG. 14.

7) Motion Vector Value Determination

The above-mentioned operations from 2) through 6) are repeated for all the search pel points (dx, dy) within the transformed block search range (these operations correspond to steps S40 through S43 in FIG. 14). The finally retained value (MV_h, MV_v) within the minimum prediction error power determinator 216 are output as the motion vector 43.

As described above, a prediction picture portion which has produced the minimum prediction error power and, therefore, is most similar to an input picture block is searched by using transformed block matching. As the result of the prediction picture portion search, the displacement from the predetermined starting pel point of the selected prediction picture portion is obtained and expressed in terms of the motion vector 43. The prediction error power D_DEF 44 at that time is also retained.

The above-mentioned motion vector 43 and the prediction error power D_DEF 44 are used to determine the final motion compensated mode. The final motion compensated mode is thus determined. This determination method is the same as that in the first embodiment.

Next, the motion compensation process will be described.

The motion compensator 9 implements the motion compensation process. In this embodiment, the operation of the corresponding pel determinator 37 is different from that in the first embodiment. Consequently, the following description will be directed only to the operation of the corresponding pel determinator 37. The overall motion compensation operational flow is illustrated in the form of the flow chart in FIG. 8.

In this embodiment, the corresponding pel determination is performed as follows:

When the motion compensated prediction mode represented by the motion parameters 11 indicates block matching, the corresponding pels will become the sample points of a reference picture portion translated from the position indicated by the input picture block position indication signal 206 to the area specified by the motion vector. This process corresponds to step S204 in FIG. 44, and represents an operation for determining the position of the pel (x+dx, y+dy) within the reference picture 28 when dx and dy are expressed in terms of the motion vector.

When the motion compensated prediction mode represented by motion parameters 11 indicates transformed block matching, the corresponding pels are expressed with the sample points of a reference picture portion rotated by a specified angle indicated by the input picture block position indication signal 206 and then translated to the area specified by the motion vector as described in 4) of the explanation of the motion detector 8. This operation corresponds to step S32 in FIG. 14, and is an operation for determining the position of the pel (rx+dx, ry+dy) within the reference picture 28 when dx and dy are expressed in terms of the motion vector.

The prediction picture data readout operation and prediction picture generation are the same as those described in the first embodiment.

Embodiment 4

In this embodiment, a description will be directed to the case where a transformed block is a reduced input picture block. With regard to the case where a transformed block is enlarged relative to an input picture block, the operation will be similar and the description will be omitted. Thus, simplified transformed block matching and motion compensation will be described.

Figure 16:
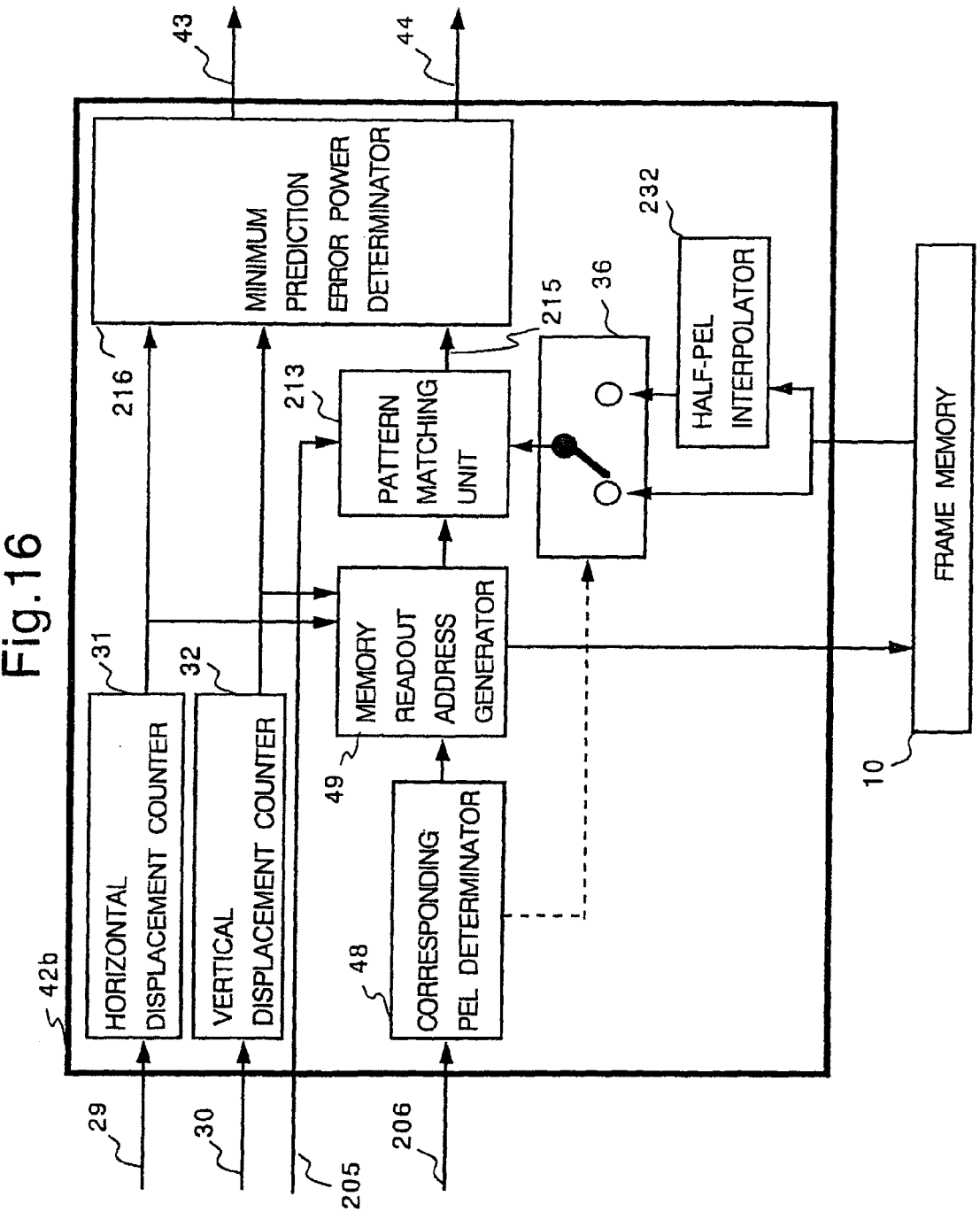
FIG. 16 is a block diagram showing an internal configuration of the transformed block matching unit 42b.

Now, the operation of the transformed block matching unit 42b in the motion detector and the operation of the corresponding pel determinator in the motion compensator will be described in detail with reference to FIG. 16. For simplifying the description, it is assumed herein that the transformed block matching unit 42b is a variation of the transformed block matching unit 42 illustrated in FIG. 13. The transformed block matching unit 42b receives the same inputs as those with the transformed block matching unit 42, and supplies variations of the motion vector 43 and the prediction error power 44. The corresponding pel determinator in the motion compensator 9 is also a variation of the corresponding pel determinator 37 illustrated in FIG. 7. Consequently, this embodiment uses the transformed block matching unit 42b and the corresponding pel determinator 37.

Figure 15:
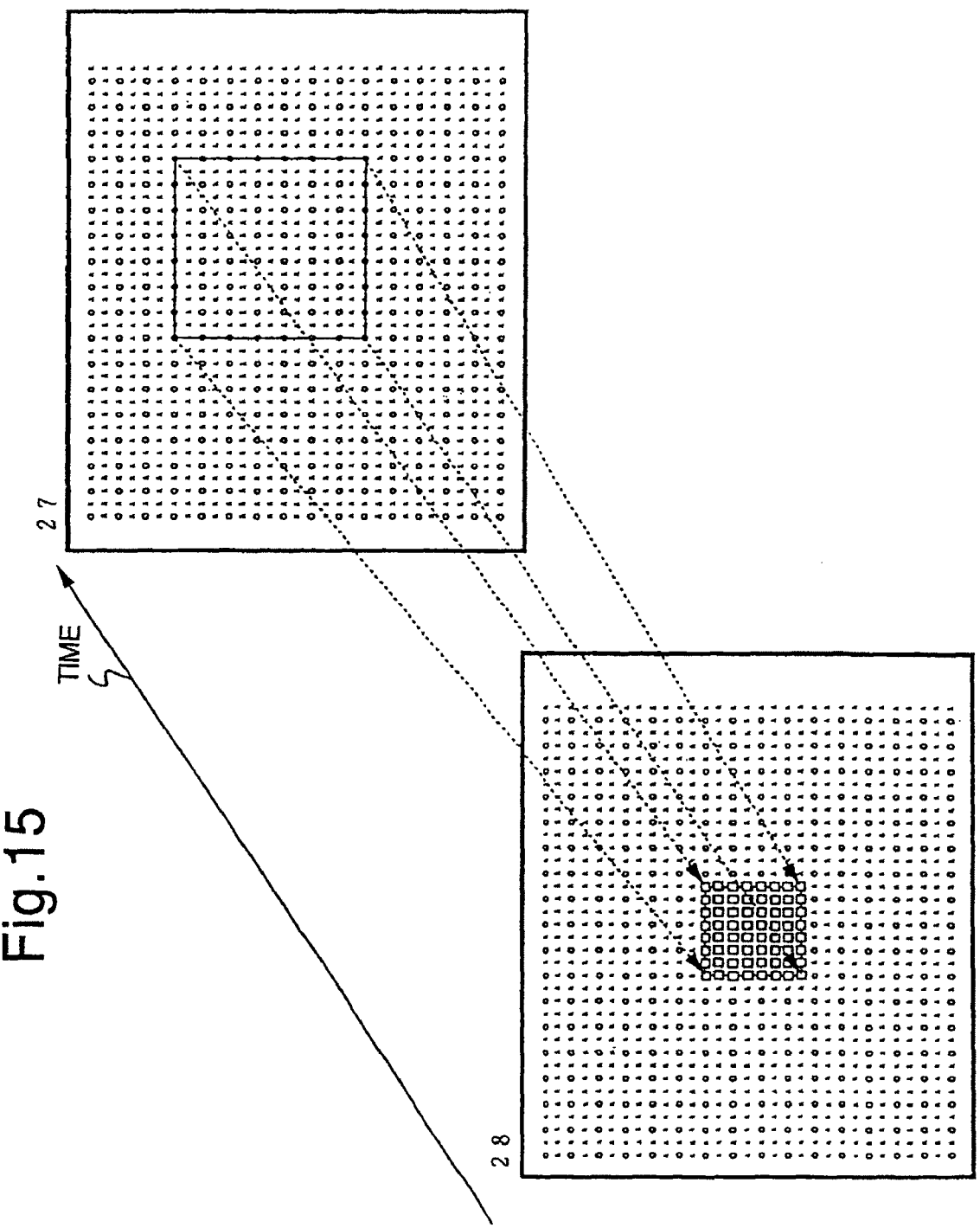
FIG. 15 is a combination of explanatory drawings which describe an operation outline of a transformed block matching unit 42b according to a fourth embodiment of the invention.
Figure 17:
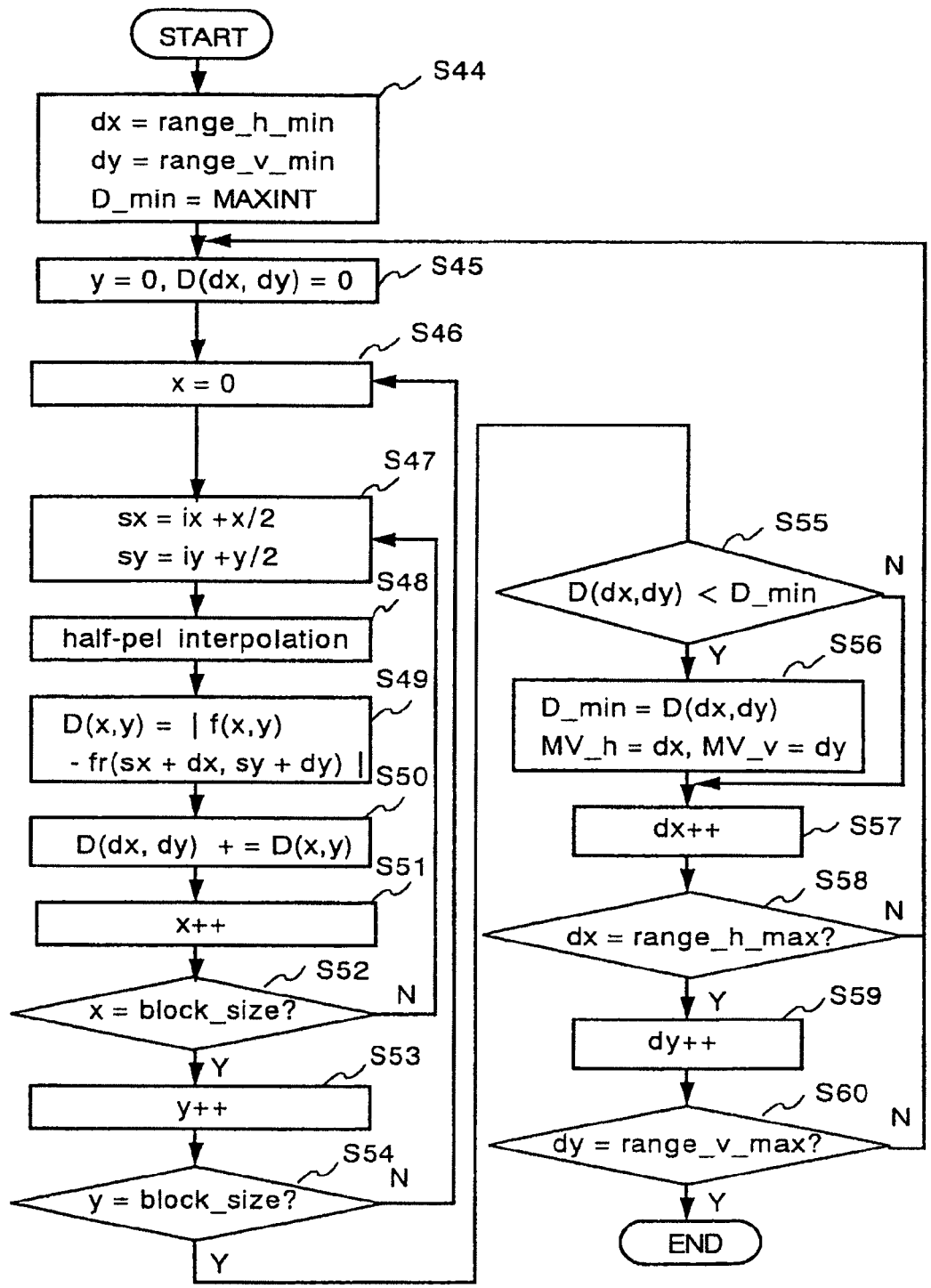
FIG. 17 is a flow chart showing operations of the transformed block matching unit 42b.

FIG. 15 is a combination of explanatory drawings showing the operation outline of the transformed block matching unit 42b according to this embodiment. FIG. 16 is a block diagram showing a detailed internal configuration of the transformed block matching unit 42b. FIG. 17 is a flow chart showing the operations of the transformed block matching unit 42b.

In these figures, the elements and steps assigned the same reference numerals with the above-mentioned drawings will mean the same elements and operations.

First, the operation of the transformed block matching unit 42b will be described.

1) Operation Outline

FIG. 15 shows the operation outline of the transformed block matching unit 42b. An input picture 27, a reference picture 28 and signs used within the pictures are the same as described above. In this embodiment, a transformed block is defined to be a picture portion having four sides which are half as large as those of an input picture luminance block. Transformed block matching according to this embodiment is a process for finding, within the given search range, a transformed reference picture block portion most similar to the input picture luminance block consisting of 8×8 samples as illustrated in FIG. 15.

2) Initial Settings (Transformed Block Search Range Setting and Initial Value Setting)

As in the first embodiment, a one-to-one correspondence is established in advance between the pels constituting an input picture luminance block and the pels constituting a transformed block within a possible prediction picture portion. Herein, as shown in the dotted arrows in FIG. 15, the pel at the upper left corner of the input picture block is made to correspond to the pel at the left top of the transformed block. Because a one-to-one correspondence is established between the pels of the input picture block and the pels of the possible prediction picture portion, motion detection similar to that implemented by block matching can be performed. The operation needed for setting the transformed block search range by using the transformed block matching unit is the same as that in the first embodiment. FIG. 16 illustrates the structural elements needed for performing transformed block search range setting. This operation corresponds to step S44 in FIG. 17.

3) Possible Prediction Picture Portion Readout Operation

In this embodiment, specific block transformation parameters will not be used. As shown in step S47 in FIG. 17, the reference picture portion pel (sx, sy) corresponding to the input picture luminance block pel (x, y) is obtained by adding x/2 and y/2 to the horizontal offset constant ix and the vertical offset constant iy, respectively. This corresponding pel determination is made by the corresponding pel determinator 48. Then, the reference picture portion pel (sx+dx, sy+dy) is fetched from the frame memory 10. The memory readout address generator 49 illustrated in FIG. 16 receives the value of dx from the horizontal displacement counter 31, the value of dy from the vertical displacement counter 32, and the value of sx and sy from the corresponding pel determinator 48 so as to generate the address for the pel (sx+dx, sy+dy) to be stored in the frame memory. Readout data is used to generate the value of a half-pel through the half-pel interpolator 232, if necessary, as shown in step S48 in FIG. 17.

4) Prediction Error Power Calculation

First, the prediction error power D(dx, dy) produced when dx and dy are expressed in terms of the motion vector is initialized to zero. This operation corresponds to step S45 in FIG. 17. The absolute value for a difference between the pel value read out in 3) and the value of the corresponding pel in the input picture luminance block is accumulated to D(dx, dy) in step S50. This operation is repeated until the condition x=y=block_size (in this example, block_size=8) holds in steps S52 and S54. Then, the prediction error power D(dx, dy) produced when the motion vector indicates the pel position (dx, dy) can be obtained. The pattern matching unit 213 illustrated in FIG. 16 implements this operation. The pattern matching unit 213 supplies D(dx, dy) to the minimum prediction error power determinator 216 through the prediction error power signal 215. These operations correspond to steps S49 through S54 in FIG. 17.

5) Minimum Prediction Error Power Updating

Then, it is determined whether D(dx, dy) obtained in 4) has produced the minimum prediction error power among all the searched results that have been obtained so far. The minimum prediction error power determinator 216 illustrated in FIG. 16 makes this determination. This operation corresponds to step S55 in FIG. 17. The determination process is the same as that in the first embodiment. The value of (dx, dy) at that time is retained as the possible motion vector. This updating process corresponds to step S56 in FIG. 17.

6) Motion Vector Value Determination

The above-mentioned operations from 2) through 5) are repeated for all the search pel points (dx, dy) within the transformed block search range as indicated by steps from S57 through S60 in FIG. 17. The finally retained dx and dy within the minimum prediction error power determinator 216 are output as the motion vector 43.

As described above, a prediction picture portion most similar to an input picture block with the minimum prediction error power produced is searched by using transformed block matching. As the result of the prediction picture portion search, the displacement from the predetermined starting pel of the selected prediction picture portion is obtained and expressed in terms of the motion vector 43. The prediction error power D_DEF 44 at that time is also retained.

The above-mentioned motion vector 43 and the prediction error power D_DEF 44 are used to determine the final motion compensated mode. This determination process is the same as that in the first embodiment.

Next, the motion compensation process will be described.

The motion compensator 9 implements the motion compensation process. In this embodiment, the operation of the corresponding pel determinator 37 is different from that in the first embodiment. Consequently, a description will be directed only to the operation of the corresponding pel determinator 37. The overall motion compensation operational flow is illustrated in the form of the flow chart in FIG. 8.

In this embodiment, the corresponding pel determination is made as follows:

When the motion compensated prediction mode represented by the motion parameters 11 indicates block matching, the corresponding pels are expressed with the sample points of a picture portion to which the displacement indicated by the input picture block position indication signal 206 is added and then translated to the area specified by the motion vector. This process corresponds to step S204 in FIG. 44, and represents an operation for determining the position of the pel (x+dx, y+dy) within the reference picture 28 when dx and dy are expressed in terms of the motion vector.

When the motion compensated prediction mode represented by motion parameters 11 indicates transformed block matching, the corresponding pels are expressed with the sample points of a picture portion to which the displacement indicated by the input picture block position indication signal 206 is added and then translated to the area specified by the motion vector. This operation corresponds to step S47 in FIG. 17 and represents an operation for determining the position of the pel (sx+dx, sy+dy) within the reference picture 28 when dx and dy are expressed in terms of the motion vector. The prediction picture portion data readout operation and prediction picture portion generation are performed as in the first embodiment.

A transformed block according to any one of the above-mentioned embodiments may have any arbitrary shape according to the following two assumptions:

1) One-to-one correspondence is established between the pels of an input picture block and the pels of a prediction picture portion.

2) Corresponding pels of the prediction picture portion in the reference picture are integer pels.

Figure 18:
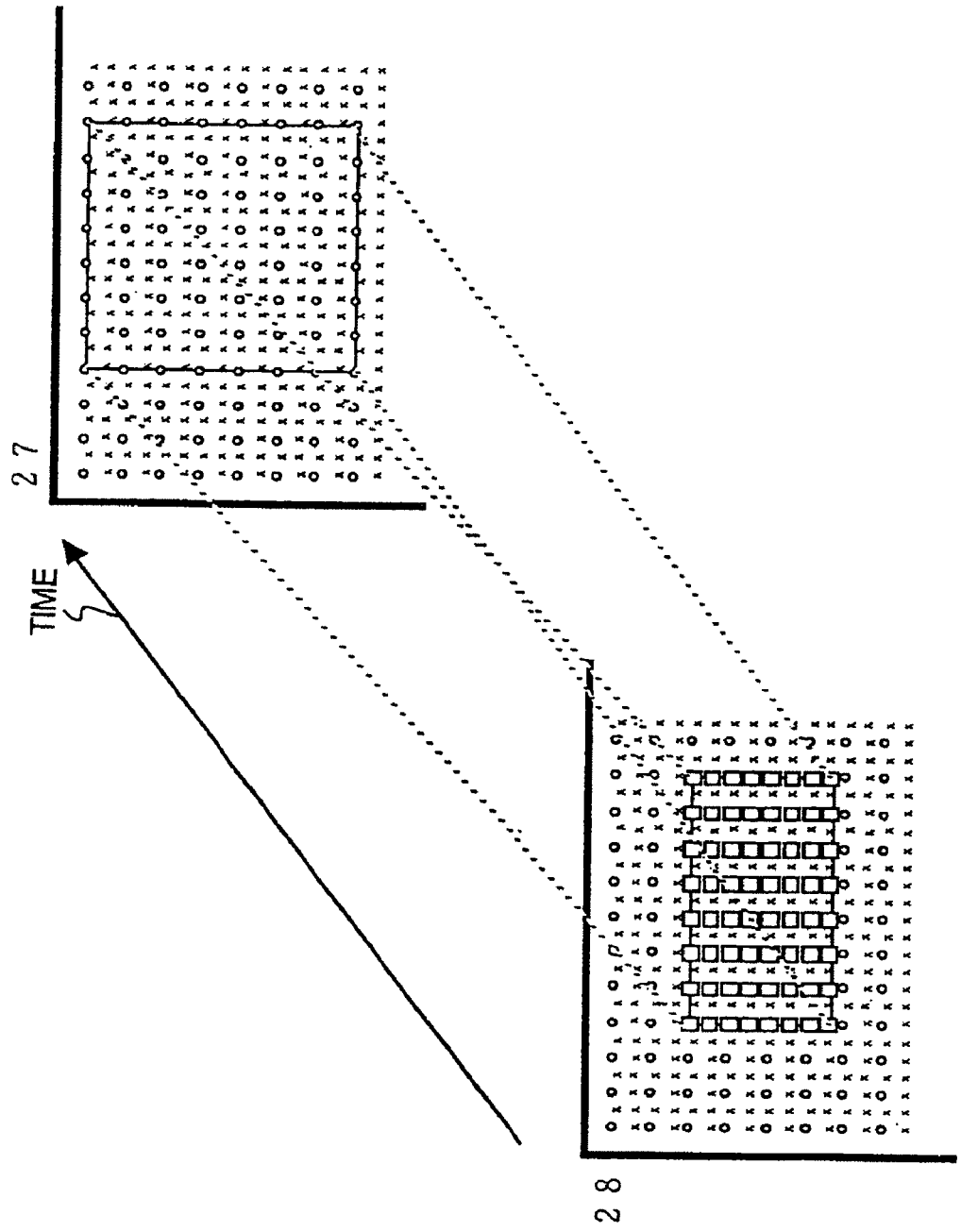
FIG. 18 is a combination of explanatory drawings which describe other form of transformed block matching according to the fourth embodiment.
Figure 19:
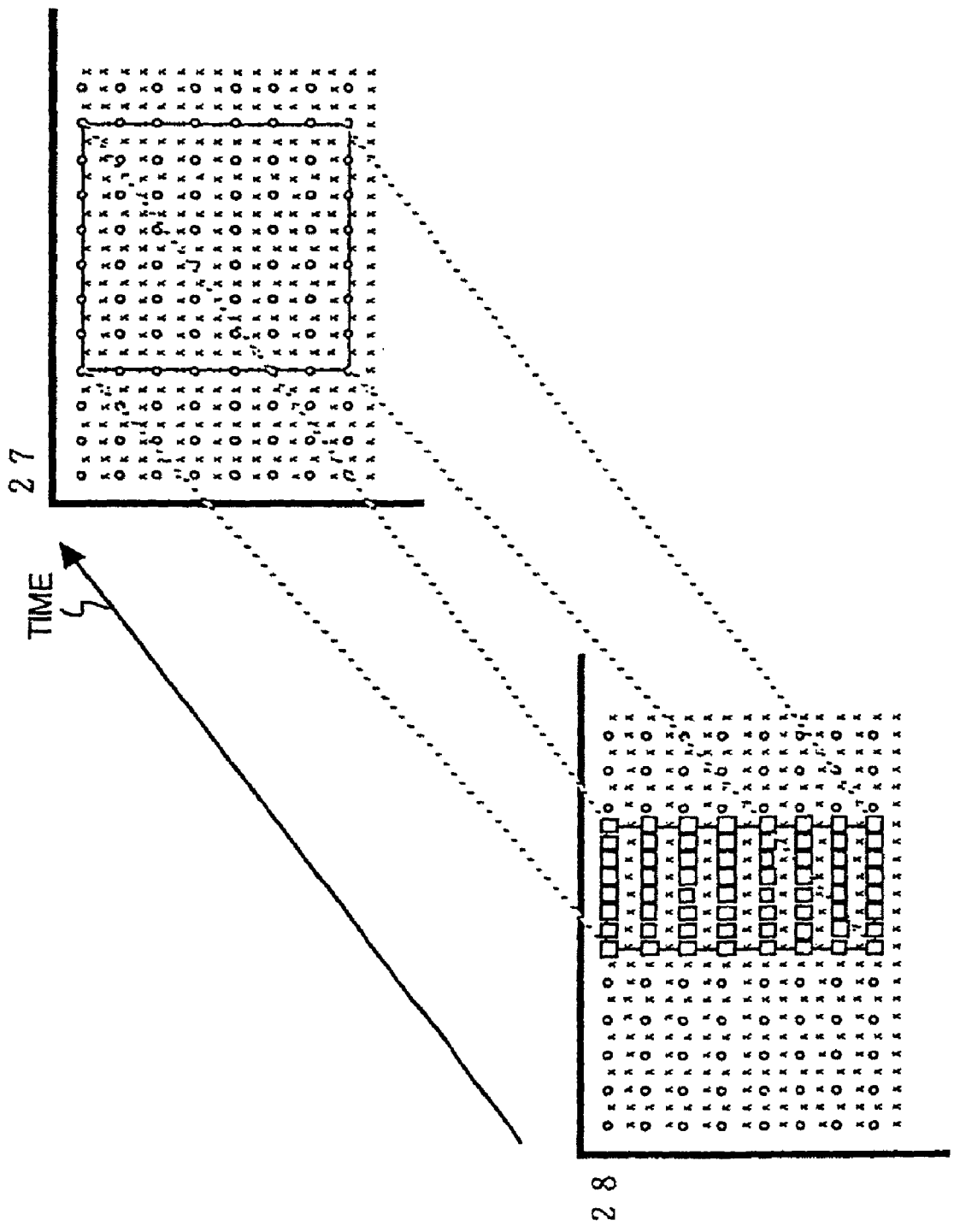
FIG. 19 is a combination of explanatory drawings which describe other form of transformed block matching according to the fourth embodiment.

A transformed block may have such a shape as that shown in FIG. 18 or FIG. 19. In addition, prediction picture portions may be reduced or enlarged at an arbitrary ratio so as to be transformed into various shapes to allow block matching. By defining various shapes of the prediction picture portion in advance in this way, transformed block matching which gives the best match can be selected. In this case, the selected transformed block data is represented by the motion parameters 11 and is supplied to the entropy encoder 18.

According to the above-mentioned embodiments, if only half-pels are interpolated, motion compensation for various types of motion including rotation and scaling down of an object can be performed. Furthermore, complex arithmetic operations which are required when using the affine motion model are not needed for this invention. Thus, appropriate motion compensated prediction can be implemented even for the picture portion where the prediction error cannot be minimized merely by using the motion vector representing a translational amount, or for which correct prediction cannot be performed.

In the embodiments described hereinbefore, a description has been directed to the case where integer pels or half-pels are used as the predetermined fixed pels of a transformed block. Other pels interposed between the integer pels at a 1:3 ratio, for example, may also be used as the fixed pels. In this case as well, pel interpolation is not needed in the transformed block matching process, which is different from the conventional compensated prediction using the affine motion model. Thus, the number of steps needed for the process can be reduced, and high-speed processing can be performed.

Embodiment 5

In the embodiments described hereinbefore, determination of block transformation parameters for each pel or the process for expressing the position of each pel in terms of the coordinates therefor is performed. Alternatively, corresponding pel determination may be made by preparing in advance a transformation pattern table such as a ROM storing the corresponding coordinates for the respective pels and determining the respective pels of a prediction picture portion based on the coordinates extracted from the transformation pattern table. Thus, transformed block matching and motion compensation having an arbitrary correspondence relationship between the pels of an input picture block and the pels of a prediction picture portion can be efficiently performed.

Now, the above-mentioned operation will be described in conjunction with the first embodiment.

Figure 20:
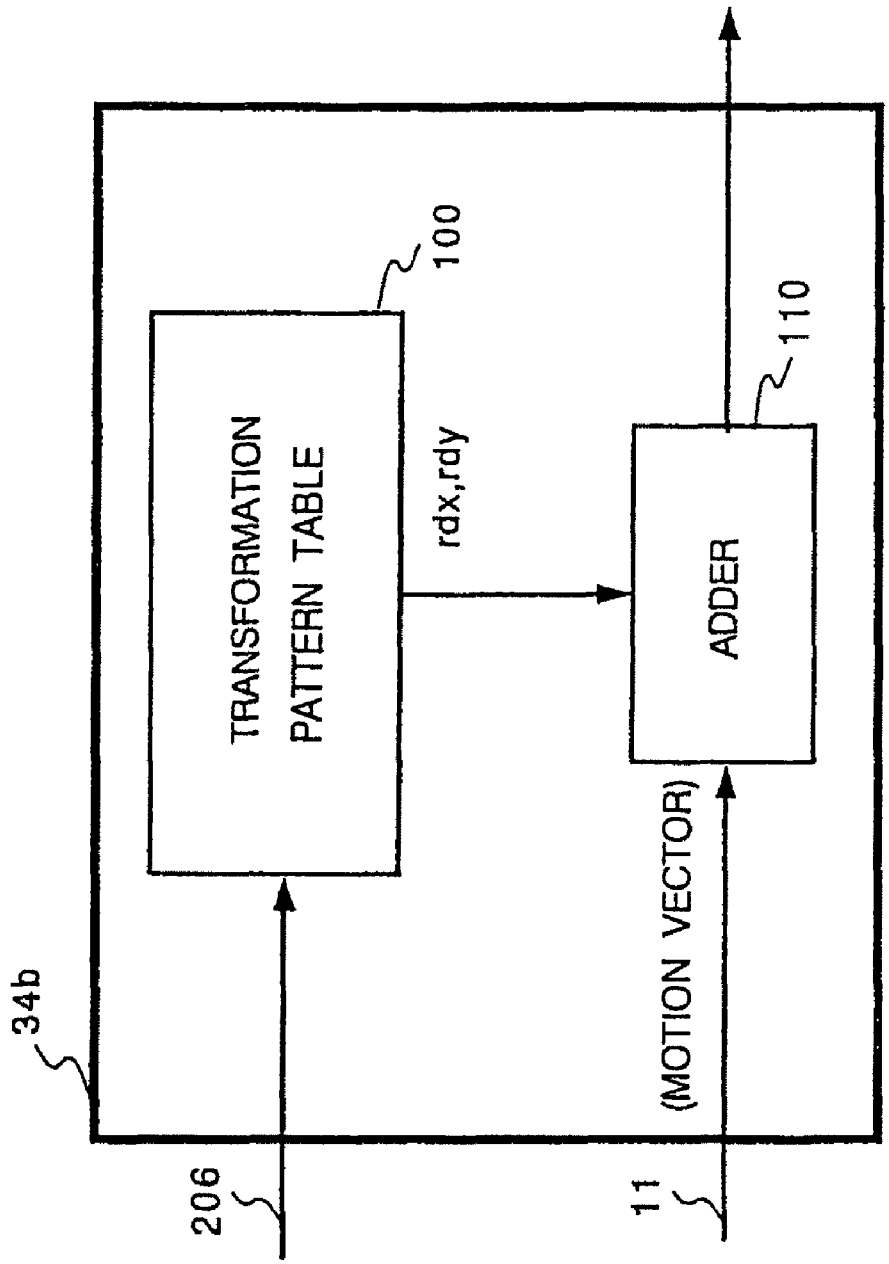
FIG. 20 is a block diagram showing an internal configuration of a corresponding pel determinator 34 according to a fifth embodiment of the invention.
Figure 21:
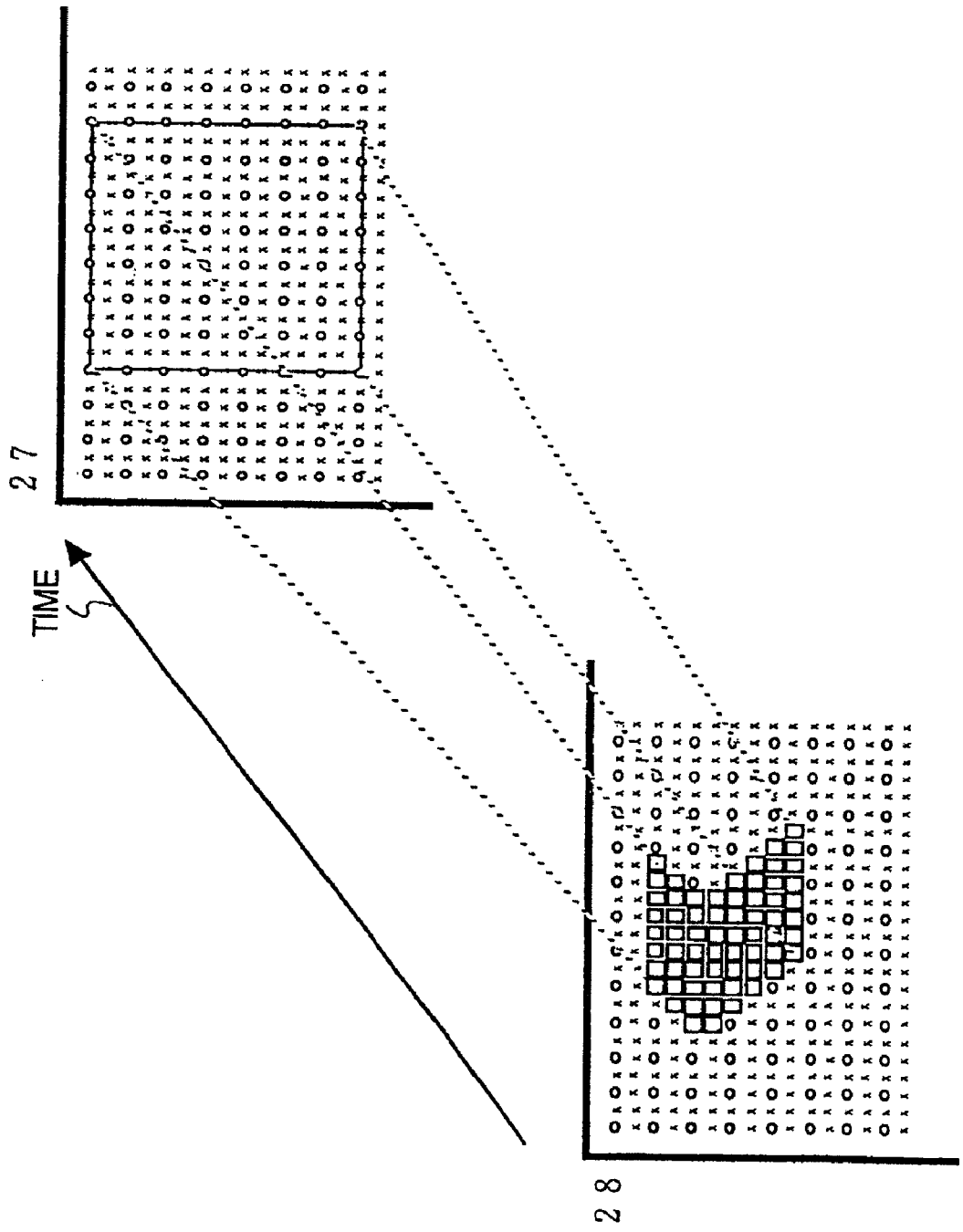
FIG. 21 is a combination of explanatory drawings which describe transformed block matching according to a sixth embodiment of the invention.

FIG. 20 is a block diagram showing another internal configuration (corresponding pel determinator 34b) of the corresponding pel determinator 34 illustrated in FIG. 5 which realizes another embodiment of the present invention. In this embodiment, corresponding pel determination can be made by storing rdx and rdy in the ROM and determining the pel (rx, ry) corresponding to the pel (x, y) using rdx and rdy fetched from the ROM. Consequently, incrementation or decrementation of the transformation parameters rdx and rdy as shown in step S8 in FIG. 6 are not needed. For making corresponding pel determinations, the rotated angle counter 33 illustrated in FIG. 5 is also not needed in this embodiment. Instead, corresponding pel determination can be made by providing a ROM table (transformation pattern table 100) inside the corresponding pel determinator 34b, as shown in FIG. 20. Through the corresponding pel determinator 34b, the transformation parameters rdx and rdy are fetched from the transformation pattern table 100 based on the respective values x and y of the pel within an input picture block. Then, the transformation parameters rdx and rdy are supplied to the adder 110 and added to the motion vector data so as to determine the corresponding pel values. Then, the determined corresponding pel value data is supplied to the memory readout address generator 35. This method can also be applied to other embodiments described hereinbefore. Thus, if only a few ROM (transformation pattern table 100) memories are added to the corresponding pel determinator circuit 34b, the structural element for performing arithmetic operations for determining corresponding pels is not necessary and need not be provided. In this way, the corresponding pel determinator circuit 34 can be simplified and the number of the corresponding pel determination processing steps can be reduced. In addition, corresponding pel determinations can be made for a transformed block as shown in FIG. 21 which cannot be simply expressed in terms of transformation parameters. Thus, a transformation pattern library storing more abundant transformation patterns can be conceived.

Embodiment 6

In this embodiment, an encoder is disclosed which can decrease variations in the frequency characteristic of a prediction picture portion that is separated from the reference picture as a transformed block and which can reduce mismatches when implementing prediction for an input picture block.

When a prediction picture portion includes half-pels as well as integer pels, a variation in the spatial frequency characteristic occurs between the integer pels and the half-pels. An input picture block includes only integer pels. Consequently, this variation in the spatial frequency characteristic can become a factor which may cause a prediction mismatch. In this embodiment, after a transformed block has been defined similarly as in the other embodiments described hereinbefore, filtering of integer pels will be performed.

Interpolation of half-pels can be performed by filtering integer pels thereabout at a [1/2,1/2] ratio. In order to do so, a low-pass filter filtering only equal to or lower frequency component than the $\cos(\omega t/2)$ is provided. Prediction picture portions defined in the embodiments described hereinbefore include both unfiltered integer pels and filtered half-pels generated by the above-mentioned filtering. Consequently, a variation in the spatial frequency characteristic will occur in the prediction picture portions. When prediction accuracy has been reduced due to this variation, the unfiltered integer pels should also be filtered by the filter having a filter characteristic that is similar to the filter characteristic described above. Thus, the prediction accuracy can be enhanced.

FIG. 22 is a explanatory drawing showing an example of the above-mentioned filtering operation. FIG. 22 shows the case where a low-pass filter F is used to filter the integer pels at a [1/8, 6/8, 1/8] ratio as shown in the following equations (7).

$$\hat{I}(x,y) = F_y[F_x[I(x,y)]]$$

$$F[I(n)] = (I(n-1) + 6*I(n) + I(n+1))/8 \quad (7)$$

This filter filters equal to or lower frequency component than $\{\cos(\omega t/2)\}2$ so as to reduce a deviation in the spatial frequency characteristic in a prediction picture portion. After the low-pass filtering, a one-to-one correspondence is established between the pels of an input picture block and a prediction picture portion. Then, transformed block matching, determination of the motion vector, and motion compensated prediction mode determination are made, as in the embodiments described hereinbefore.

A filtering operation and associated configurations of the transformed block matching unit and the motion compensator for implementing the filtering operation will now be described.

In this embodiment, the transformed block matching unit and the motion compensator have configurations which are different from those described in the above-mentioned embodiments. A transformed block according to this embodiment is simply a reduced transformed block described in the fourth embodiment. In this embodiment, the transformed block matching unit is regarded as a variation of the transformed block matching unit 42 within the motion detector 8*c* and is indicated by reference numeral 42*c*. Furthermore, the motion compensator is also regarded as a variation of the motion compensator 9 and is indicated by reference numeral 9*b*.

Figure 23:
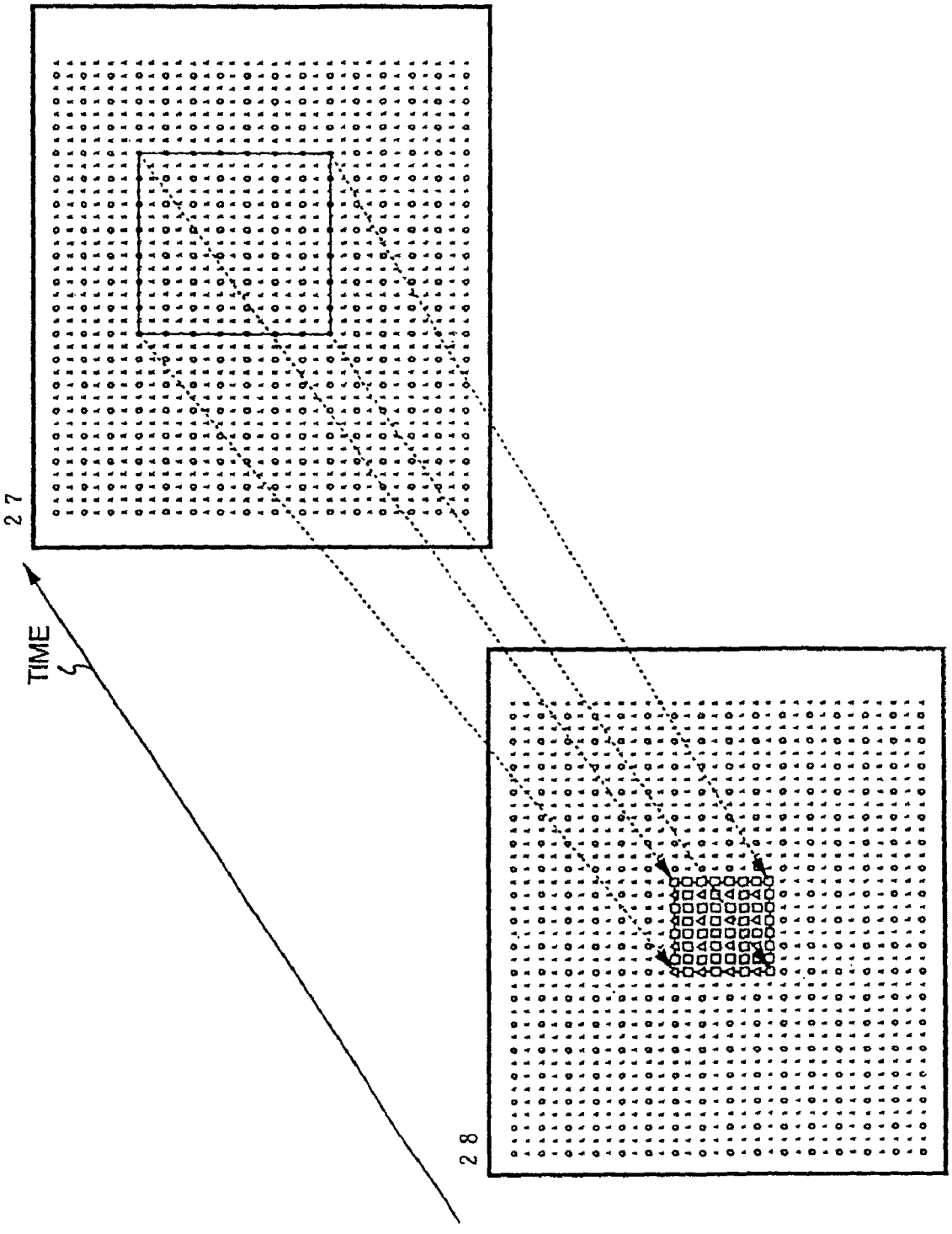
FIG. 23 is a combination of explanatory drawings which describe an operation outline of a transformed block matching unit 42c.
Figure 24:
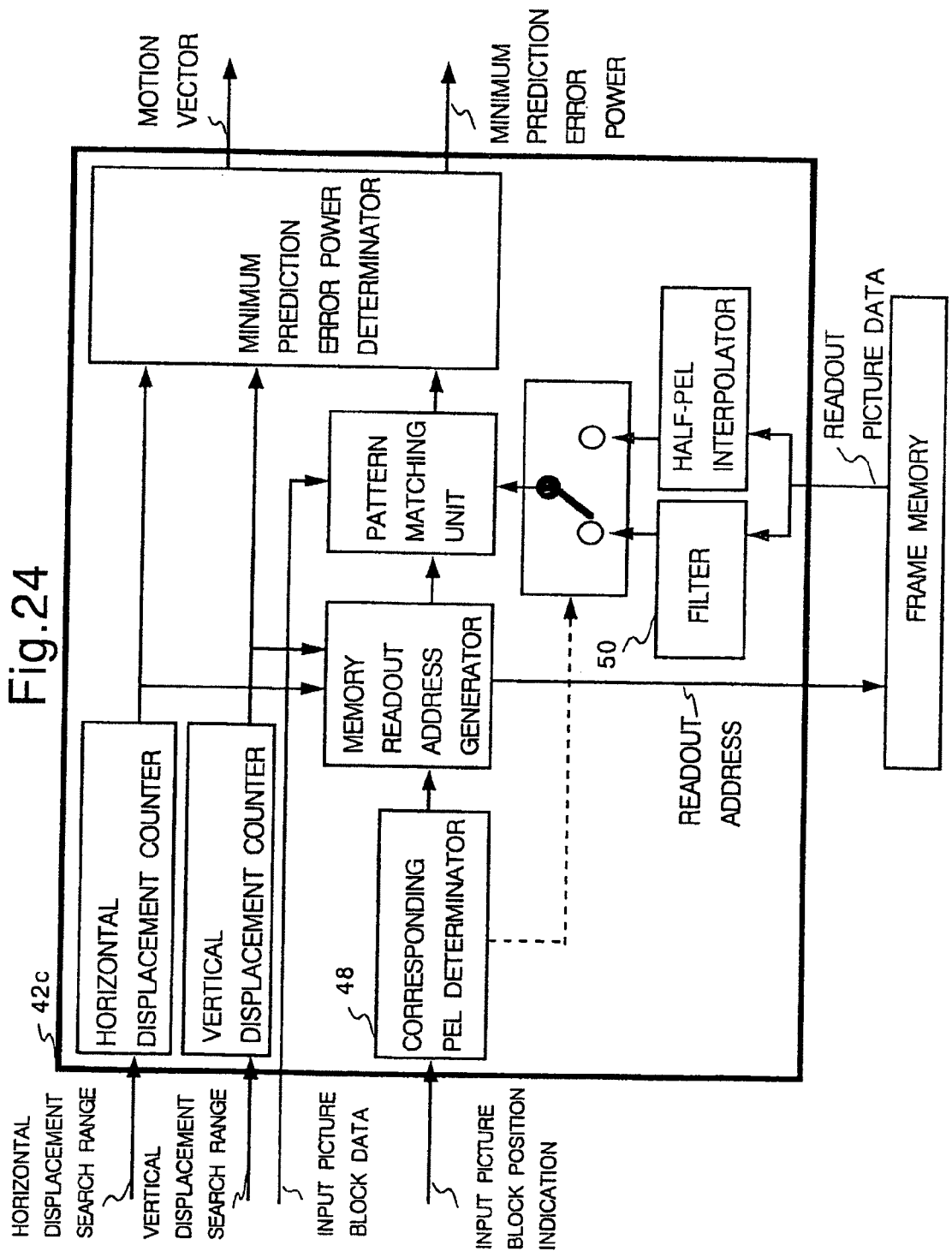
FIG. 24 is a block diagram showing an internal configuration of the transformed block matching unit 42c.
Figure 25:
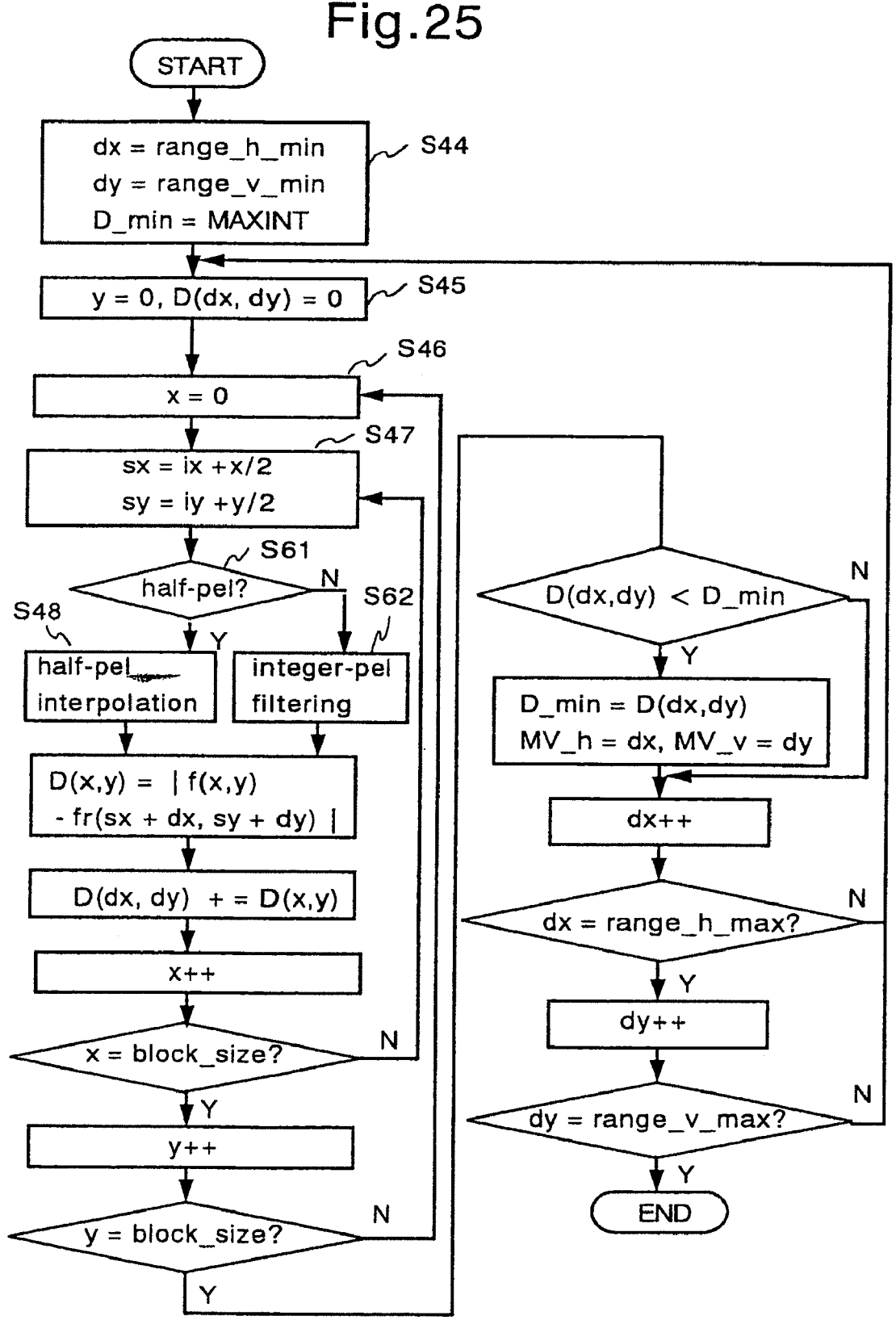
FIG. 25 is a flow chart showing operations of the transformed block matching unit 42c.

FIG. 23 is a combination of explanatory drawings which describe an operation outline of the transformed block matching unit 42*c* according to this embodiment. FIG. 24 is a block diagram showing a detailed internal configuration of the transformed block matching unit 42*c*. FIG. 25 is a flow chart showing the operations of the transformed block matching unit 42*c* according to this embodiment.

In the drawings, elements or steps assigned the same reference numerals as those in the aforementioned drawings mean the same elements or operations.

First, the operation of the transformed block matching unit 42*c* will be described. With regard to operations similar to those described in the fourth embodiment, the description about these operation will be omitted.

1) Operation Outline

A transformed block can be defined in quite the same way as in the fourth embodiment. This embodiment is different from the fourth embodiment in that the integer pels of a prediction picture portion are filtered. As shown in FIG. 23, Δ pels are provided in the reference picture so as to be filtered. A transformed block is comprised of Δ and □ pels.

2) Initial Settings (Transformed Block Search Range and Initial Value Setting)

These operations are performed in the same way as those described in the fourth embodiment.

3) Possible Prediction Picture Portion Readout Operation

First, the pel (sx, sy) corresponding to the pel (x, y) in an input picture block is determined in the same way as that described in the fourth embodiment. Next, the reference picture pel (sx+dx, sy+dy) is fetched from the frame memory. Then, it is determined whether the pel (sx+dx, sy+dy) is an integer pel or a half-pel. In other words, it is determined whether sx+dx and sy+dy are both half-pel components. The corresponding pel determinator 48 illustrated in FIG. 24 makes this determination. This operation corresponds to step S61 in FIG. 25. When the reference picture pel (sx+dx, sy+dy) has been determined to be a half-pel, half-pel is interpolated by the half-pel interpolater 232. When the reference picture pel (sx+dx, sy+dy) has been determined to be an integer pel, a filter 50 implements integer-pel filtering as shown in FIG. 22. This operation corresponds to step S62 in FIG. 25.

With regard to the following:
4) Prediction Error Power Calculation;
5) Minimum Prediction Error Power Updating; and
6) Motion Vector Value Determination,
these operations are implemented in the same way as the operations described in the fourth embodiment.

Next, the motion compensation process will be described.
The motion compensator 9*b* implements the motion compensation process.

Figure 26:
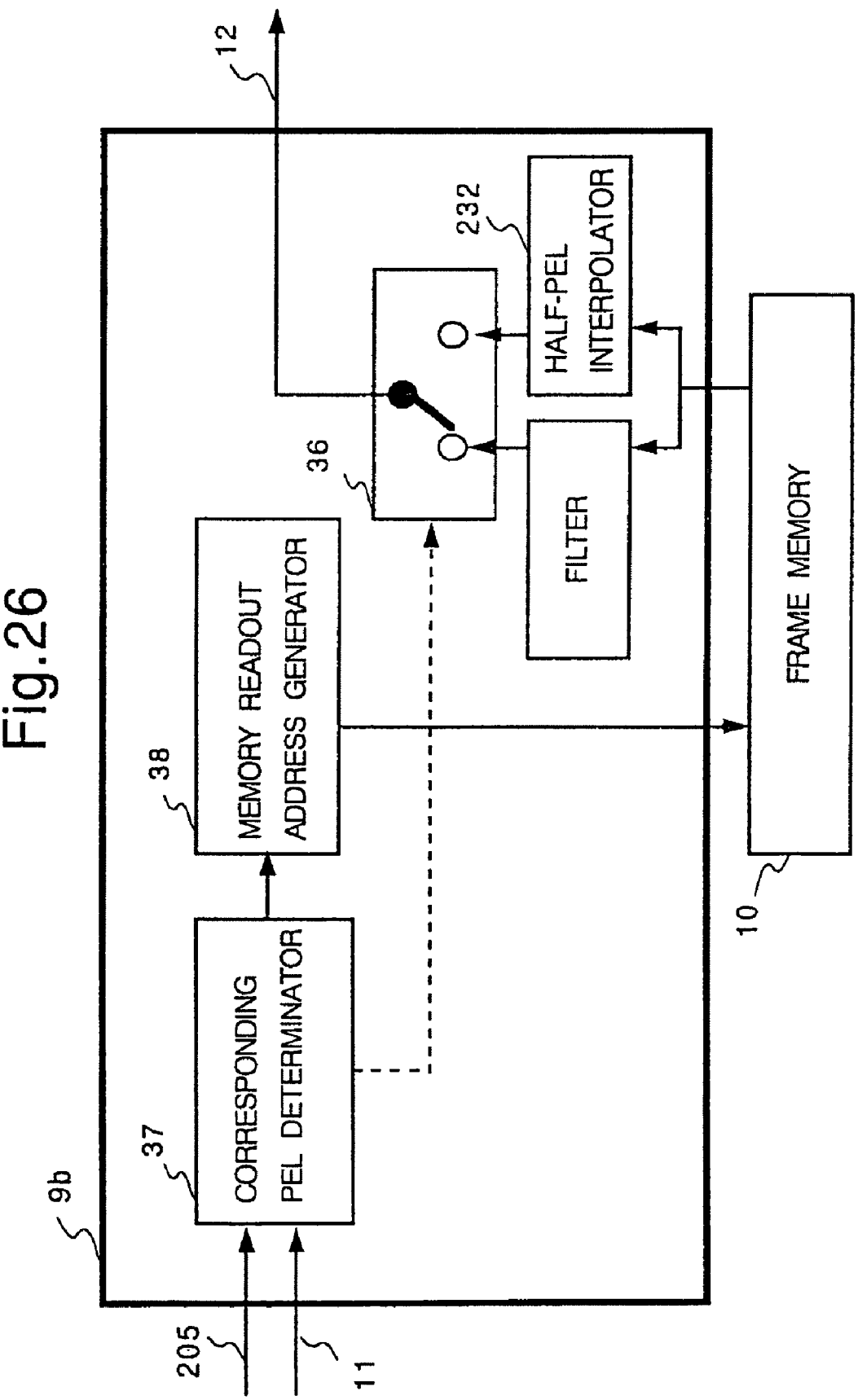
FIG. 26 is a block diagram showing an internal configuration of a motion compensator 9b according to the sixth embodiment.
Figure 27:
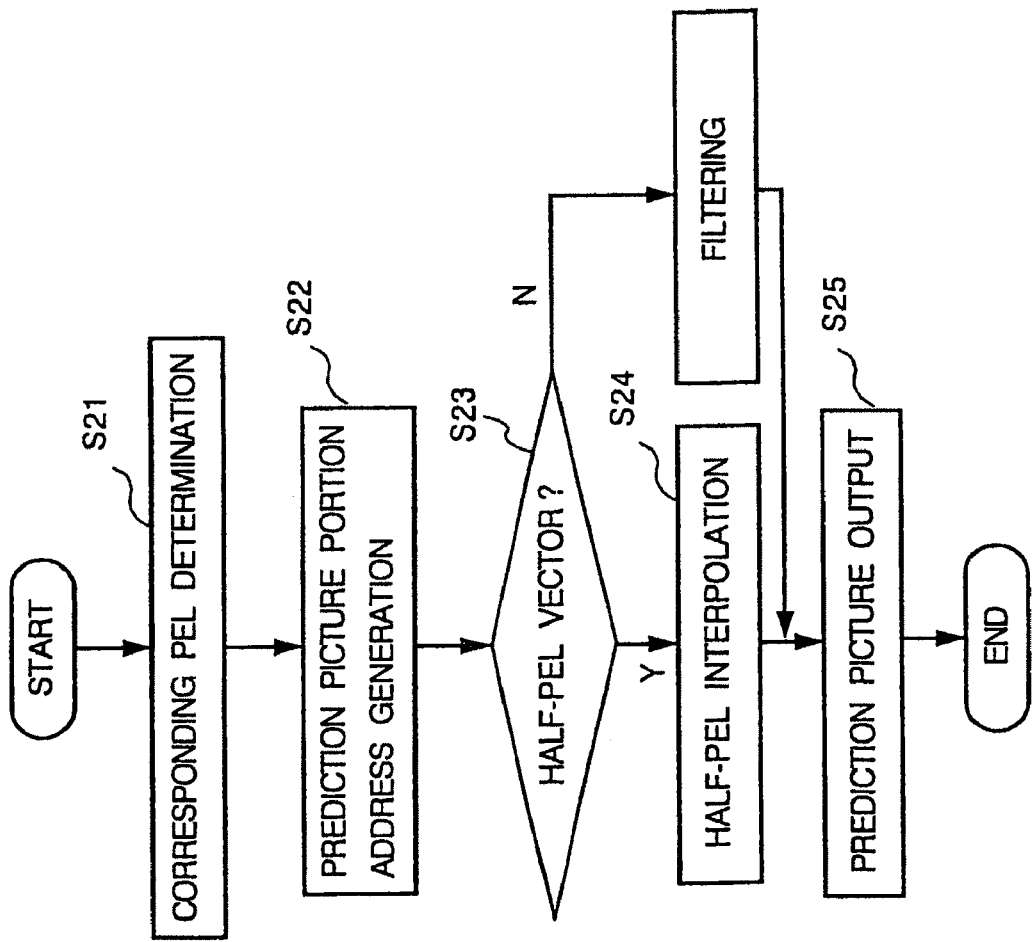
FIG. 27 is a flow chart showing operations of the motion compensator 9b according to the sixth embodiment.

FIG. 26 is a block diagram showing an internal configuration of the motion compensator 9*b*. FIG. 27 is a flow chart showing the operations of the motion compensator 9*b* according to this embodiment.

In this embodiment, the filter 50 is provided within the motion compensator 9 illustrated in FIG. 7. The corresponding pel determinator 37 implements the same operations as described in the fourth embodiment. When the motion compensated prediction mode represented by the motion parameters 11 indicates block matching, the corresponding pel is expressed with a sample point of a reference picture portion translated from the input picture block position indication signal 206 to an area specified by the motion vector. This operation corresponds to step S204 in FIG. 44. The reference picture pel (x+dx, y+dy) when dx and dy are expressed in terms of the motion vector is thus determined.

When the motion compensated prediction mode represented by the motion parameters 11 indicates transformed block matching, the reference picture pel (x+dx, y+dy) is expressed with a sample point included in a reference picture portion to which a displacement indicated by the input picture block position indication signal 206 is added and then translated by an area specified by the motion vector. This operation corresponds to step S47 in FIG. 17. The reference picture pel (sx+dx, sy+dy) within the reference picture 28 when dx and dy are expressed in terms of the motion vector is thus determined. In either case, it is determined whether the reference picture pel is an integer pel or a half-pel. When the reference picture pel has been determined to be an integer pel, the filtering of the pel as shown in FIG. 22 will be implemented in the same way as that implemented by the transformed block matching unit for generating a prediction picture portion. This filtering is implemented by the filter. The prediction picture portion data readout operation and prediction picture portion generation will be implemented in the same way as those described in the first embodiment.

The transformed block matching unit 42*c* may implement the search for an unfiltered prediction picture portion or a prediction picture portion filtered by the filter F and supply the searched result to the motion compensated prediction mode determinator 22. Alternatively, the transformed block matching unit 42*c* may implement the search for an unfiltered prediction picture portion alone and then filter the unfiltered prediction picture portion by using the filter F so as to determine the prediction picture portion exhibiting the greatest prediction accuracy.

When the transformed block matching unit 42*c* has a facility for turning the filter F ON or OFF, the filter ON/OFF information should be included in the motion parameters 11.

According to this embodiment, only the filtering of integer pels can reduce a deviation in the spatial frequency characteristic of a prediction picture portion. Thus, appropriate motion compensated prediction can be performed even for an input picture block where only the motion vector indicating a translational displacement cannot minimize a prediction error, or for which correct prediction cannot be performed.

Embodiment 7

Figure 28:
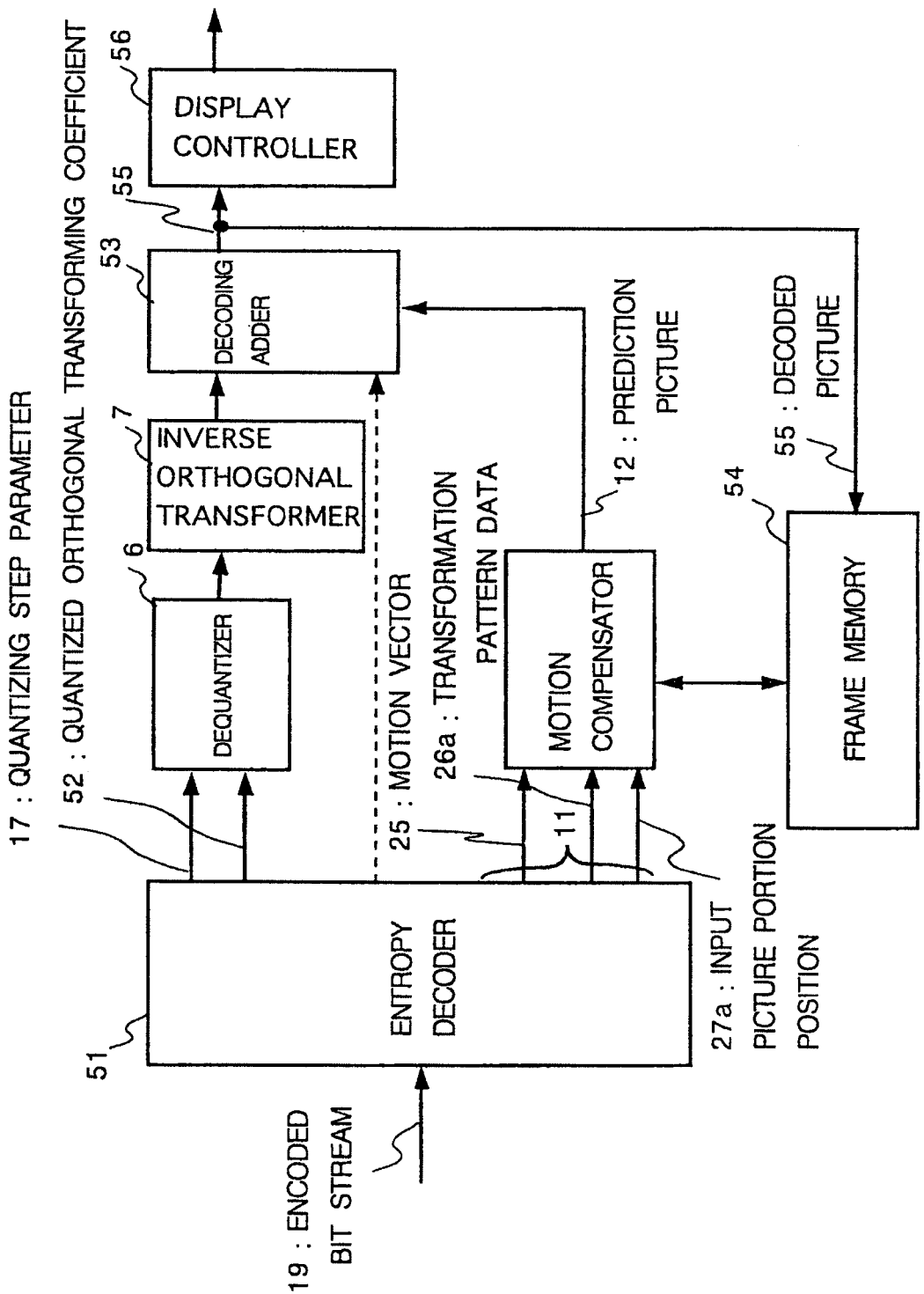
FIG. 28 is a block diagram showing a configuration of a video decoder according to a seventh embodiment of the invention.

FIG. 28 is a block diagram showing a configuration of a video decoder for decoding compression encoded digital picture data, decompressing the compression encoded digital picture data, and reproducing a picture using the motion compensated prediction method according to this embodiment. Herein, a video decoder for receiving compression encoded data (which will be referred to as a bitstream) 19 generated by the video encoder described in the first embodiment, decompressing the bitstream, and reproducing a complete picture will be described.

Referring to FIG. 28, reference numeral 51 indicates an entropy decoder, reference numeral 6 is a dequantizer, reference numeral 7 is an inverse orthogonal transformer, is a decoding adder, 54 is a frame memory, and 56 indicates a display controller.

The decoder according to this embodiment is characterized in the configuration and operation of the motion compensator 9. The configuration and operation of each element other than the motion compensator 9 has been described, and a detailed explanation will be omitted. The motion compensator 9 is the same as that illustrated in FIG. 1. Consequently, an internal configuration of the motion compensator 9 is as illustrated in FIG. 7, and an operation flow chart thereof is as illustrated in FIG. 8.

The operation of the motion compensator 9 having the above-mentioned configuration will be described.

First, the bitstream is analyzed through the entropy decoder 51 and separated into a plurality of encoded data. A quantized orthogonal transforming coefficient 52 is supplied to the dequantizer 6 and dequantized using a dequantizing step parameter 17. The dequantized result is subjected to an inverse orthogonal transformation through the inverse orthogonal transformer 7 and supplied to the decoding adder 53. The inverse orthogonal transformer is the same as that within the encoder, e.g., DCT, described hereinbefore.

The following three kinds of data are supplied to the motion compensator 9 as the motion parameter 11: the motion vector 25 decoded from the bitstream by the entropy decoder 51; the transformation pattern data 26a; and the input picture portion position data 27a showing the position of the input picture portion (in this embodiment, a fixed size of block) in the display. In this case, the motion vector 25 and the input picture portion position data is fixed values for each input picture portion. The transformation pattern data 26a can be fixed value for each input picture portion, or can be encoded for using the same transformation pattern data for all input picture portions included in larger picture consisting of a plurality of input picture portions (e.g., a picture frame, and VOP disclosed in ISO/IEC JTC1/SC29/WG11). The motion compensator 9 fetches the prediction picture data 12 from the reference picture data stored in the frame memory 54 based on these three kinds of data. The process for the prediction picture generation will be described in the explanation of the operation of the motion compensator 9.

The motion parameters 11 decoded by the entropy decoder 51 are supplied to the motion compensator 9.

The motion compensator 9 fetches the prediction picture data 12 from the reference picture data stored in the frame memory 54 according to the motion parameters 11. According to the motion compensated prediction method of the present invention, a one-to-one correspondence is established between the pels of an input picture block and the pels of a prediction picture portion. Consequently, as in the motion compensated prediction using the conventional block matching method, a single prediction picture portion is determined by using the motion parameters 11.

Based on the value of the intra-/interframe encoding indication flag 16, intraframe encoding or interframe encoding is selected. Then, when intraframe encoding has been selected, the decoding adder 53 outputs the output of the inverse orthogonal transformer as the decoded picture data 55. While on the other hand, when interframe encoding has been selected, the decoding adder 53 adds the prediction picture data 12 to the output of the inverse orthogonal transformer and outputs the added result as the decoded picture data 55. The decoded picture data 55 is supplied to the display controller 56 to be displayed on a display device (not shown). In addition, the decoded picture data 55 is also written into the frame memory 54 to be used as reference picture data for the subsequent frame decoding process.

Next, the prediction picture generation by the motion compensator 9 is explained hereinafter.

In the picture prediction method according to this embodiment, the correspondence between the pels consisting the input picture portion and the pels consisting the prediction picture is predetermined by the transformation pattern data 26a. Accordingly, the prediction picture can be generated by a simple address computation based on displacement by the motion vector 25 and adjustment by the transformation pattern data 26a and interpolation.

Figure 29:
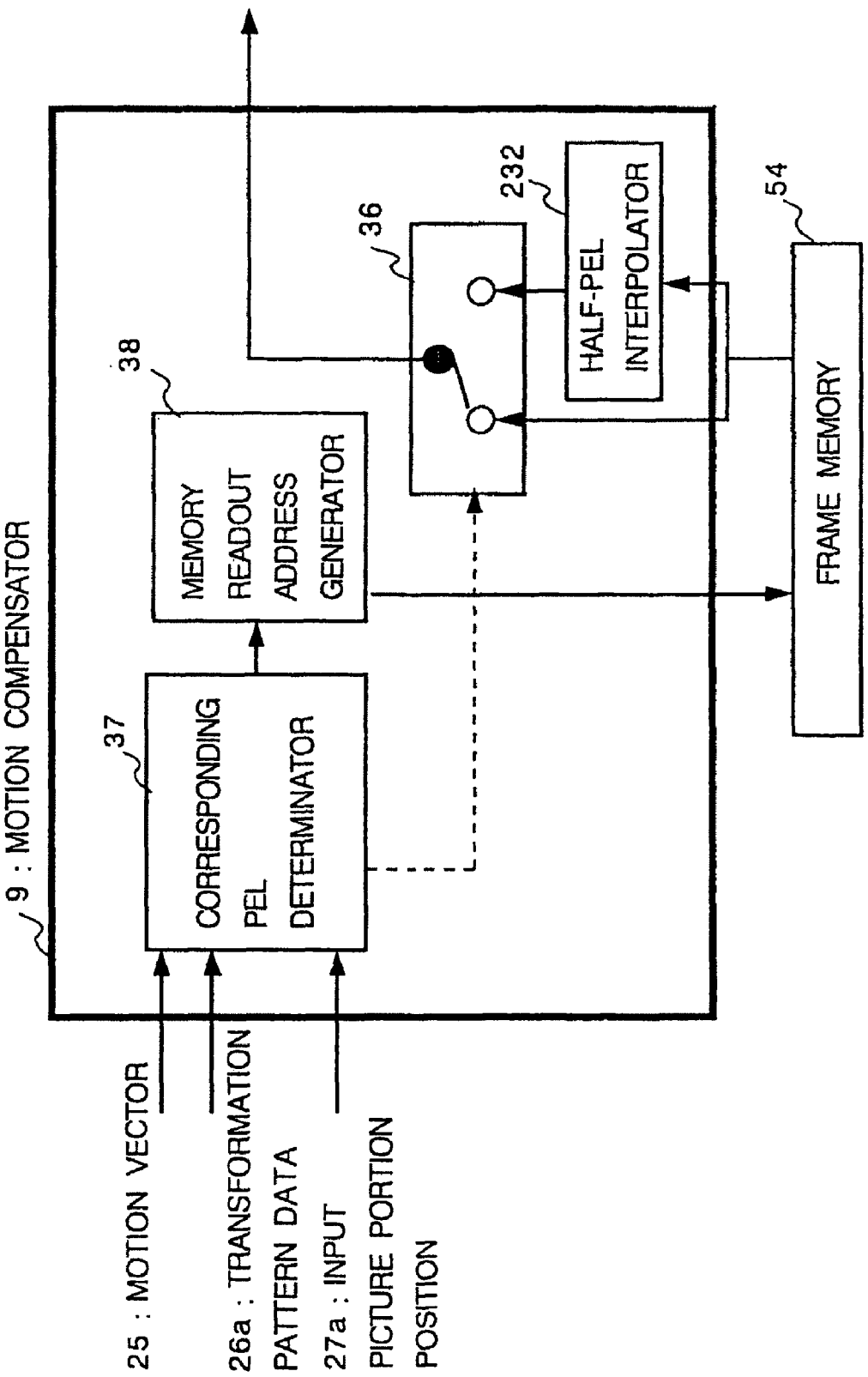
FIG. 29 shows an internal configuration of the motion compensator 9 of the seventh embodiment.

FIG. 29 shows an internal configuration of the motion compensator 9.

In the figure, a reference numeral 37 indicates the corresponding pel determinator and 38 indicates a memory readout address generator.

Figure 30:
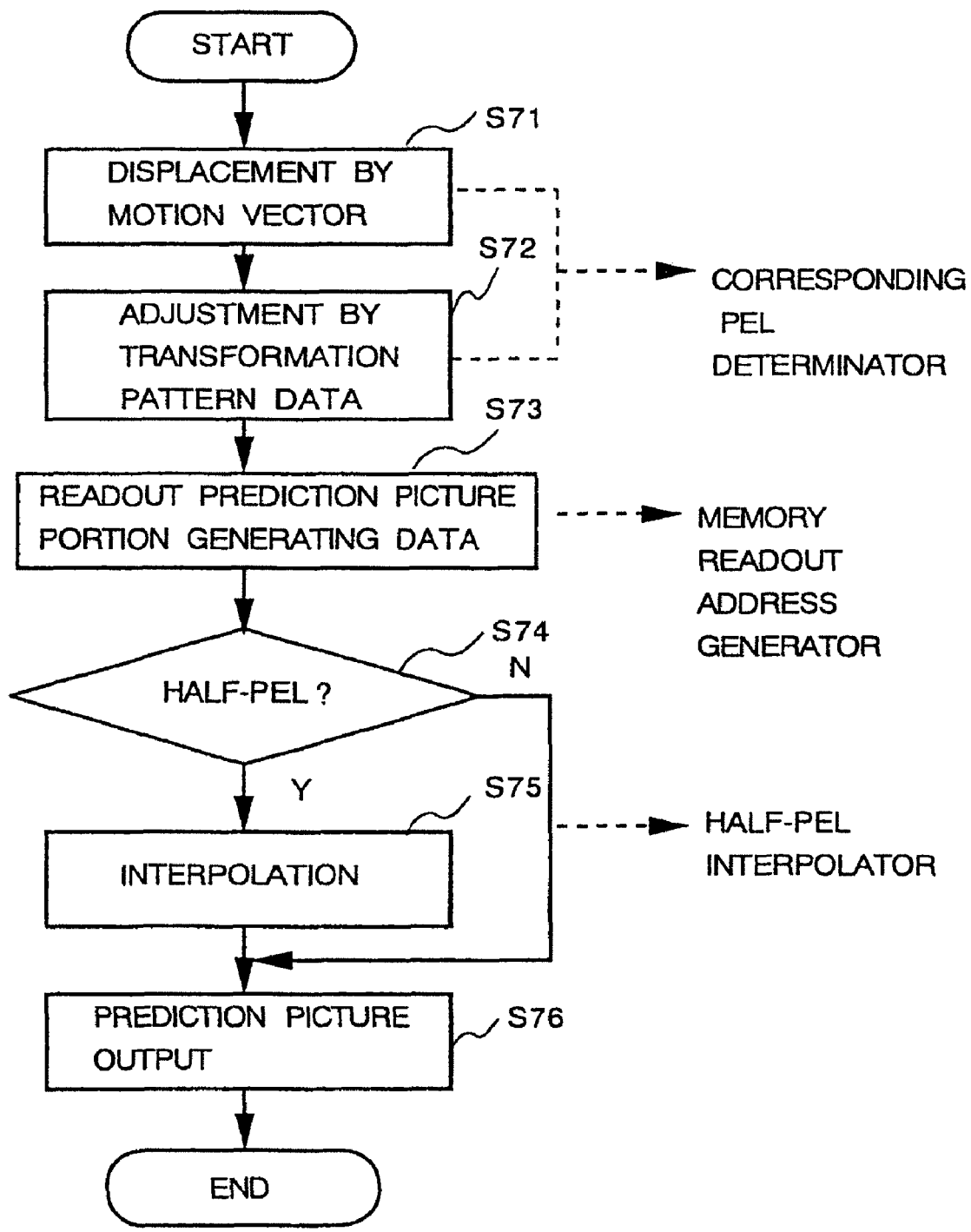
FIG. 30 is a flowchart showing an operation of the motion compensator 9 of FIG. 29.

FIG. 30 is a flowchart showing an operation of the motion compensator.

Figure 31:
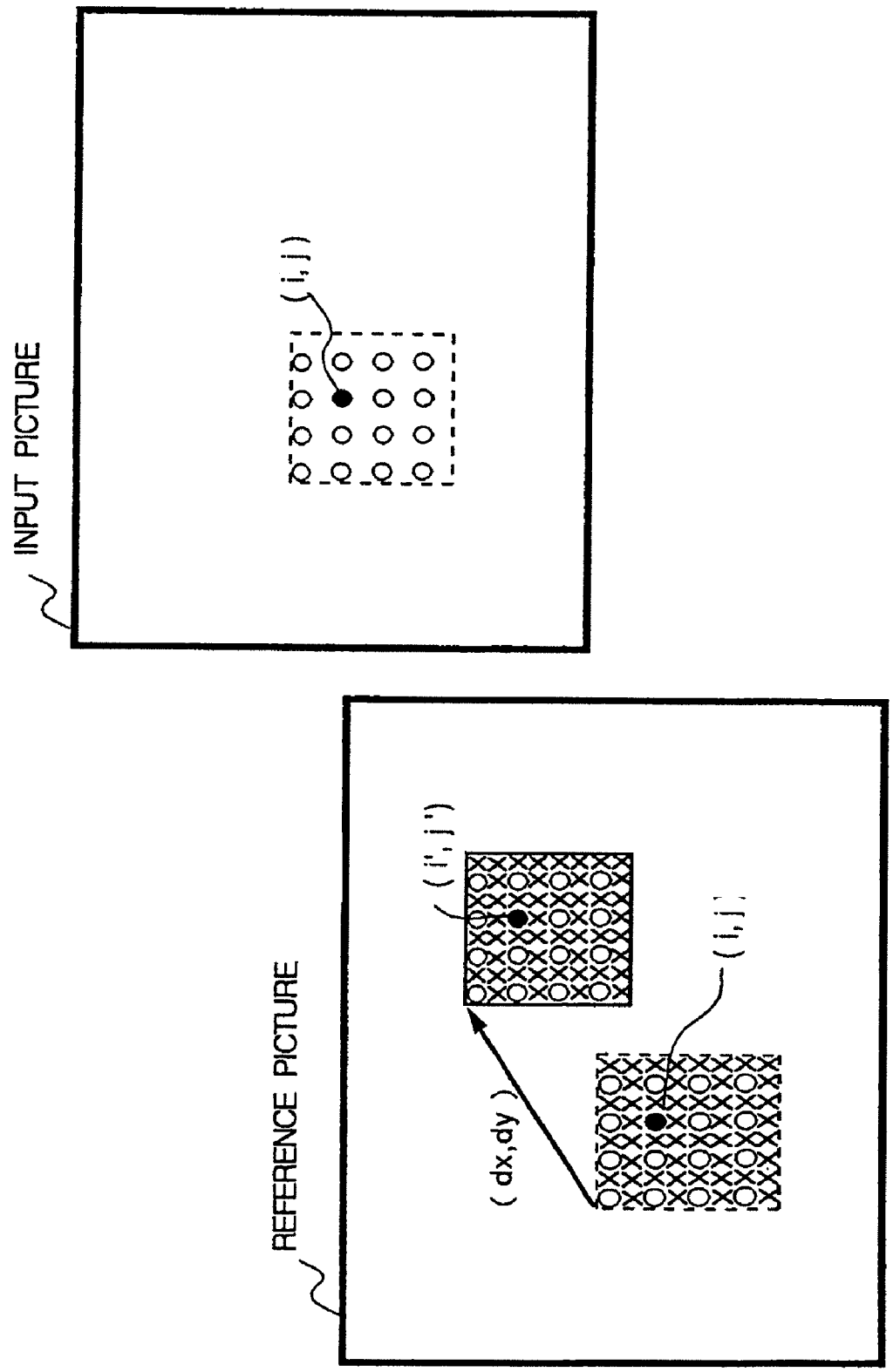
FIG. 31 explains that the pel position is transferred by the motion compensator 9 of FIG. 29.
Figure 32:
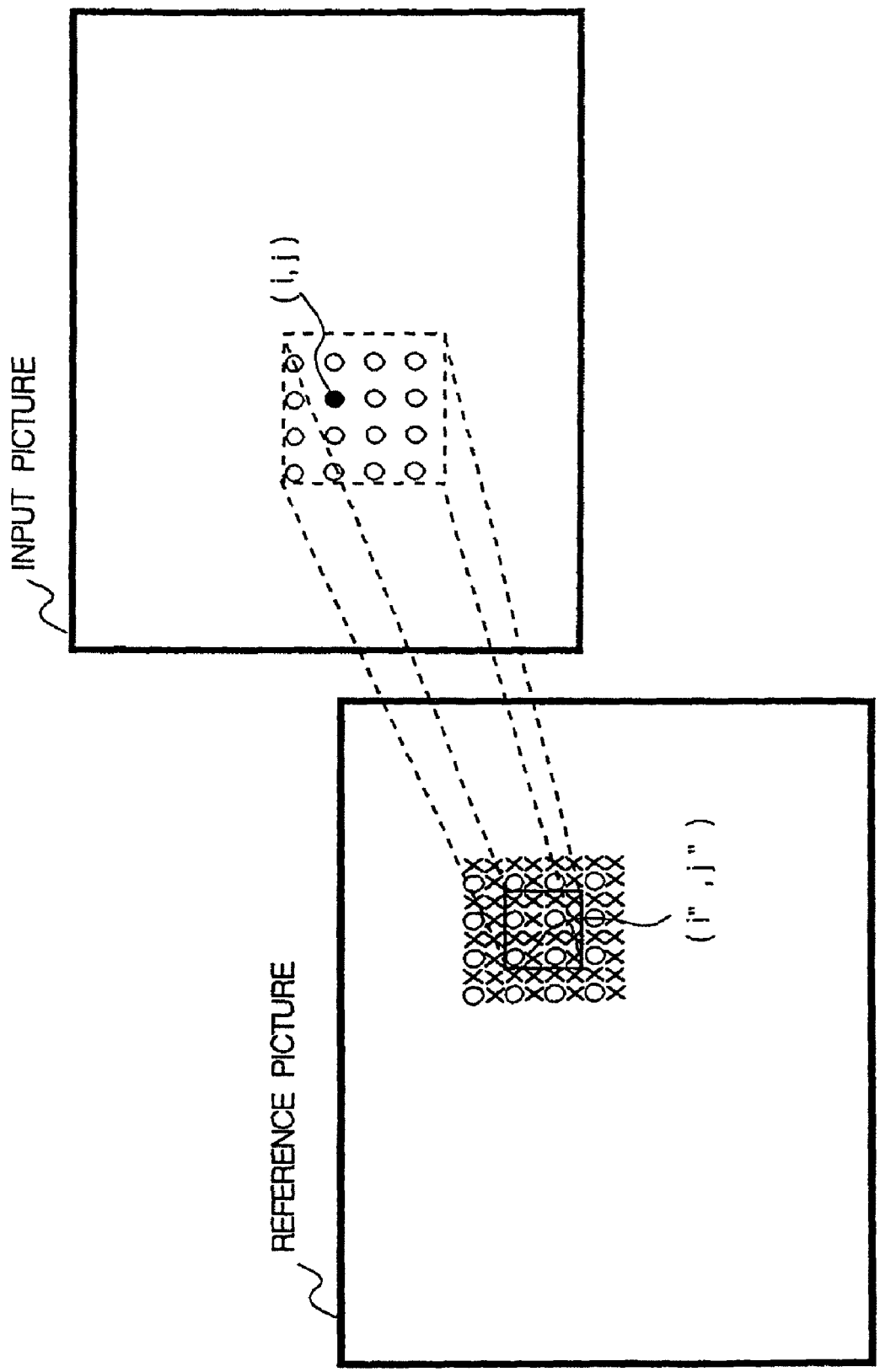
FIG. 32 explains an example of transformation performed by the motion compensator 9 of FIG. 29.

FIG. 31 explains that a block extracted from the reference picture is transferred by an amount indicated by the motion vector to the pel position of the input picture. FIG. 32 explains that addressing is done to the transferred block by the predetermined transformation pattern.

In the above drawings, ○ shows integer pel and x shows half-pel.

In the following, an operation of the motion compensator 9 of this embodiment will be explained referring to FIGS. 29 and 30.

1) Corresponding Pel Determination

First, the corresponding pel determinator 37 computes a sample position of the prediction picture corresponding to each pel of the input picture based on the received motion vector 25 and the transformation pattern data 26a. A reference position of the prediction picture corresponding to the present position of the input picture portion is determined based on the motion vector 25. This process (step S71 of FIG. 30) corresponds to determining (i', j')=(i+dx, j+dy) when the input picture portion position 27a is assumed (i, j) and the motion vector 25 is assumed (dx, dy) as shown in FIG. 31.

Then, the pel (i', j') is adjusted based on the transformation pattern data 26a and the sample position of the prediction picture is finally obtained. FIG. 32 shows an example where the transformation pattern data 26a indicates "horizontal & vertical ½ reduction". By this transformation pattern data, an effective area of the prediction picture portion becomes ¼ of an effective area of the input picture portion positioned in the display. That is, the prediction picture is reduced from the input picture portion, thus the motion prediction accompanying enlargement and so on becomes efficient. Concrete position adjustment is implemented by obtaining the adjusted pel (i", J") corresponding to the pel (i', j') of the reference picture. This can be performed by the following operation (step S72 of FIG. 30).

for (y=0; y<block_height; y++)

$j''=j'+y/2$ for (x=0; x<block_width; x++)

$i''=i'+x/2$ (7)

In FIG. 32, it is assumed that block_width=block_height=4, namely, a block consists of 4×4 pels. In this case, a block can consist of an arbitrary number of positive integer pels for height and width of the block.

The pel position (i", j") obtained above is output as a prediction picture sample pel position corresponding to the pel (i, j).

2) Prediction Picture Generating Data Readout

The memory readout address generator 38 generates a memory address indicating picture data position required for generating the prediction picture within the reference picture stored in the frame memory 54 based on the prediction picture sample pel position supplied from the corresponding pel determinator 37. The memory readout address generator 38 then reads out the prediction picture generating data.

3) Prediction Picture Generation

Figure 33:
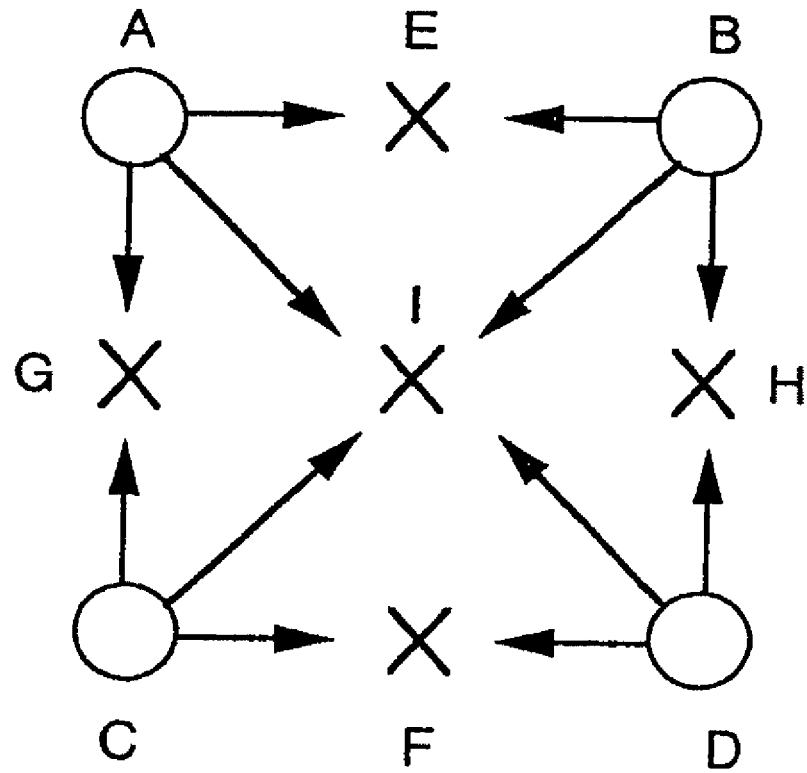
FIG. 33 shows a half-pel interpolation for computing pel position.

On addressing only integer pel position within the pels for generating the prediction picture, the prediction picture generating data becomes pel positions constituting the prediction picture. On the contrary, on addressing half-pel positions, the half-pel interpolator 232 operates interpolation of the prediction picture generating data to generate half-pels. FIG. 33 shows a concrete operation of half-pel interpolation. By a method shown in FIG. 33, half-pel is simply generated by addition and division by 2. This process corresponds to step S24 of FIG. 8 showing a flow chart of the half-pel interpolator 232 described in the first embodiment.

The operation of the motion compensator 9 has been described above referring to FIG. 32. When the transformation pattern data includes information different from FIG. 32, transforming operation becomes different.

Figure 34:
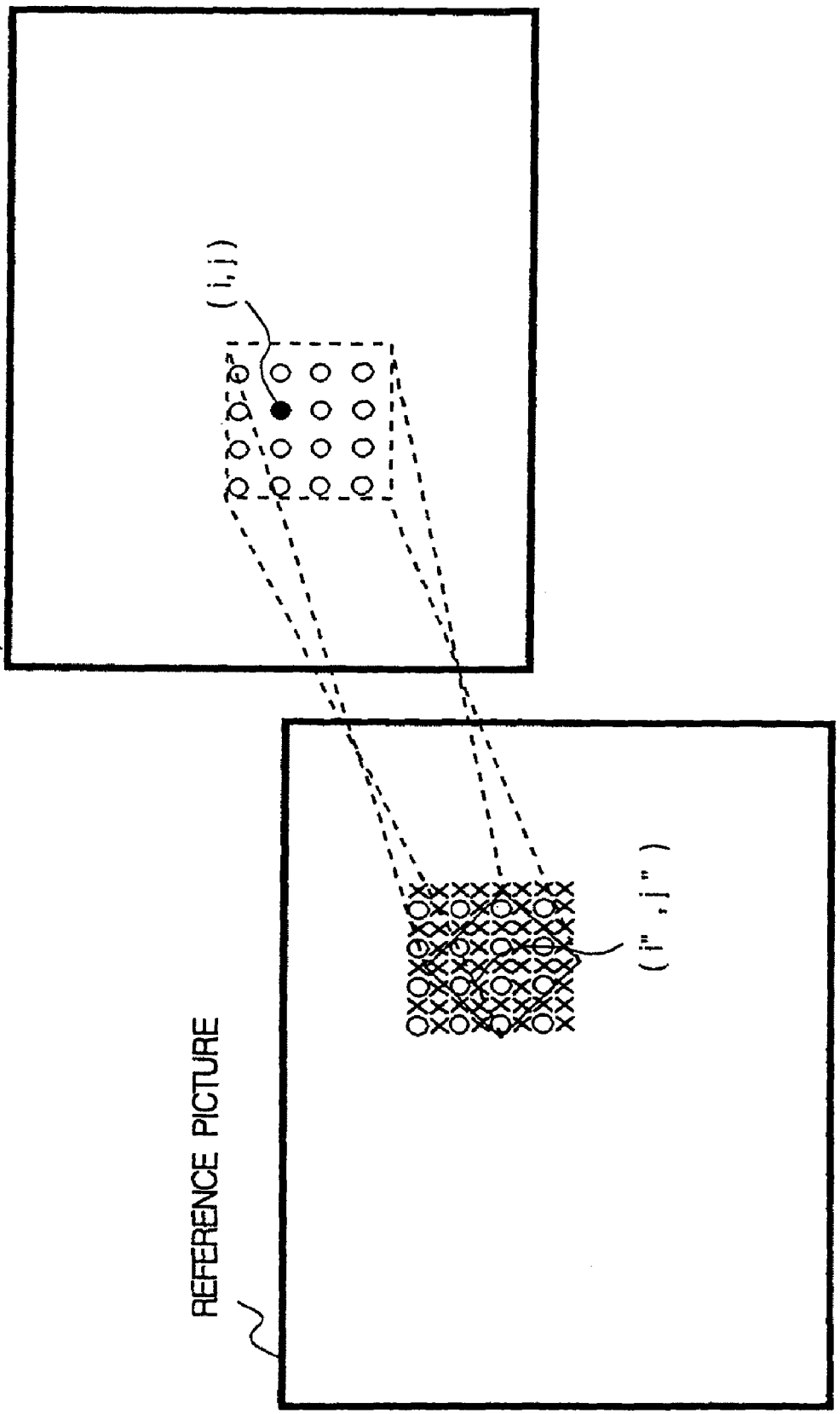
FIG. 34 explains an operation in case that transformation is performed by rotation and enlargement of the block.

An example of another transformation pattern is shown in FIG. 34. In this case, the corresponding pel (i", j") of the transformed block is obtained by the following.

$ix=iy=j'+2$ for (y=0; y<block_height; y++)

$rdx=rdx=y/2;$ for (x=0; x<block_width; x++)

$rdx+=0.5;$ $rdy-=0.5$ $i''=ix+rdx;$ $j''=iy+rdy;$ (8)

In this way, it is predetermined and specified as the transformation pattern data showing how the transformed block is extracted. Decoding can be implemented by motion compensation of the block transformed by simple addressing based on the transformation pattern data.

As described above, according to the video decoder of the present embodiment, decoded picture can be obtained by simply computing sample pel positions from the encoded bitstream by efficiently predicting a complex motion, which cannot be implemented simply by the translation. This can be implemented by providing the transformation patterns previously.

Further, in this embodiment, decoded picture can be also obtained from the bitstream, which is obtained by the prediction error signal encoded in an encoding method other than the orthogonal transformation encoding method, by changing element except the motion compensator 9 for decoding the prediction error signal.

Further, the above example of this embodiment, where decoding is implemented by a unit of fixed size of block, can be applied to a decoder, where decoding is implemented by a unit of picture object having an arbitrary shape consisting of fixed size of blocks (e.g., Video Object Plane disclosed in ISO/IEC JTCI/SC29/WG11/N1796). For example, in a scene including a person in front of static background as shown in FIG. 9 of the first embodiment, a bitstream having a picture object of a person and small blocks divided from circumscribing rectangle surrounding the picture object of the person. This bitstream of effective blocks including the picture object is encoded and to be decoded. In this case, the similar decoding process can be applied to these effective blocks of the bitstream.

Embodiment 8

In the above seventh embodiment, the predetermined transformation and the motion compensation is implemented only by addressing (indicating pel position) using only integer pels or half-pels corresponding to the video decoder of the first through the sixth embodiments. In this embodiment, another video decoder implementing more precise motion compensation by computing other than half-pel interpolation on addressing will be described.

Figure 35:
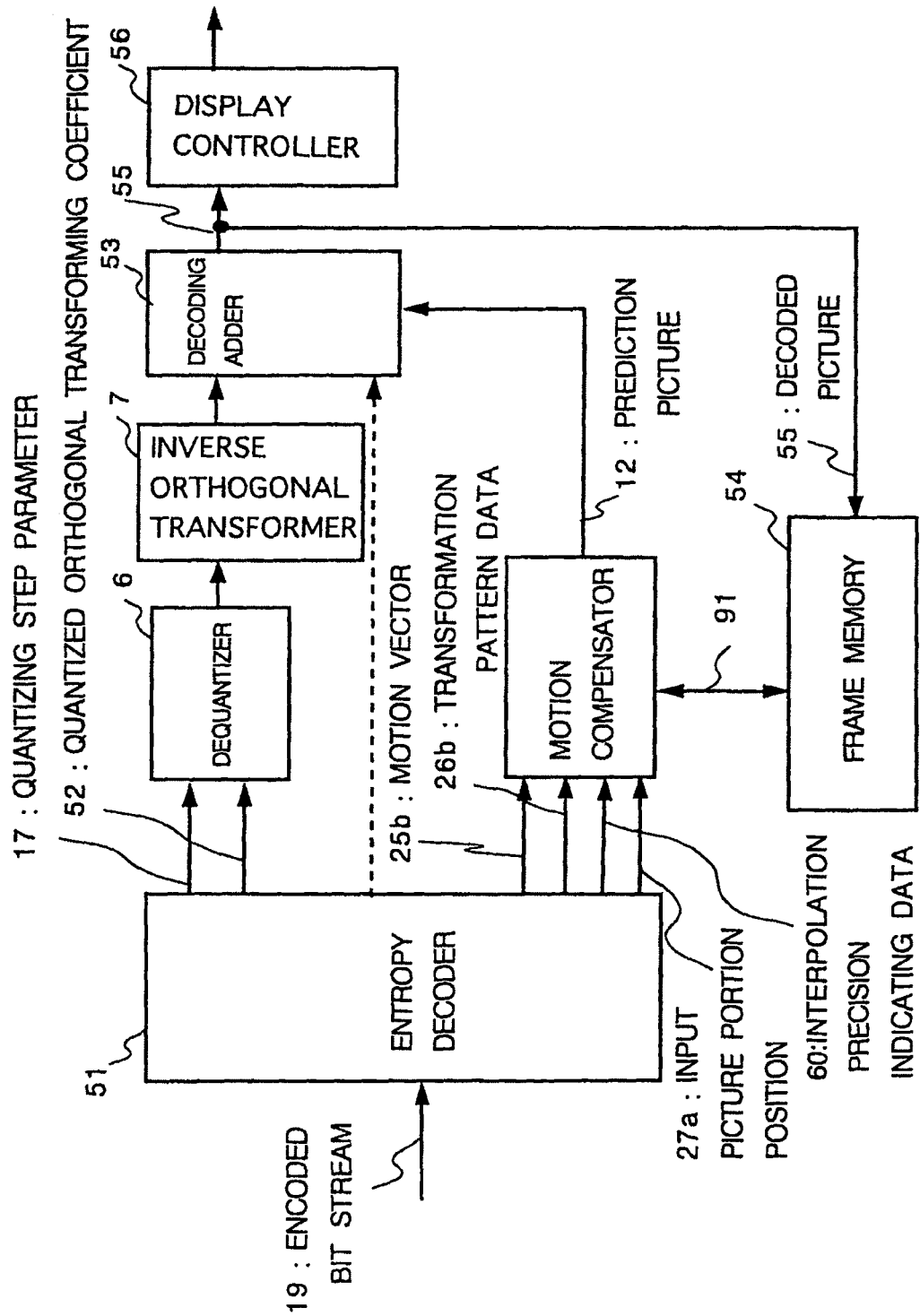
FIG. 35 shows a configuration of a video decoder according to an eighth embodiment of the invention.

FIG. 35 shows a configuration of the video decoder of the embodiment for extending compressed encoded digital picture and reproducing the picture.

In the figure, reference numeral 90 indicates a motion compensator, 25b indicates 0-4 motion vectors, and 60 indicates an interpolation precision indicating data.

Figure 36:
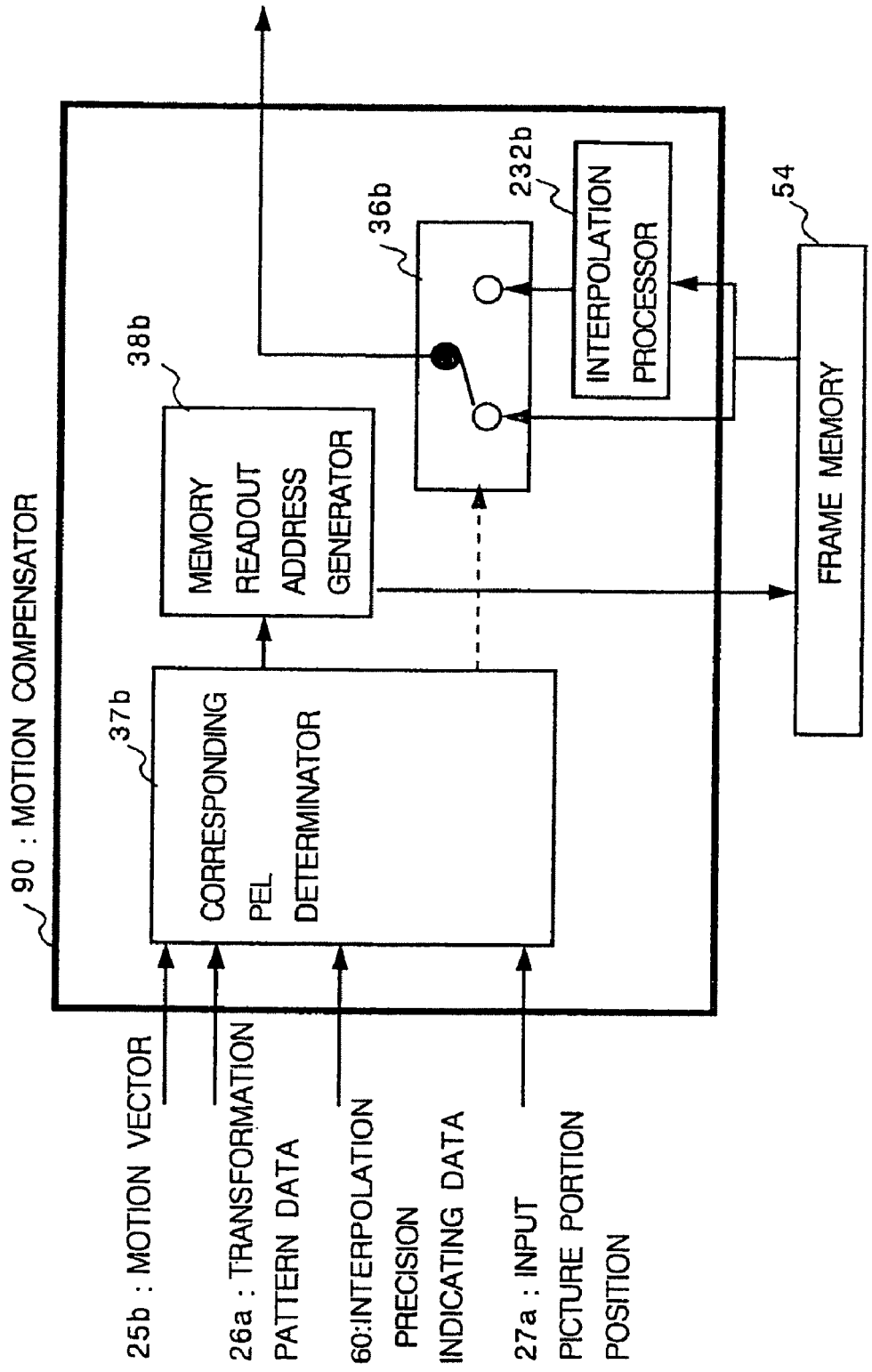
FIG. 36 shows an internal configuration of the motion compensator 90 of the eighth embodiment.

FIG. 36 shows an internal configuration of the motion compensator 90.

In the figure, reference numeral 37b is a corresponding pel determinator which inputs the motion vector 25b, transformation pattern data 26a, input picture portion position 27a and the interpolation precision indicating data 60 shown in FIG. 35 and determines corresponding pel position. An interpolation processor 232b computes pel position interposed between the integer pels. In this case, the input picture portion position 27a is a fixed value for each input picture portion. The motion vector 25b and the transformation pattern data 26a can be fixed values for each input picture portion, or can be encoded for using the same motion vector and the same transformation pattern data for all input picture portions included in larger picture consisting of a plurality of input picture portions (e.g., a picture frame, and VOP disclosed in ISO/IEC JTC1/SC29/WG11).

Figure 37:
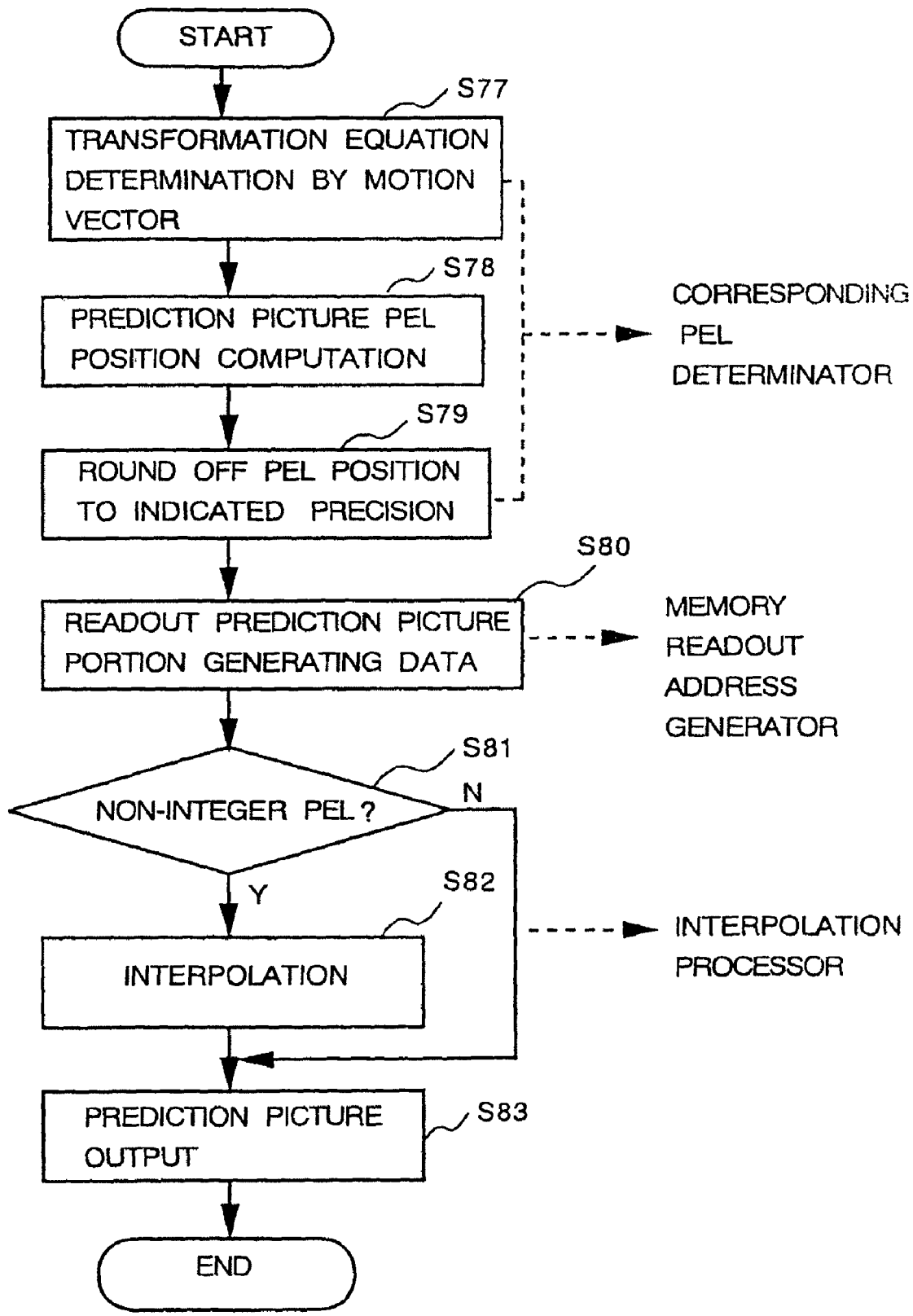
FIG. 37 is a flowchart showing an operation of the motion compensator 90 of FIG. 36.
Figure 38:
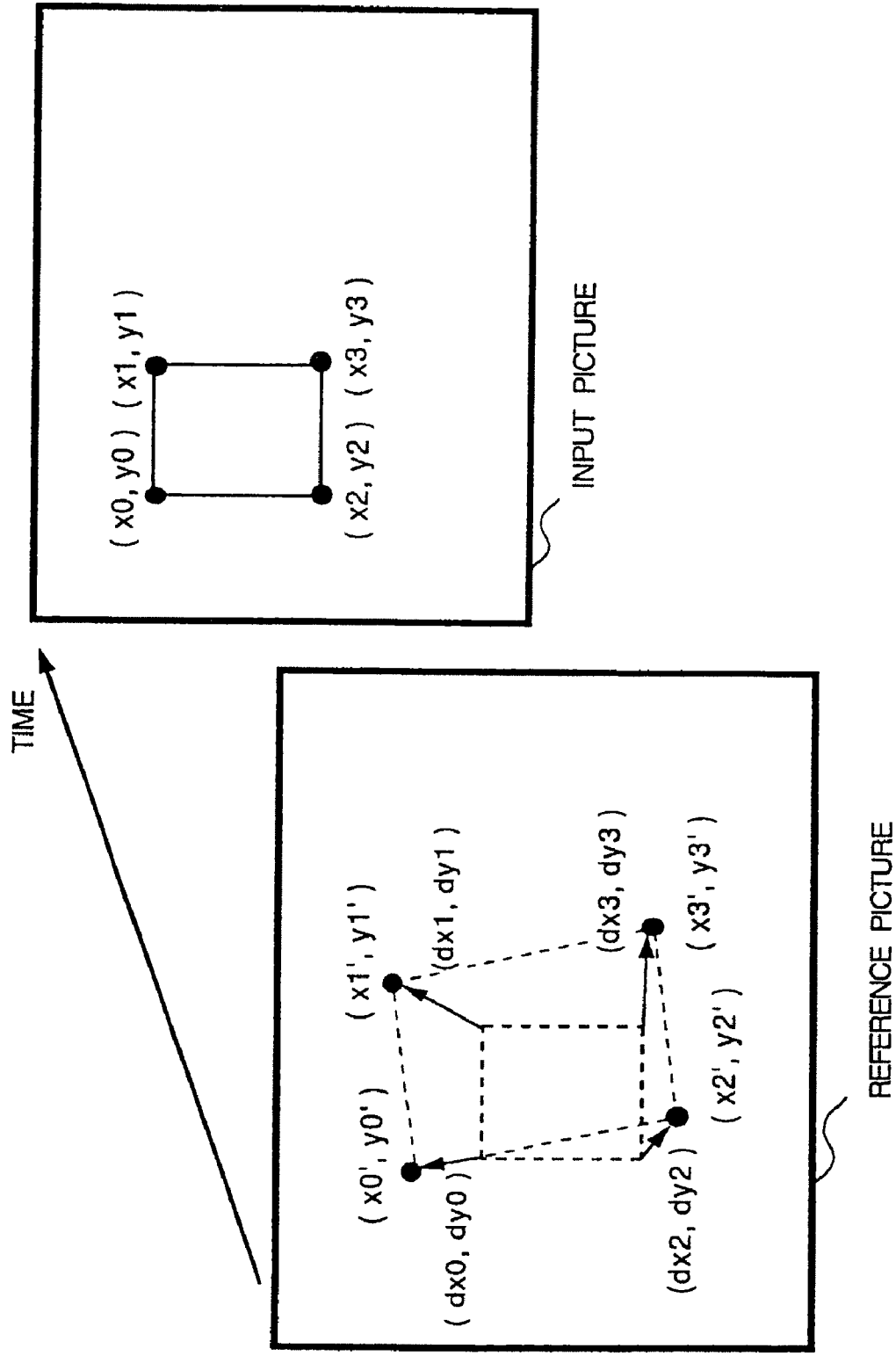
FIG. 38 explains an example of transformation performed by the motion compensator 90 of FIG. 36.

FIG. 37 is a flowchart showing an operation of the motion compensator of FIG. 36, and FIG. 38 explains the same operation.

In the following, an operation of the apparatus of the above configuration.

Conventionally, corresponding pel is determined by only one motion vector representing the corresponding block. In this embodiment, pel positions are determined by computation for determining corresponding pels described below from four pieces of input corresponding to four corners within the reference picture block. Then, the obtained pel position is rounded to the precision indicated by the interpolation precision indicating data to finally determine pel position.

The operation of this embodiment is identical to the seventh embodiment except the motion compensator 90. Namely, the entropy decoder 51 analyzes the bitstream to divide into each encoded data. The quantized orthogonal transforming coefficient 52 is decoded through the dequantizer 6 and the inverse orthogonal transformer 7 using the quantizing step parameter 17 and is supplied to the decoding adder 53. The decoding adder 53 outputs the prediction picture data 12 as the decoded picture 55 with/without addition according to intra-/interframe encoding block based on the intra-/interframe encoding indication flag 16. The decoded picture 55 is transmitted to the display controller 56 to output on the display device and stored in the frame memory 54 as the reference picture.

The prediction picture generation of the motion compensator 90 will be explained hereinafter.

In this embodiment, transformation equation is obtained using a necessary number of motion vectors 25b based on the transformation pattern data 26a. After determining sample pel positions of the prediction picture portion corresponding to each pel of the input picture portion by the transformation equation, the prediction picture can be generated by performing simple interpolation to the precision indicated by the interpolation precision indicating data.

In the following, the operation of the motion compensator 90 of this embodiment will be explained by referring to FIGS. 36 through 38.

1) Corresponding Pel Determination

The corresponding pel determinator 37b computes sample pel position corresponding to each pel within the input picture portion based on the input motion vector 25b and the transformation pattern data 26a. As shown in FIG. 38, the motion vectors 25b mean four motion vectors indicating respective motions of four corners of the circumscribing rectangle within the input picture portion. A required transformation equation is obtained based on the transformation pattern data 26a. For example, the following transformation equations are used:

1-1) Without Motion, Static State (Required Number of Motion Vectors: 0)

$$(i',j')=(i,j) \quad (9)$$

1-2) Translation (Required Number of Motion Vectors: 1)

$$(i',j')=(i+dx0, j+dy0) \quad (10)$$

1-3) Isotropic Transformation (Required Number of Motion Vectors: 2)

$$i'=((x1'-x0')/W)*i+((y0'-y1')/W)*j+(x0'-(x0(x1'-x0')+y0(y0'-y1'))/W)$$

$$j'=((y1'-y0')/W)*i+((x1'-x0')/W)*j+(y0'-(y0(x1'-x0')+x0(y0'-y1'))/W) \quad (11)$$

where, (x0, y0): pel position of the left upper corner of the circumscribing rectangle within the input picture portion (x1, y1): pel position of the right upper corner of the circumscribing rectangle within the input picture portion (x0', y0'): displaced pel position of (x0, y0) by the first motion vector (dx0, dy0)

(x1', y1'): displaced pel position of (x1, y1) by the second motion vector (dx1, dy1)

W: x1−x0

1-4) Affine Transformation (Required Number of Motion Vectors: 3)

$$i'=((x1'-x0')/W)*i(x2'-x0')/H*j+(x0'-x0(x1'-x0')/W+y0(x2'-x0'))/H)$$

$$j'=((y1'-y0')/W)*i+((y2'-y0')/H*j+(y0'-x0(y1'-y0')/W+y0(y2'-y0'))/H) \quad (12)$$

where, (x0, y0): pel position of the left upper corner of the circumscribing rectangle within the input picture portion (x1, y1): pel position of the right upper corner of the circumscribing rectangle within the input picture portion (x2, y2): pel position of the left lower corner of the circumscribing rectangle within the input picture portion (x0', y0'): displaced pel position of (x0, y0) by the first motion vector (dx0, dy0)

(x1', y1'): displaced pel position of (x1, y1) by the second motion vector (dx1, dy1)

(x2', y2'): displaced pel position of (x2, y2) by the third motion vector (dx2, dy2)

W: x1−x0

H: y2−y0

1-5) Perspective Transformation (Required Number of Motion Vectors: 4)

$$i'=(A*i+B*j+C)/(P*i+Q*j+Z*W*H)$$

$$j'=(D*i+E*j+F)/(P*i+Q*j+Z*W*H) \quad (13)$$

where, $$A=Z(x1'-x0')*H+P*x1'$$

$$B=Z(x2'-x0')*W+Q*x2'$$

$$C=Z*x0'*W*H$$

$$D=Z(y1'-y0')*H+P*y1'$$

$$E=Z(y2'-y0')*W+Q*y2'$$

$$F=Z(*y0'*W*H$$

$$P=((x0'-x1'-x2'+x3')(y2'-y3')-(x2'-x3')(y0'-y1'-y2'+y3'))*H$$

$$Q=((x1'-x3')(y0'-y1'-y2'+y3')-(x0'-x1'-x2'+x3')(y1'-y3'))*W$$

$$Z=(x1'-x3')(y2'-y3')-(x2'-x3')(y1'-y3') \quad (14)$$

(x0, y0): pel position of the left upper corner of the circumscribing rectangle within the input picture portion (x1, y1): pel position of the right upper corner of the circumscribing rectangle within the input picture portion (x2, y2): pel position of the left lower corner of the circumscribing rectangle within the input picture portion (x3, y3): pel position of the right lower corner of the circumscribing rectangle within the input picture portion (x0', y0'): displaced pel position of (x0, y0) by the first motion vector (dx0, dy0)

(x1', y1'): displaced pel position of (x1, y1) by the second motion vector (dx1, dy1)

(x2', y2'): displaced pel position of (x2, y2) by the third motion vector (dx2, dy2)

(x3', y3'): displaced pel position of (x3, y3) by the fourth motion vector (dx3, dy3)

W: x1−x0

H: y2−y0

The transformation pattern data 26a can take the form of a bit directly indicating one of the above equations (9) through (13), or the form can be bits indicating the number of motion vectors. The input picture portion pel (i, j) can be corresponded to the reference picture portion pel (i', j') using the above transformation equations. On computation of corresponding pel position, the value of a prediction picture sample pel position should be obtained to the extent of precision indicated by the interpolation precision indicating data 60. For example, on rounding to half-pel precision, the sample pel position (i', j') obtained by the above transformation equation should be rounded off to the half-pel precision. On rounding to quarter-pel precision, the sample pel position (i', j') obtained by the above transformation equation should be rounded off to the quarter-pel precision. This sample pel precision indicating data is extracted from the bitstream.

As has been described, in this embodiment, corresponding pel determining rule is set directly by the motion vector 25b and the prediction picture sample pel position is determined based on the corresponding pel determining rule.

2) Prediction Picture Generating Data Readout

The memory readout address generator 38b generates memory address specifying an address of picture data required for generating prediction picture within the reference picture from the addresses stored in the frame memory 54 based on the prediction picture sample pel position supplied from the corresponding pel determinator 37b. Then, the memory readout address generator 38b readouts prediction picture generating data.

3) Prediction Picture Generation

Figure 39:
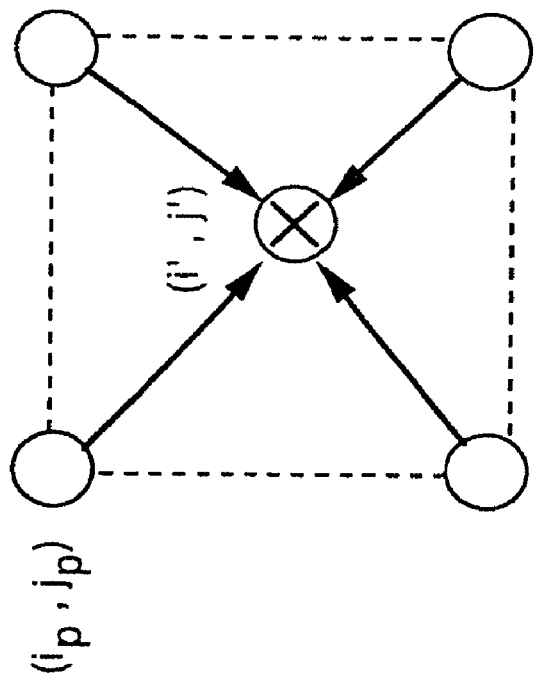
FIG. 39 shows an example of computation of pel position implemented by the motion compensator 90 of FIG. 36.

On addressing only integer pels of the pels included in the prediction picture, the prediction picture generating data becomes prediction picture pel without any changes. According to this embodiment, sample pel position obtained by addressing the prediction picture portion can be pel value of predetermined precision as described above, for example, half-pel, quarter-pel. If the prediction picture sample pel is integer precision, the interpolation processor 232b generates integer pel value of the prediction picture based on the indication of integer precision supplied from the interpolation precision indicating data 60. In this embodiment, the corresponding pel determinator has already rounded off the final sample pel position to the precision indicated by the interpolation precision indicating data 60. The interpolation processor implements the process of the following equation (15) as shown in FIG. 39. If the prediction picture sample pel position is half-pel, the interpolation process becomes the same as the process implemented by the interpolator 232 described in the first embodiment.

$$\hat{I}(x,y) = W_{x1}W_{y1}I(i_p,j_p) + W_{x2}W_{y1}I(i_p+1,j_p) + W_{x1}W_{y2}I(i_p, j_p+1) + W_{x2}W_{y2}I(i_p+1,j_p+1)$$

$$W_{x2} = i' - i_p$$

$$W_{x1} = 1.0 - W_{x2}$$

$$W_{y2} = j' - j_p$$

$$W_{y1} = 1.0 - W_{y2} \quad (15)$$

As explained above, the video decoder according to this embodiment can efficiently predicts motion having various complexity and obtain decoded picture from the encoded bitstream by simple computation of the sample pel position using 0 through plural motion vectors.

In the video encoders of the first through sixth embodiments and the video decoder of the seventh embodiment use integer pel and half-pel for addressing to implement a high-speed complex encoding and decoding of the picture by motion compensation of the transformed block.

On the contrary, though the video decoder of this embodiment is configured as the same as the foregoing embodiments, the video decoder of the embodiment computes for corresponding pel determination to obtain better matching of the reference picture block to the input picture block by better motion compensation, which enables to obtain more smooth motion for block matching.

In this embodiment, as well as in the seventh embodiment, the decoder can decode a bitstream, which is obtained by prediction error signal encoded in encoding method other than the orthogonal transformation encoding method, by changing element except the motion compensator 90 for decoding the prediction error signal.

Further, the above example of this embodiment, where decoding is implemented by a unit of fixed size of block, can be applied not only to a decoder, where decoding is implemented by a unit of a frame of normal television signal, but also to a decoder, where decoding is implemented by a unit of picture object having an arbitrary shape consisting of fixed size of blocks (e.g., Video Object Plane), as well as the seventh embodiment.

Embodiment 9

The above explanation of the foregoing embodiments does not mention the number of pels included in one input picture block for detecting motion. Namely, the block can have an arbitrary height (H) of pels and an arbitrary width (W) of pels in the foregoing embodiments. In this embodiment, the number of pels for H and W is limited to a number of power of 2 to simplify the computation of the pel position. In this way, the load of the corresponding pel determinator decreases, and a high-speed operation can be performed.

The decoder of the present embodiment is the same as the decoder of the eighth embodiment except an operation of a corresponding pel determinator 37c in the motion compensator 90. In the following, only the operation of the corresponding pel determinator will be explained.

Figure 40:
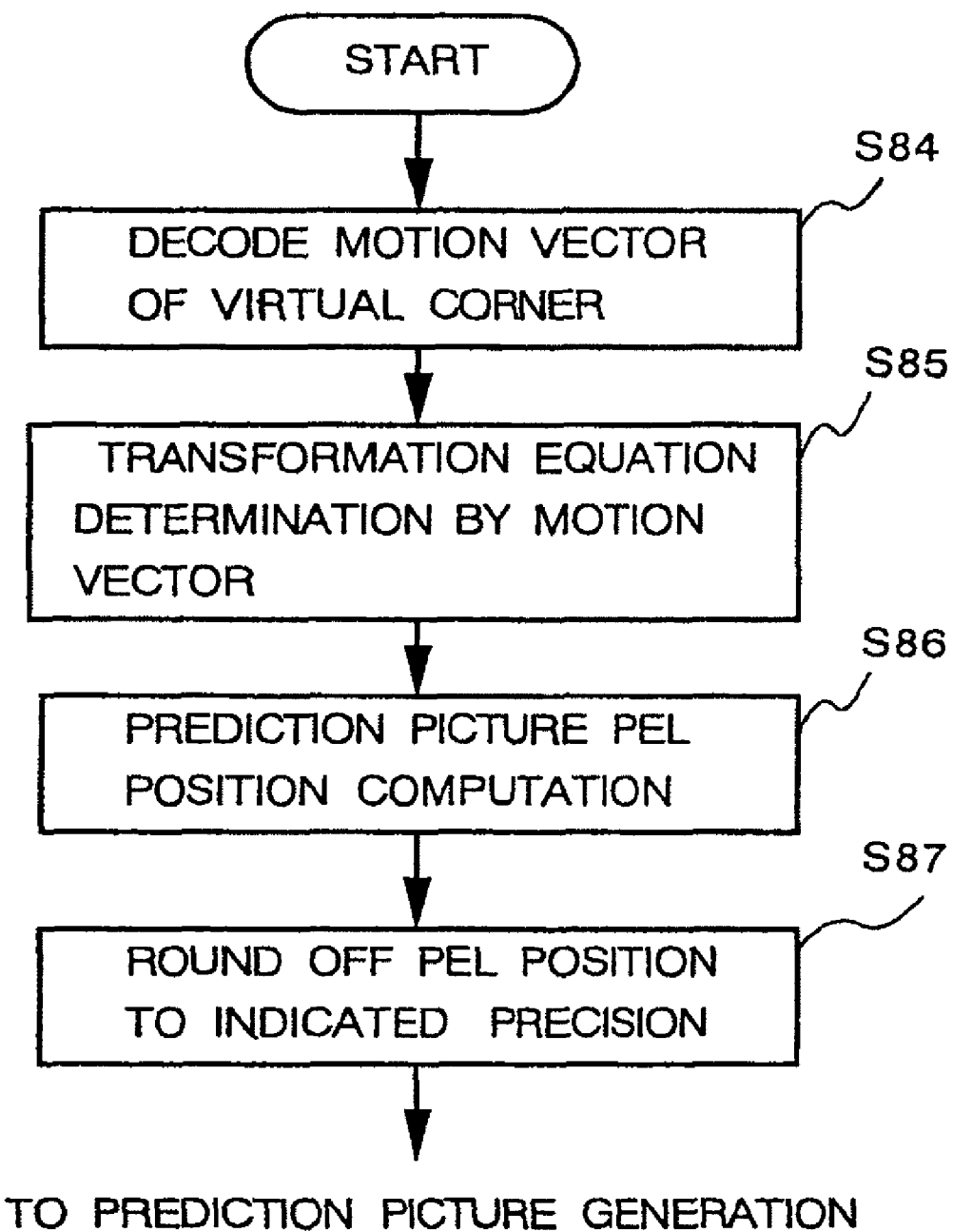
FIG. 40 is a flowchart showing an operation of the corresponding pel determinator 37c in the motion compensator of a ninth embodiment.

FIG. 40 is a flowchart showing a process of an operation of the corresponding pel determinator 37c.

Figure 41:
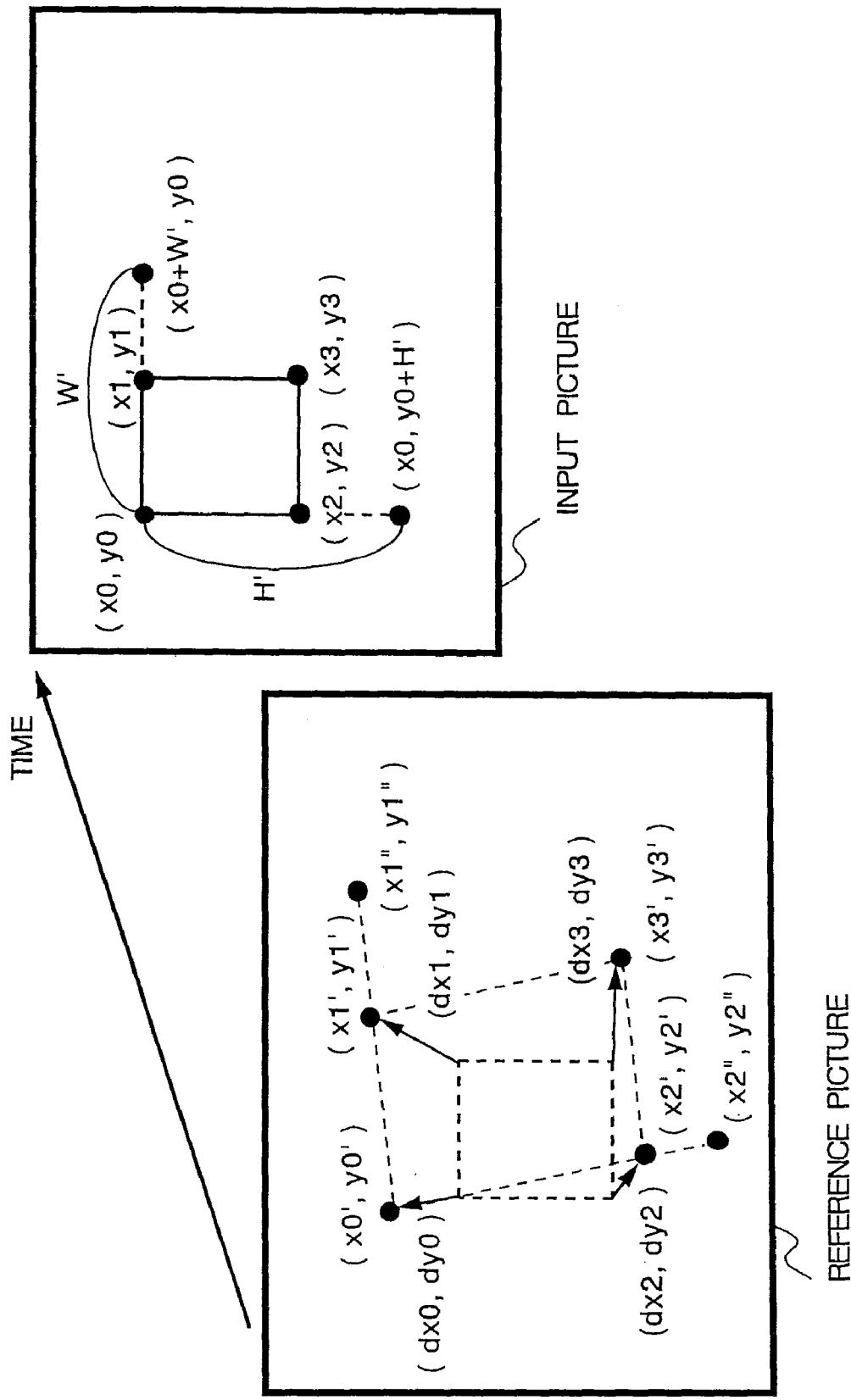
FIG. 41 explains an example of transformation performed by the motion compensator of the ninth embodiment.
Figure 42:
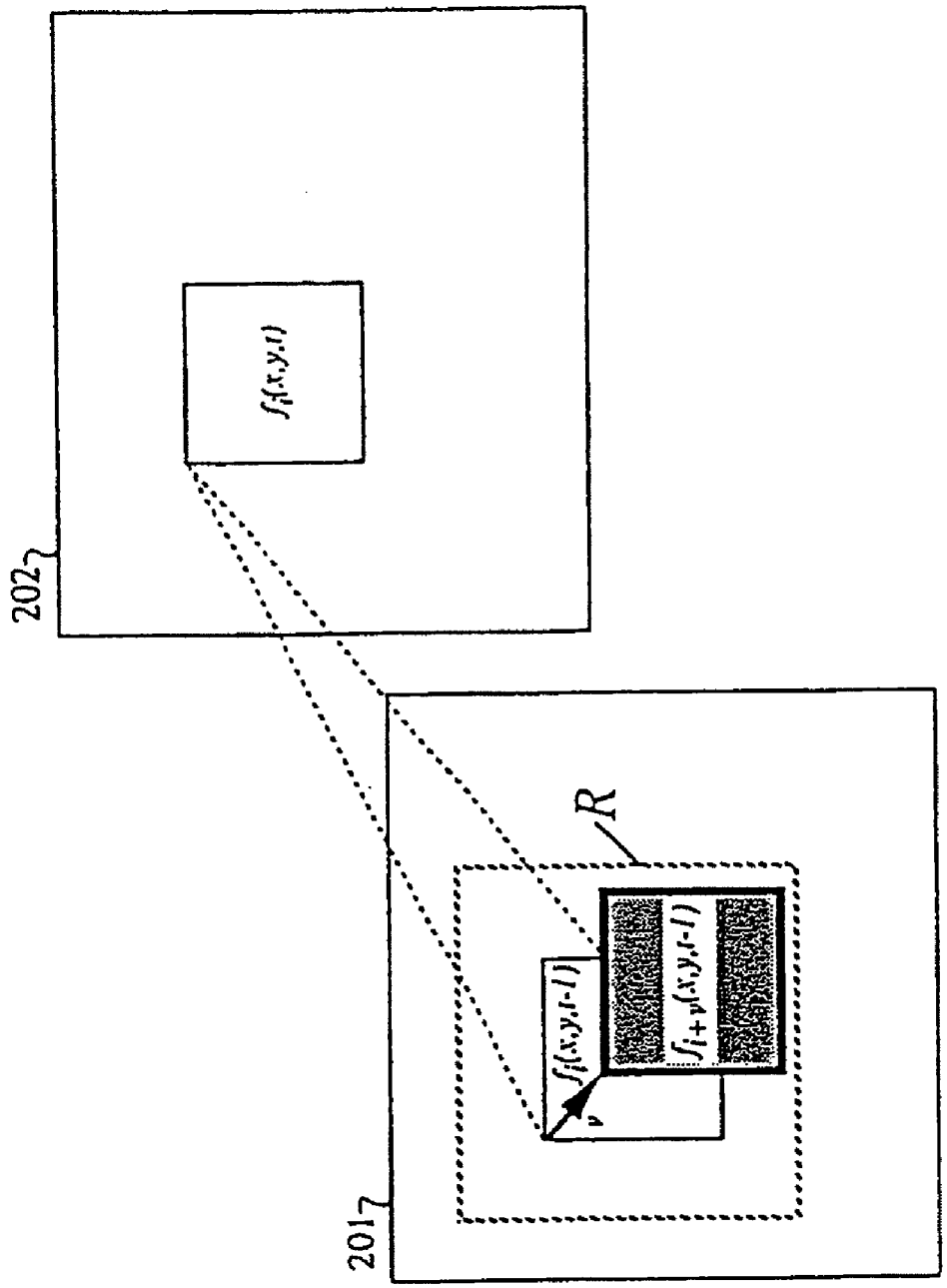
FIG. 42 is a combination of explanatory drawings which describe a concept of motion compensated prediction using block matching according to a first conventional related art.

FIG. 41 explains the operation of the corresponding pel determinator 37c.

The operation of the corresponding pel determinator 37c of this embodiment will be explained below in relation to FIG. 40.

According to this embodiment, the corresponding pel determinator 37c receives the motion vector 25b, the transformation pattern data 26a, the interpolation precision indicating data 91, and the input picture portion position 27a and computes the prediction picture sample pel position corresponding to each pel within the input picture portion to output. In this case, the input picture portion position 27a is fixed value for each input picture portion. The motion vector 25b and the transformation pattern data 26a can be fixed value for each input picture portion, or can be encoded for using the same motion vector and the same transformation pattern data for all input picture portions included in larger picture consisting of a plurality of input picture portions (e.g., a picture frame, and VOP disclosed in ISO/IEC JTC1/SC29/WG11). In the following explanation, it is assumed that at most 3 motion vectors are used.

As shown in FIG. 41, the motion vectors 25b are from pel (x0, y0) to pel (x0+W', y0)(W'≧W, W'=2$^m$) and to pel (x0, y0+H')(H'≧H, H'=2$^n$), which are points on lines extended from the left upper corner and the right lower corner of the circumscribing rectangle within the input picture portion at a distance representable by power of 2 from the left upper corner. The following transformation equations (16) through (19) are obtained based on these motion vectors corresponding to the transformation pattern data 26a.

1-1) Without Motion (Required Number of Vectors: 0)

$$(i',j')=(i,j) \qquad (16)$$

1-2) Translation (Required Number of Vectors: 1)

$$(i',j')=(i+dx0,j+dy0) \qquad (17)$$

1-3) Isotropic Transformation (Required Number of Vectors: 2)

$$i'=((x1''-x0')/W'*i+((y0'-y1'')/W'*j+(x0'-(x0(x1''-x0')+y0(y0'-y1''))/W')$$

$$j'=((y1''-y0')/W')*i+((x1''-x0')/W'*j+(y0'-(y0(x1''-x0')+x0(y0'-y1''))/W) \qquad (18)$$

where, (x0, y0): pel position of the left upper corner of the circumscribing rectangle within the input picture portion (x1, y1): pel position of the right upper corner of the circumscribing rectangle within the input picture portion (x0', y0'): displaced pel position of (x0, y0) by the first motion vector (dx0, dy0)

(x1', y1'): displaced pel position of (x0+W', y0) by the second motion vector (dx1, dy1)

1-4) Affine Transformation (Required Number of Motion Vectors: 3)=

$$i'=((x1''-x0')/W')*i+((x2''-x0')/H')*j+(x0'-x0(x1''-x0')/W'+y0(x2''-x0'))/H')$$

$$j'=((y1''-y0')/W')*i+((y2''-y0')/H')*j+(y0'-x0(y1''-y0')/W'+y0(y2''-y0'))/H') \qquad (19)$$

where, (x0, y0): pel position of the left upper corner of the circumscribing rectangle within the input picture portion (x1, y1): pel position of the right upper corner of the circumscribing rectangle within the input picture portion (x2, y2): pel position of the left lower corner of the circumscribing rectangle within the input picture portion (x0', y0'): displaced pel position of (x0, y0) by the first motion vector (dx0, dy0)

(x1", y1"): displaced pel position of (x0+W', y0) by the second motion vector (dx1, dy1)

(x2", y2"): displaced pel position of (x0, y0+H') by the third motion vector (dx2, dy2)

The transformation pattern data 26a can take the form of a bit sequence consisting of plural bits directly indicating one of the above transformation equations (16) through (19), or the form can be bits indicating the number of motion vectors, as each transformation corresponds to number of vectors.

By the above transformation equations, the input picture portion pel (i, j) can be corresponded to the reference picture portion pel (i', j'). On computation of corresponding pel position, the value of a prediction picture sample pel position should be obtained to the extent of precision indicated by the interpolation precision indicating data 60. For example, on rounding to half-pel precision, the sample pel position (i', j') obtained by the above transformation equation should be rounded off to the half-pel precision. On rounding to quarter-pel precision, the sample pel position (i', j') obtained by the above transformation equation should be rounded off to the quarter-pel precision. This sample pel precision indicating data is extracted from the bitstream.

As has been described, in this embodiment, corresponding pel determining rule is set directly by the motion vector 25b and the prediction picture sample pel position is determined based on the corresponding pel determining rule.

2) Prediction Picture Generating Data Readout

3) Prediction Picture Generation

As the operation of this embodiment in connection with the above 2) and 3) is the same as the eighth embodiment, the detailed explanation will be omitted.

As explained above, the video decoder according to this embodiment can determine sample pel position in a high-speed by simple bit shifting operation instead of division by W' or H' on computing sample pel position using 0 through plural motion vectors. The video decoder of the embodiment can efficiently predict motion having various complexity to obtain decoded picture from the encoded bitstream.

The motion compensation according to this embodiment can be applied to a video decoder based on another encoding method by changing corresponding element and the video decoder can obtain the same efficiency. Further, this embodiment can be applied to a decoder, where decoding is implemented by a unit of picture object having an arbitrary shape consisting of fixed size of block (e.g., Video Object Plane), as well as the seventh embodiment.

A video encoder and a video decoder of the present invention can be combined to configure a characteristic video encoding and decoding system.

Further, by executing the operations illustrated in the flow charts described hereinbefore, that is, by providing a transformed block matching step, a corresponding pel determination step, a motion compensated prediction picture generating step, and a decoding adding step, a characteristic video encoding and decoding method can be obtained.

INDUSTRIAL APPLICABILITY

As described above, according to the present invention, real integer sample point pels and half-pels interposed midway therebetween in a transformed prediction picture portion obtained by memory addressing alone are used to perform motion compensated prediction. Consequently, efficient and accurate motion compensated prediction can be performed for a picture portion in which correct motion compensated prediction cannot be performed by only using a motion vector limited to translational displacement. Further, this prediction can be implemented without performing complex arithmetic operations which are required when using the affine motion model. Motion compensated prediction using a transformed picture portion for various types of object motion which cannot be expressed in terms of a numeral equation as well as object rotation and scaling which are easily expressible in terms of a numeral equation can also be performed by the invention. A video decoder of the present invention can also recreate a high-quality picture efficiently.

Further, if only the memory addressing based on the corresponding pel determination is performed, various object motion including rotation, scaling down, or scaling up can be correctly predicted without performing complex pel interpolation such as when the affine motion model is applied.

Further, by using the motion vector representing a translational displacement of an object through block matching, a transformed block search range used in transformed block matching can be effectively reduced. Overall operation processes for motion compensated prediction can also be reduced.

Further, if only the memory addressing is performed, various object motion including simply reducing or enlarging can be efficiently predicted without performing complex pel interpolation such as when the affine motion model is applied.

Further, corresponding pel determination can be made by using a transformation pattern table. Consequently, motion compensated prediction for object motion such as that required for using the affine motion model and represented by an arbitrary transformed prediction picture portion and which cannot be expressed in terms of a simple numerical equation can be performed.

Further, by using a filter, a variation in the spatial frequency characteristic within a transformed block can be eliminated. Thus, a prediction mismatch can be reduced.

According to the present invention, a video decoder combined with a video encoder capable of performing transformed block matching and motion compensated prediction is provided. Consequently, the video decoder of the present invention can decode encoded picture data obtained by implementing rapid and optimum motion compensated prediction, into a complete picture.

Further, on addressing by the video decoder, the decoder can implement complex motion prediction including various motion for decoding, which enables to reproduce the picture having smoother motion.

The invention claimed is:

1. A video decoding method for decoding a bitstream of video data comprising the following steps:

information receiving step for receiving information of a position of picture portion to which motion compensation is applied and information of a number of corresponding motion vectors and each value of the corresponding motion vectors, characterized by corresponding pel determining step for computing a prediction picture sample pel position corresponding to each pel within said position of picture portion in case that the number of corresponding motion vectors is three, using following procedure:

transforming a left upper corner coordinate value of a circumscribing rectangle within said picture portion by using a first motion vector received;

obtaining a provisional right upper corner coordinate value of the circumscribing rectangle by extending to make the distance between said left upper corner coordinate and the provisional right upper corner coordinate be power of 2, transforming said provisional right upper corner coordinate value based on a second motion vector received, and obtaining a first virtual coordinate value as a result;

obtaining a provisional left lower corner coordinate value of the circumscribing rectangle by extending to make the distance between said left upper corner coordinate and the provisional left lower corner coordinate be power of 2, transforming said provisional left lower corner coordinate based on a third motion vector received, and obtaining a second virtual coordinate value as a result;

obtaining a transformation equation having the transformed coordinate values including the first virtual coordinate value and the second virtual coordinate value in a numerator and a distance from said left upper corner coordinate value to said provisional right upper corner coordinate value and a distance from said left upper corner coordinate value to said provisional left lower corner coordinate value in a denominator; and computing a pel position based on bit shifting operation for division by using the transformation equation having the numerator and the denominator.

* * * * *